May 20, 1958   P. J. C. CHENUS   2,835,443
PRINTING CONTROL APPARATUS
Filed Feb. 19, 1953   31 Sheets-Sheet 4

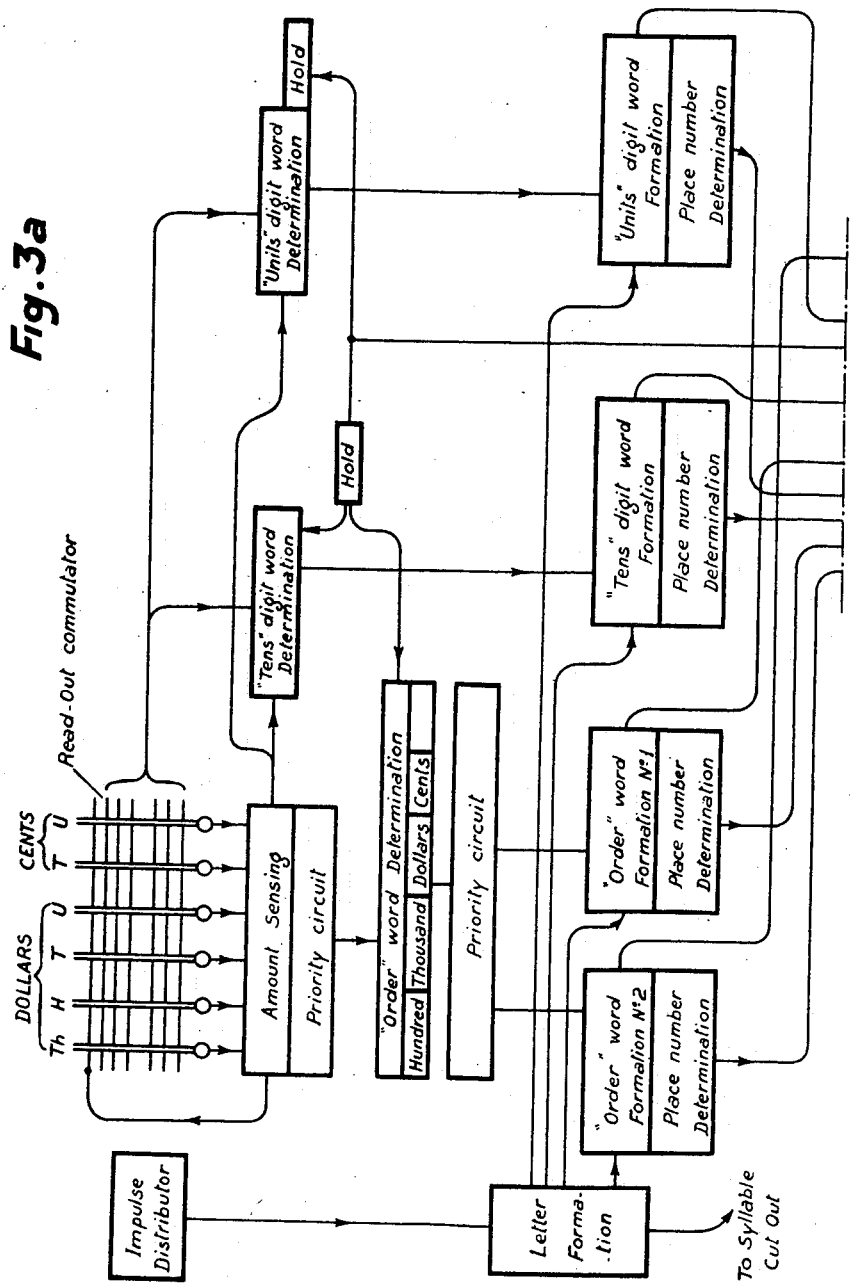

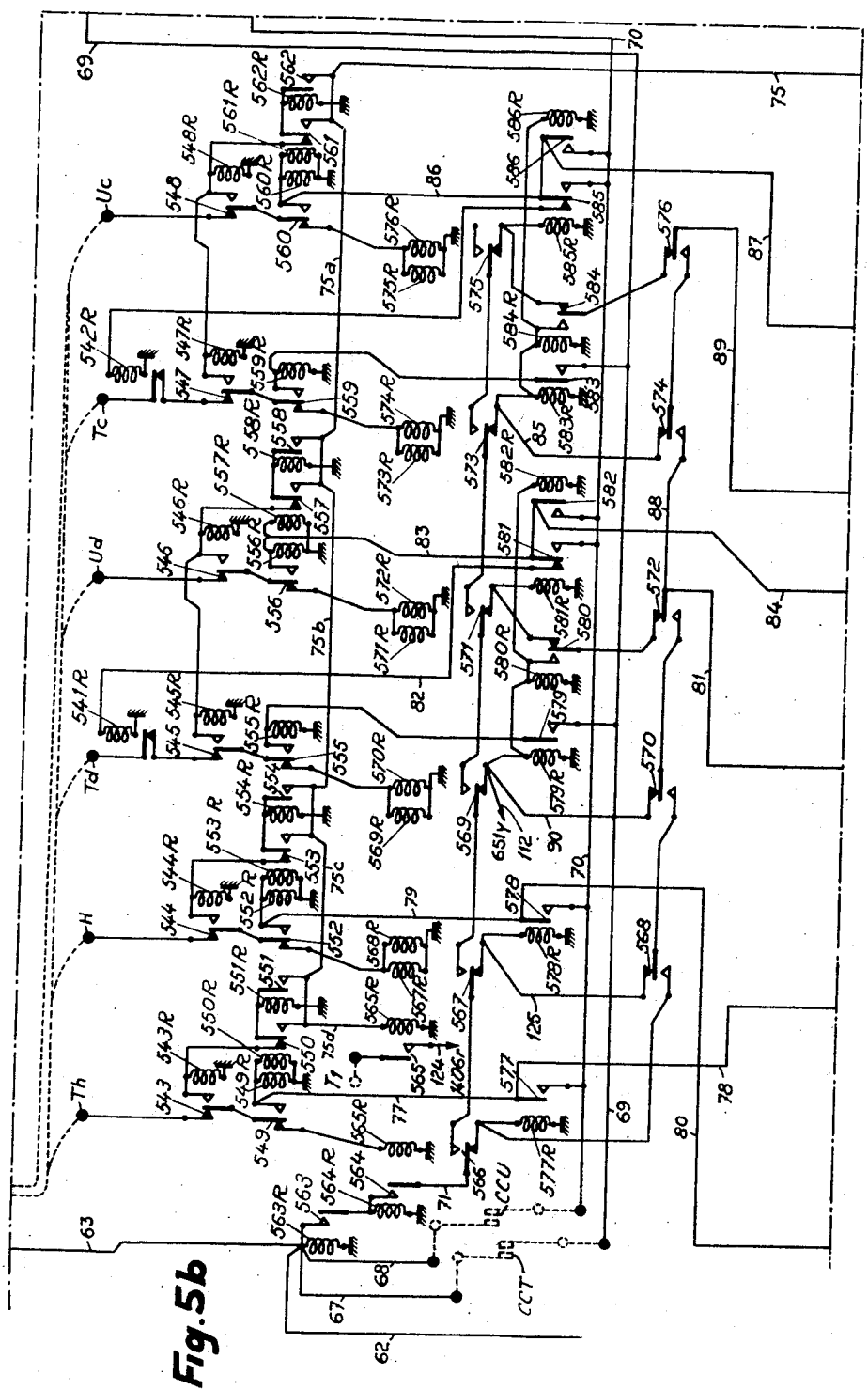

May 20, 1958

P. J. C. CHENUS 2,835,443

PRINTING CONTROL APPARATUS

Filed Feb. 19, 1953

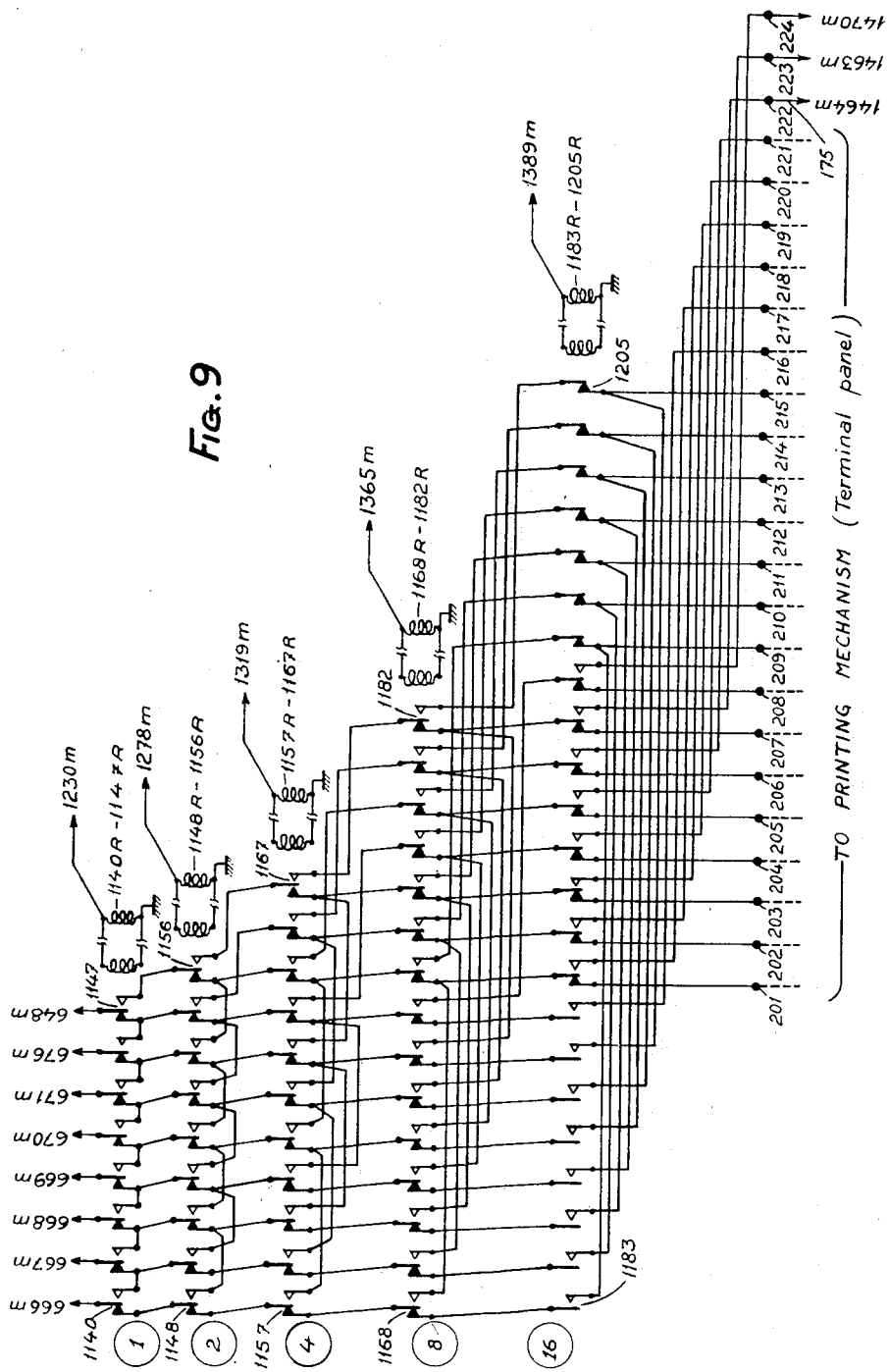

Fig. 10a

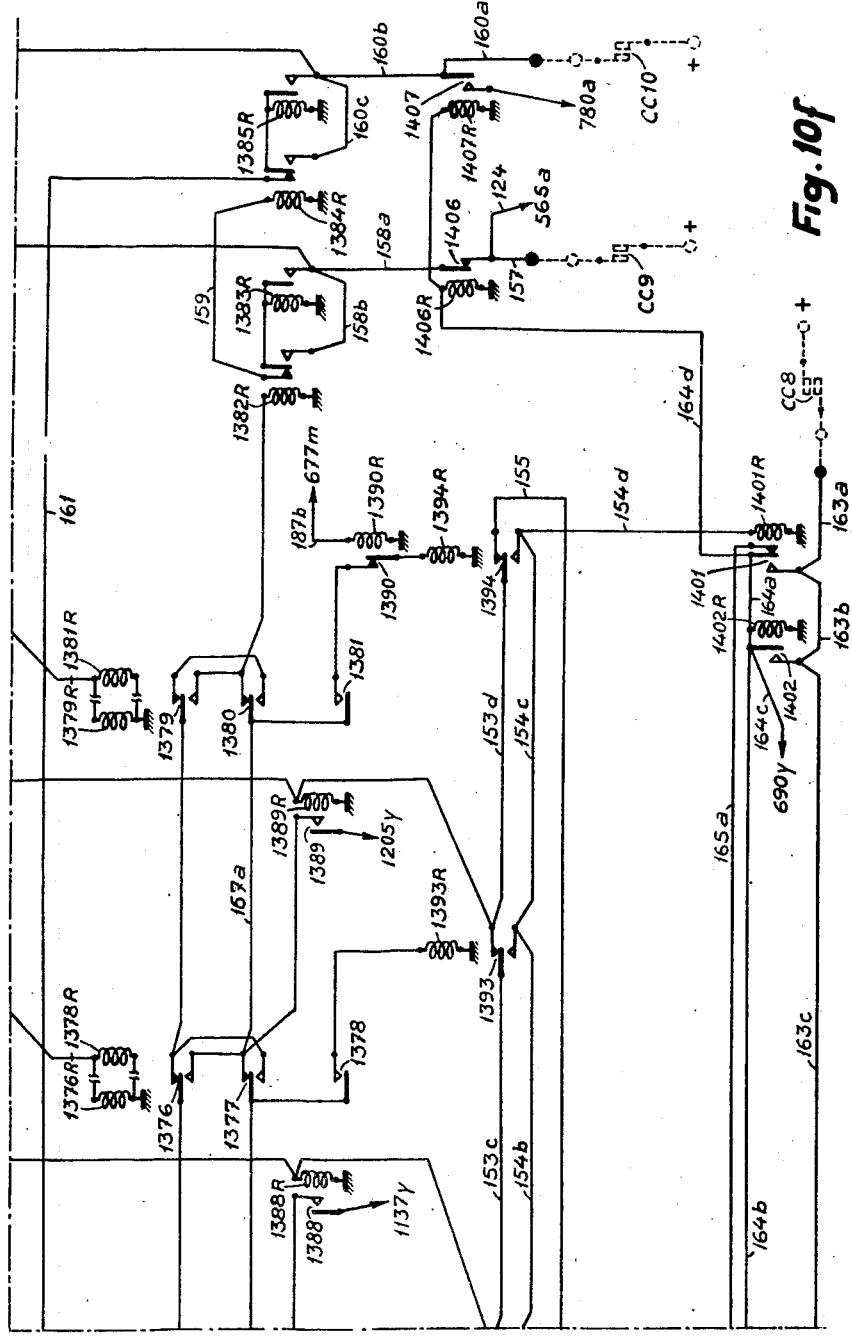

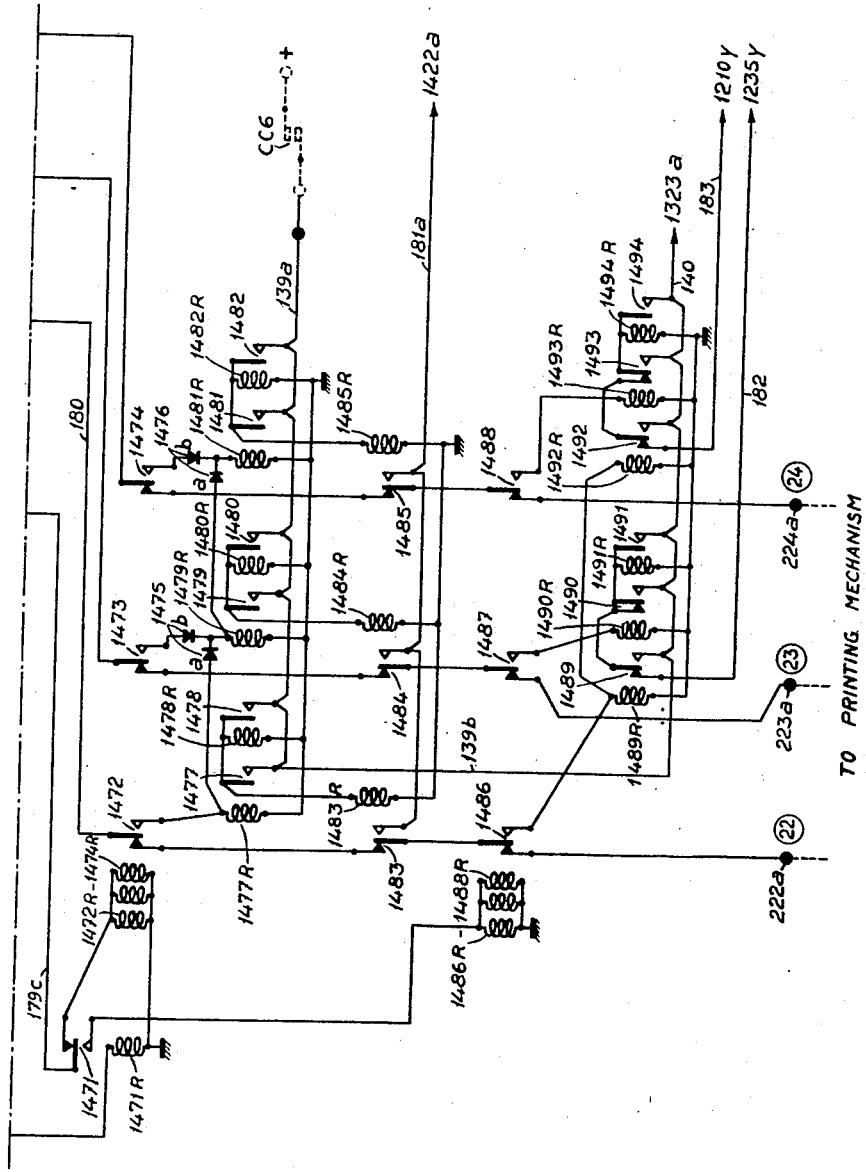

May 20, 1958   P. J. C. CHENUS   2,835,443
PRINTING CONTROL APPARATUS
Filed Feb. 19, 1953   31 Sheets-Sheet 29
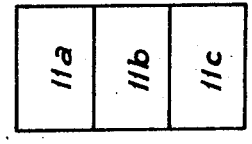
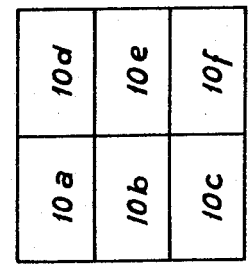
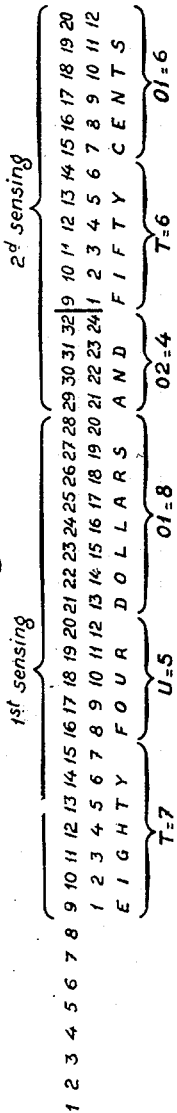
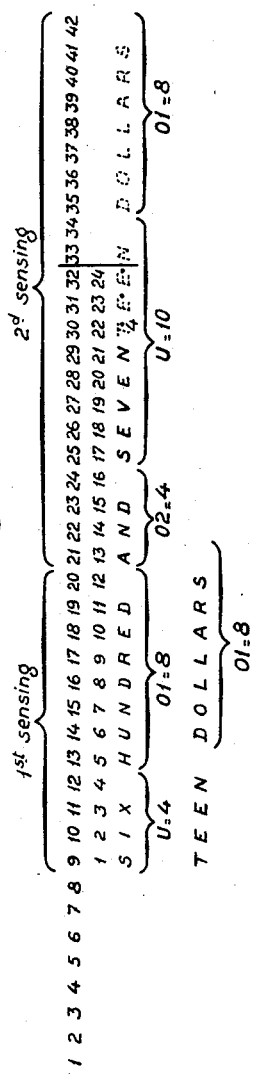
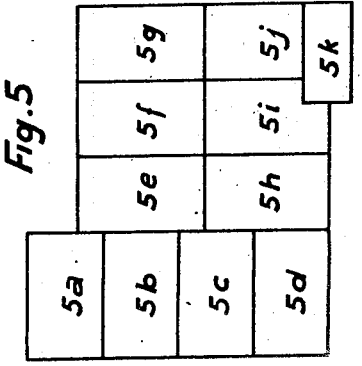
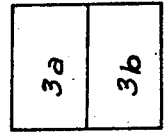

May 20, 1958     P. J. C. CHENUS     2,835,443

PRINTING CONTROL APPARATUS

Filed Feb. 19, 1953     31 Sheets-Sheet 30

United States Patent Office 2,835,443
Patented May 20, 1958

2,835,443
PRINTING CONTROL APPARATUS

Pierre Jacques Charles Chenus, Paris, France, assignor to Compagnie des Machines Bull (Societe Anonyme), Paris, France Application February 19, 1953, Serial No. 337,843
Claims priority, application France April 23, 1952
46 Claims. (Cl. 235—61.9)

This invention relates to accounting machines and more particularly to machines including amount registering or accumulating devices and alphabet printing mechanism.

The invention is readily applicable to alphabet printing tabulators of the cyclically operable and record controlled type:

An amount of a sum of money being registered in a registering or accumulating device of the machine, it is desirable as the case may be, to print the literal wording corresponding to said amount on a suitable form such as a check, money-order or the like.

Broadly stated, the object of the invention is to provide a machine of the type indicated before with means to translate a registered amount of money into its literal wording in accordance with the writing rules used in the United States of America and control the printing of said wording.

As a whole, said means are hereinafter referred to as printing control apparatus.

More specifically, an object of the invention is a printing control apparatus with the following features: said apparatus is provided with means called "Amount sensing device" which cooperates with an amount manifesting device of the machine to detect the presence of zeros in a registered amount and also to determine the amount pattern with regards to the configuration of zeros and significant digits in said amount.

Said "Amount sensing" device initiates an Amount sensing operation, controls the translation of the significant digit registered at the highest denominational order as also the determination of a so-called "Order" word in relation with said denominational order.

The translation of a digit results in the determination of a "digit" word in relation with the numerical value of said digit, through a suitable determination device.

The "Order" words comprise the words: Thousand, Hundred, Dollars and Cents, which may be determined by the "Order word determination" device No. 1.

The Amount sensing device has means to initiate repeated sensing operations and to consider a previously translated digit as equivalent to a zero. Consequently the digits registered in lower denominational orders are translated during the succeeding sensing operations.

The amount sensing device is adapted further to control the concurrent translation of significant digits registered in adjacent "Tens" and "Units" orders, said translation resulting generally in the determination of two "digit" words through a "Tens" and a "Units" digit word determination device.

When determined, the "Order" and "digit" words are respectively formed in an "Order word formation" device No. 1, a "Tens digit word formation" device and a "Units digit word formation" device, each associated with the corresponding "word determination" device.

Each of said "formation" device comprises means for determining a place number in relation with the number of letters of the formed word.

The words Thousand and Hundred are separately and respectively determined when there is a significant digit at the "thousand" or "hundred" order.

The word "Dollars" is determined:

(a) Along with the determination of "Tens" and/or "Units" digit words (Dollars portion).

(b) At the time when the word Hundred is being determined, if there are zeros at both "Tens" and "Units" orders;

(c) At the time when the word Thousand is being determined if there are zeros at all "Hundred," "Tens" and "Units" orders.

Through means controlled by the "Amount sensing" device and the "Order word determination" device, the "Order word formation" device No. 1 is adapted to suppress the formation of the letter "s" in Dollars, when said means have detected during a sensing operation involving the "Units" order:

(1) The presence of the digit 1 at said order; (2) the absence of any significant digit at the adjacent "Tens" order and at the "Hundred" and "Thousand" orders.

The determination of the word Cents does not depend on the fact that there are, or not, any significant digit at one of the related "Tens" and "Units" orders. It takes place along with the determination of the word Dollars if both "Cents" orders do not contain any significant digit or during a subsequent sensing operation in the contrary case.

The apparatus comprises an "Order word formation" device No. 2 with means to separately form the words And and No. This device can form the word And at the same time as the word Dollars is being formed, under control of control means adapted to ascertain that there is one significant digit at one of the "Tens" or "Units" orders (Dollars portion) and that the word Hundred has been determined and formed during a previous cycle.

This device can also form the words And No at the same time as the word Cents is being formed, but the word No is not formed if special means detect the presence of any signfiicant digit at Tens or Units order of the Cents portion.

The Amount sensing device is adapted to control the concurrent determination of several Order words during one sensing operation: the Order word determination device is provided with means to control the successive formation of the determined words during separate cycles and to prevent a new sensing operation until all the determined words are formed and printed.

The concurrent sensing of adjacent Tens and Units orders results, when the digit 1 is registered at the Tens order, in the determination of one digit word, namely: the word Ten, if the digit registered at the Units order is a 0, or one of the words Eleven, . . . Nineteen if the digit registered at the Units order is one of the digits 1 to 9.

A shift arrangement is associated with each word formation device for simultaneously transmitting the formed words to the printing mechanism.

The apparatus comprises a place number totalizer with several counters receiving place numbers determined in relation with the words formed by the various word formation devices. Said totalizer includes also a so-called Previous Total counter and a storage device for manifesting, before each sensing operation, the total of the numbers precedingly received by said counters.

Each counter, the Order No. 1 counter excepted, exerts, through control means, a control on a shift arrangement, the broad control action being such that the words concurrently formed are transmitted in a predetermined order and correct spacing to the printing mechanism.

The form to be printed under control of the present apparatus is such that a complete wording may require more than one printing line, that is to say, that each printing line includes a fixed printing place number lesser than the printing place number corresponding to said complete wording, which depends on the capacity of the accumulator of the associated machine.

Consequently, each counter in the totalizer has a capacity numerically equal to the sum of said fixed number plus a digit representing a systematical shift applied to each shift arrangement minus one.

Special means are provided for detecting, before printing of any formed partial wording, if the place number corresponding to the wording instantly formed exceeds said fixed number. In case of such a detection, the shift arrangements are selectively and bodily controlled so that only the wording portion not exceeding the capacity of a line may be printed. At the same time holding means are effective to maintain the formation of the words just formed for a further printing cycle.

During said further printing cycle, the shift arrangements are controlled so that only the wording portion exceeding the capacity of the line may be printed.

A device cooperating with the totalizer operates, first upon starting of the control apparatus and then before printing of each new line, to enter into the totalizer a digit corresponding to the systematical shift constructively applied to the shift arrangements.

A control device is effective, when a new line is to be printed, for causing the printing mechanism of the tabulator to carry out a line spacing of the form paper.

As it may occur that a formed word be astride on the end of a printing line, it is not desirable that said word be cut at random and all the possible words are theoretically divided more or less arbitrarily into syllables, the maximum letter number admitted in the longest syllables being a fixed number. The first letter of each syllable may be called: syllable initial and it may be characterized by an index indicating the letter number of the syllable considered.

A so-called "Syllable Cut-out" device is inserted in a number of transmitting circuit paths between the shift arrangements and the printing mechanism. Said device is provided with means to initiate an initial search through said transmitting paths before each printing cycle. If the initial search is positive, the position of the initial is found out as also the number of letters of the syllable involved. Means are provided to cut out or not a variable number of said transmitting paths according to the results of said search, during the printing of the first part of the precedingly formed wording.

Before printing of the second part of the precedingly formed wording, the same device initiates a second similar search which gives the same results but it now controls the adding in the totalizer of a number representing the number of transmitting paths which were cut out during the preceding printing operation. By this way the letters previously suppressed may be printed in correct position with the rest of the formed wording, at the beginning of the new line.

Other features of the invention will be apparent from the following description and claims and illustrated in the accompanying drawings, which disclose, by way of example, the principle of the invention and the best mode, which has been contemplated, of applying that principle.

Figure 3B:
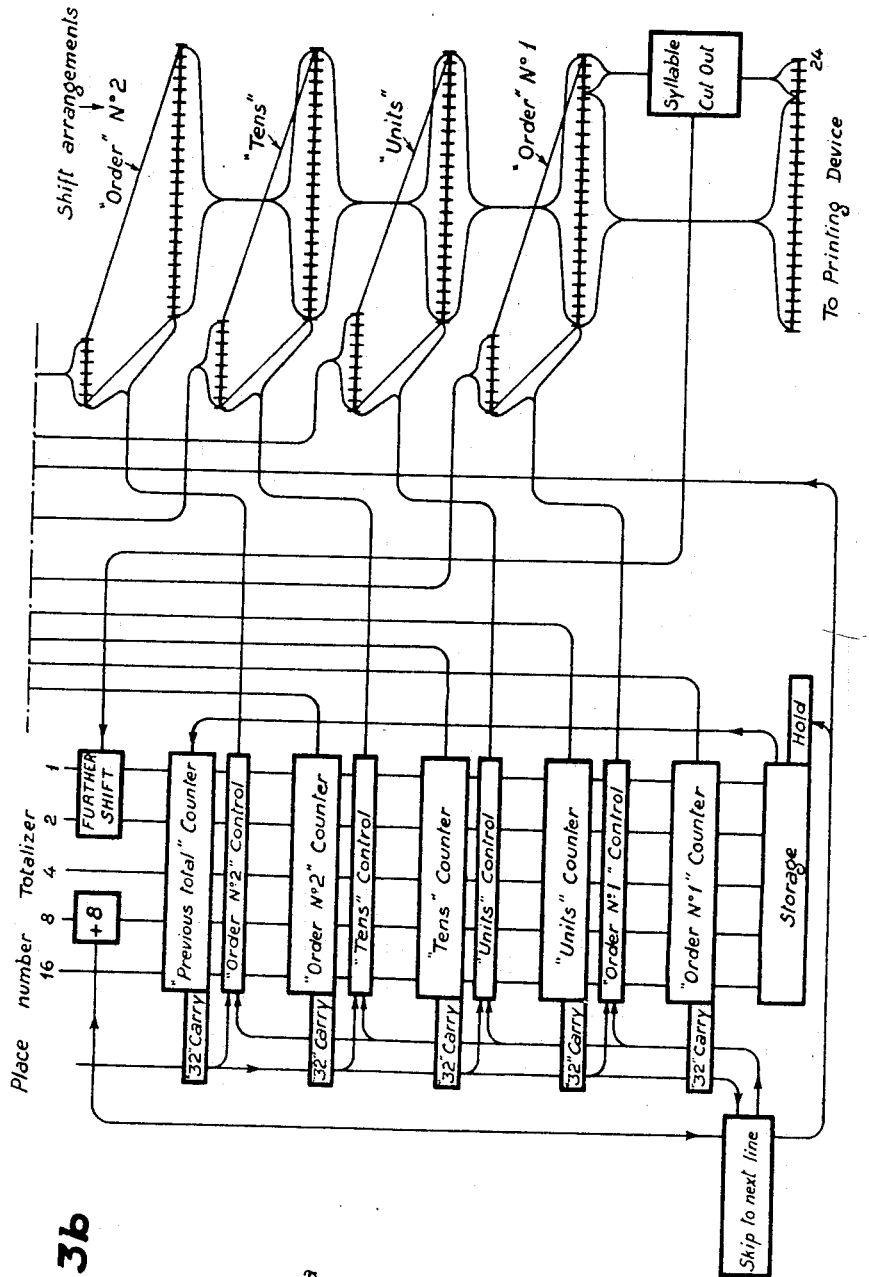
Fig. 3 shows the mode of assembling Figs. 3a and 3b.

Figs. 3a-3b taken together constitute a block diagram of the apparatus according to the invention.

Figure 4:
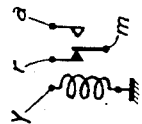

Fig. 4 shows a conventional indexing for a relay with its change-over contacts.

Figure 5A:
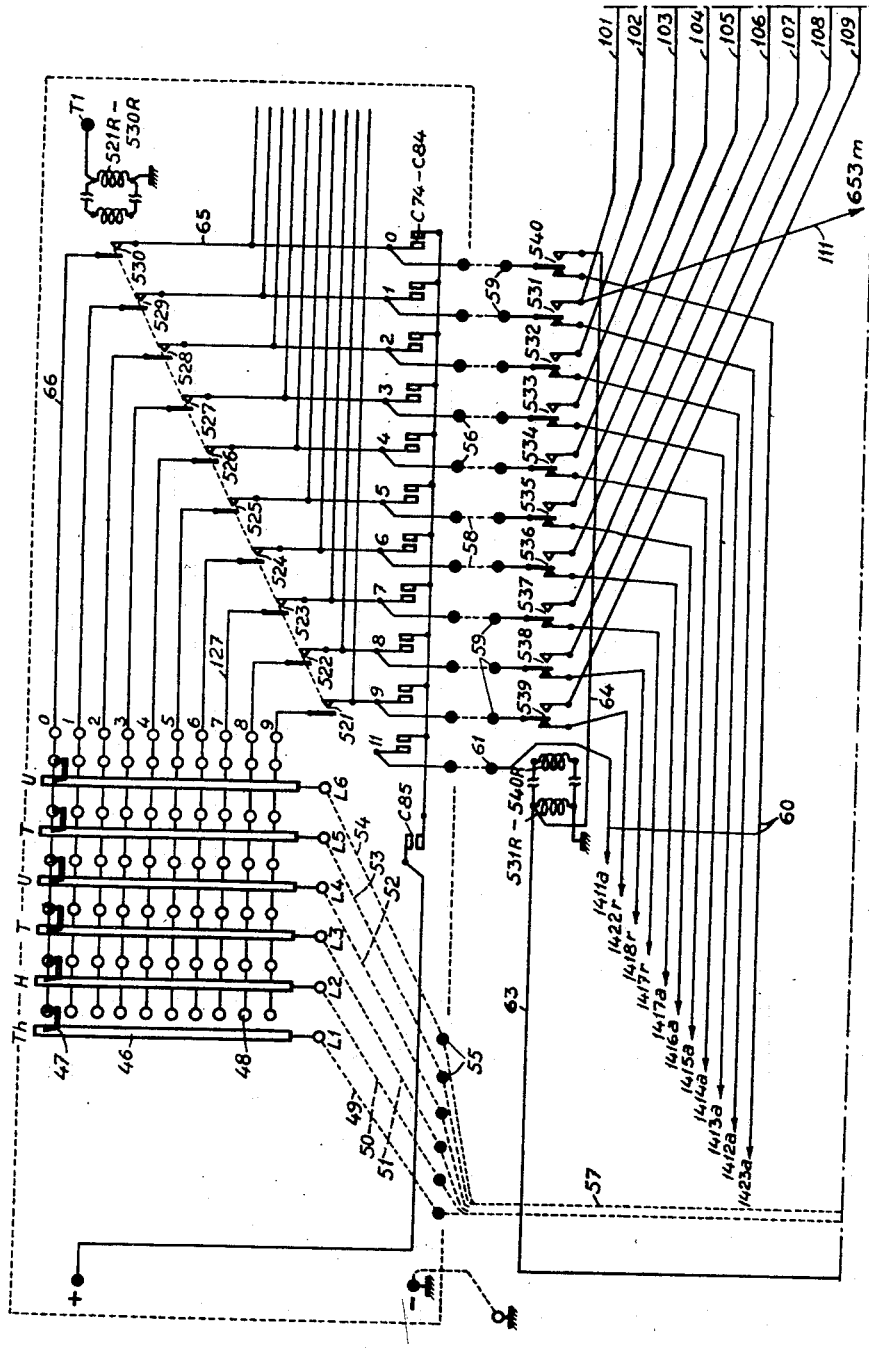
Figure 5C:
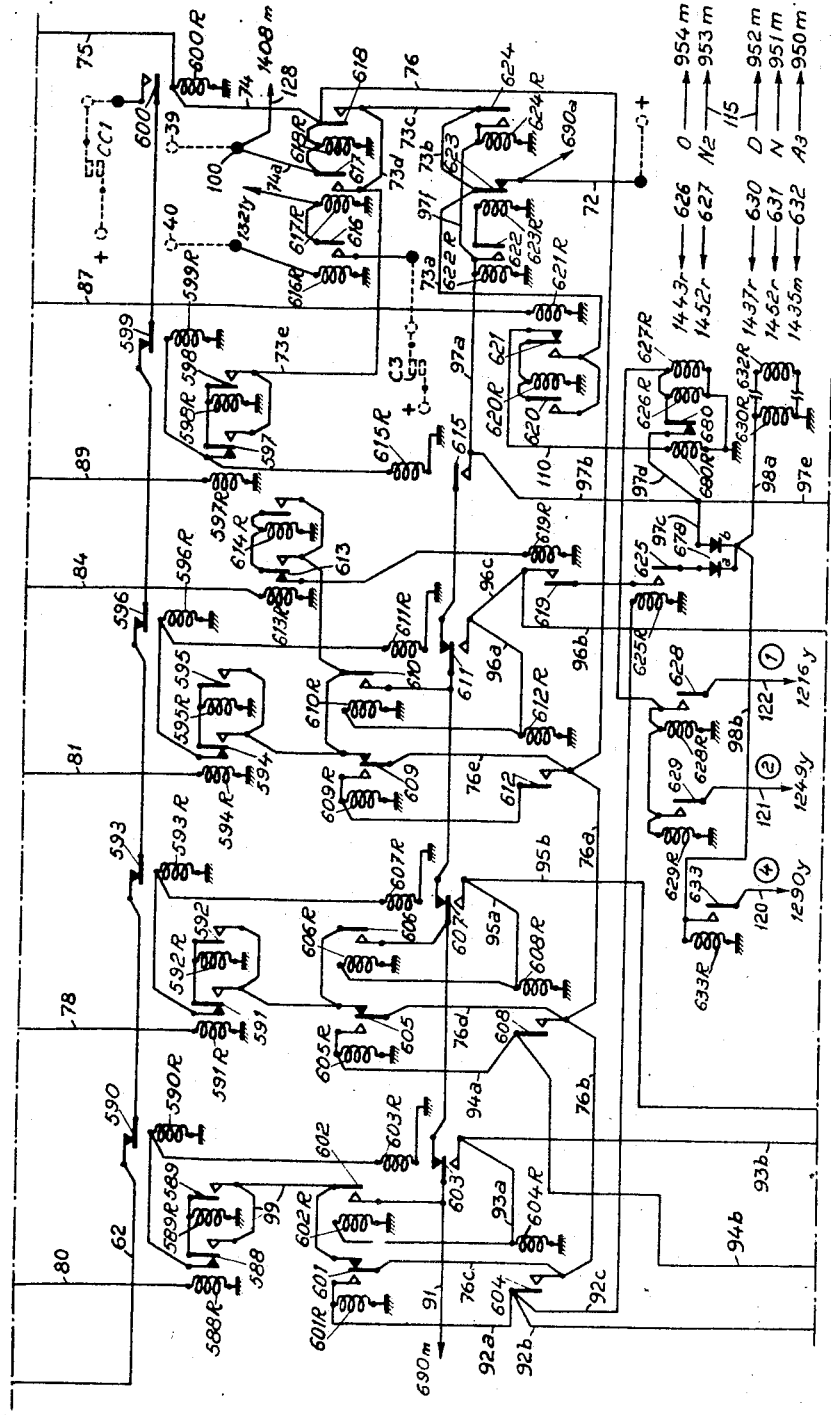
Figure 5:
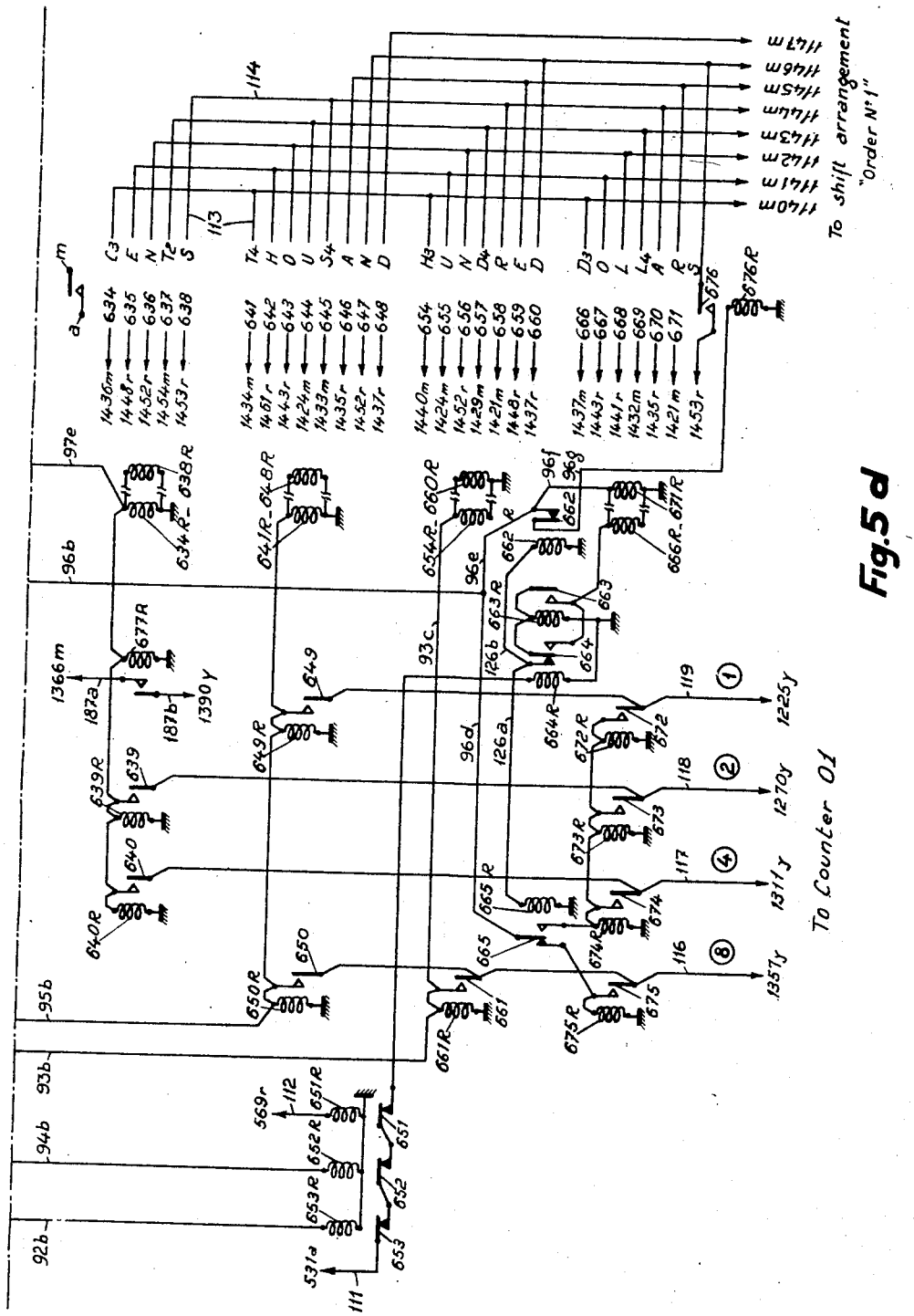
Figure 5E:
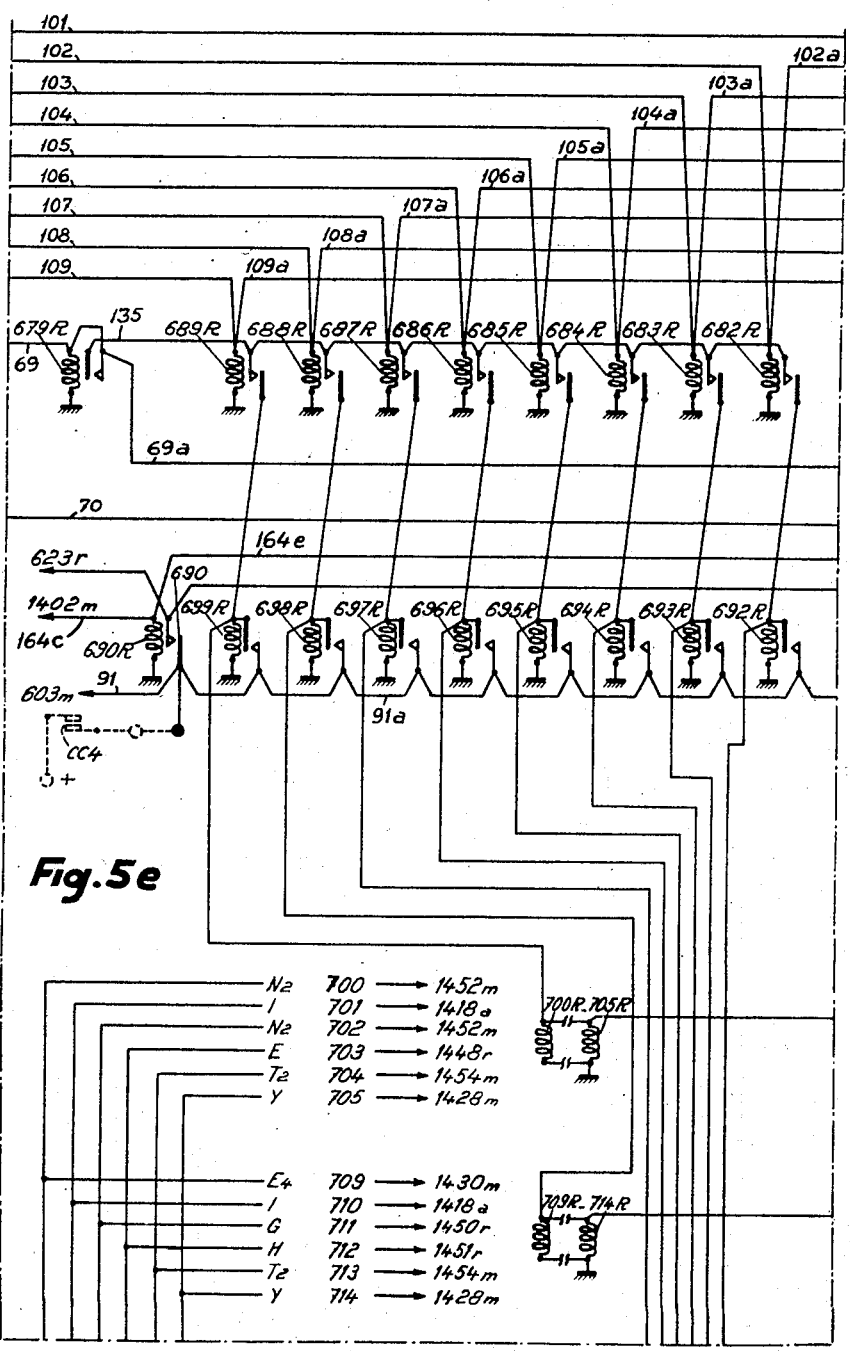

Fig. 5 shows the mode of assembling Figs. 5a to 5k.

Figs. 5a to 5k, constitute a circuit diagram of devices roughly devoted to functions such as: Amount sensing, word determination and formation.

Figs. 6, 7, 8 and 9 are separate circuit diagrams of the shift arrangements.

Fig. 10 shows the mode of assembling Figs. 10a to 10f.

Figs. 10a to 10f constitute a circuit diagram of a so-called "place number totalizer."

Figure 11A:
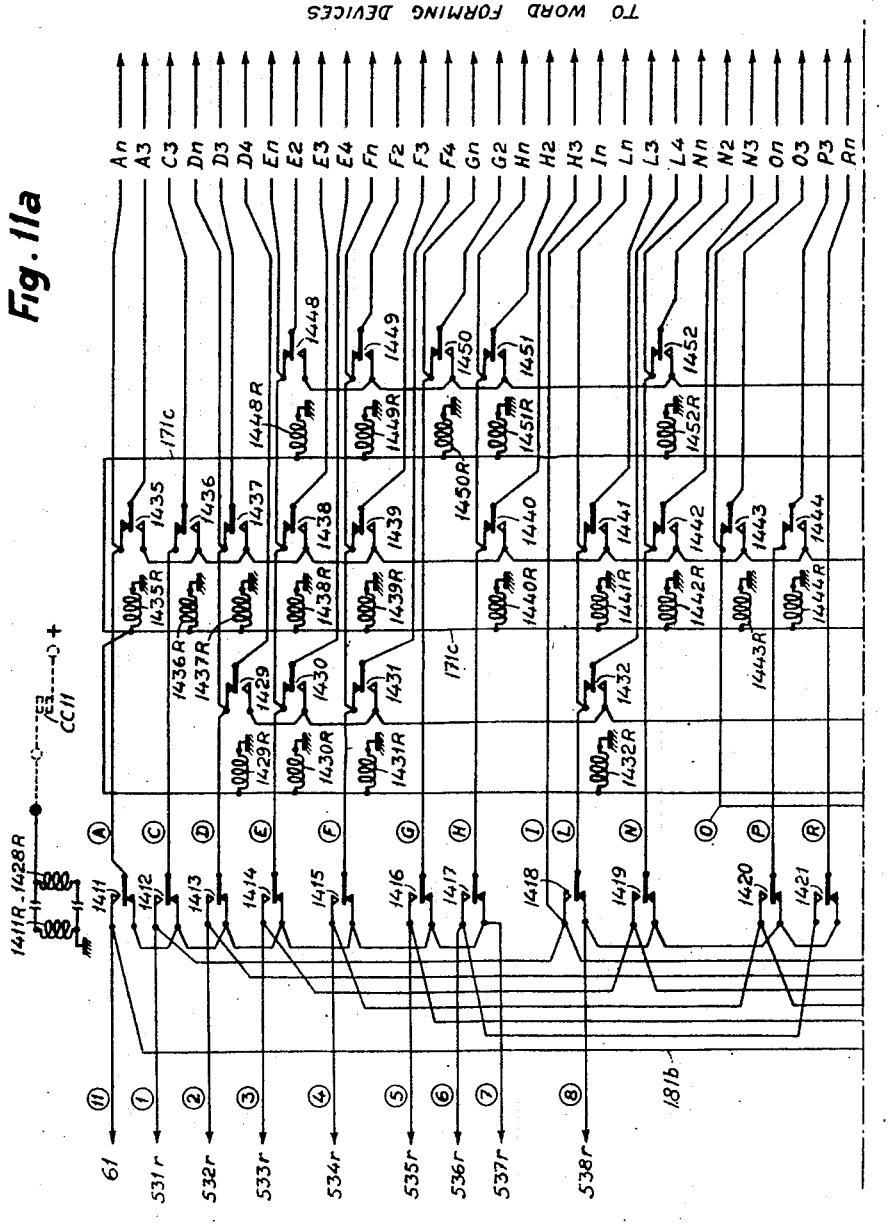
Figure 11B:
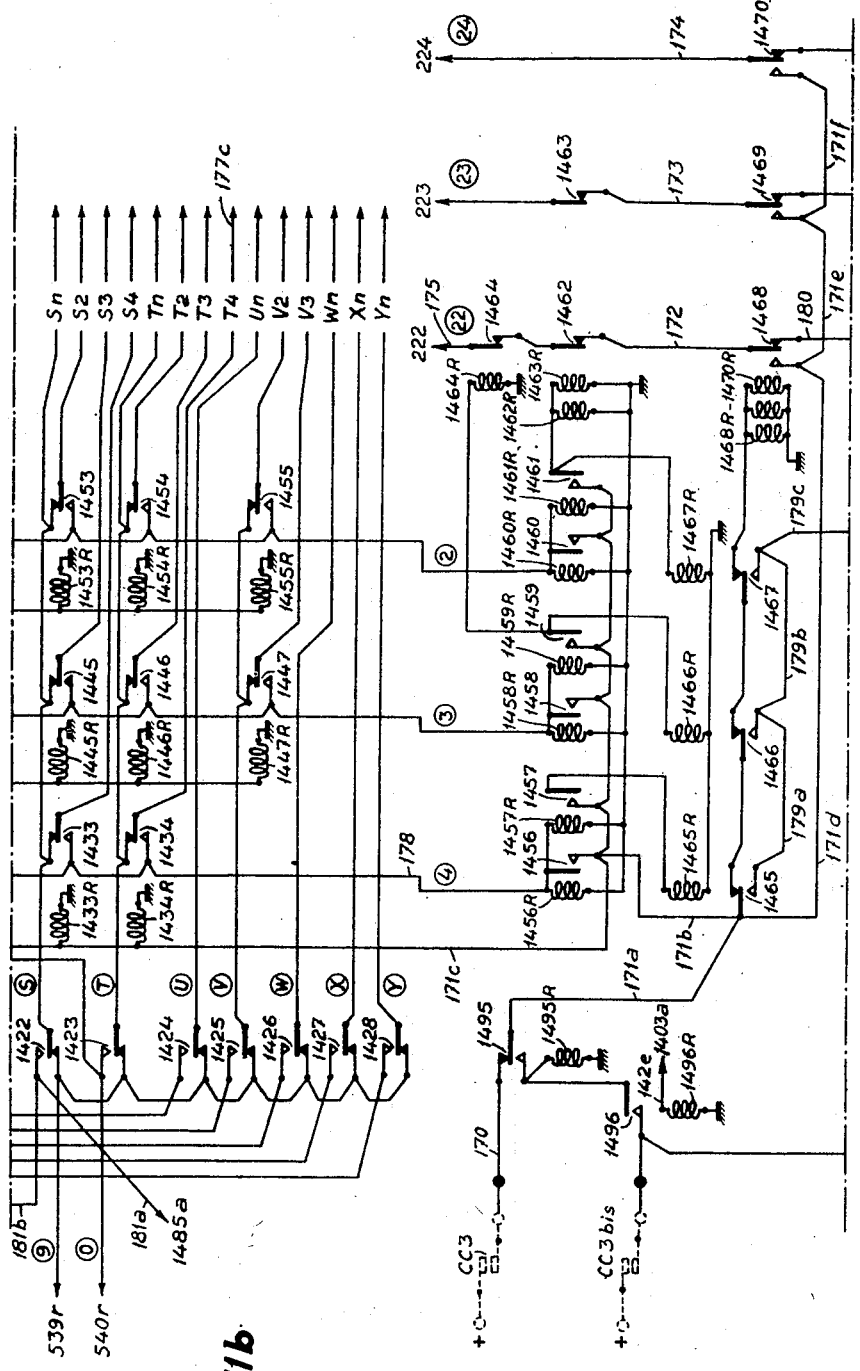

Fig. 11 shows the mode of assembling Figs. 11a, 11b and 11c.

Figs. 11a, 11b and 11c constitute a circuit diagram of the "syllable cut-out" device.

Figure 12:
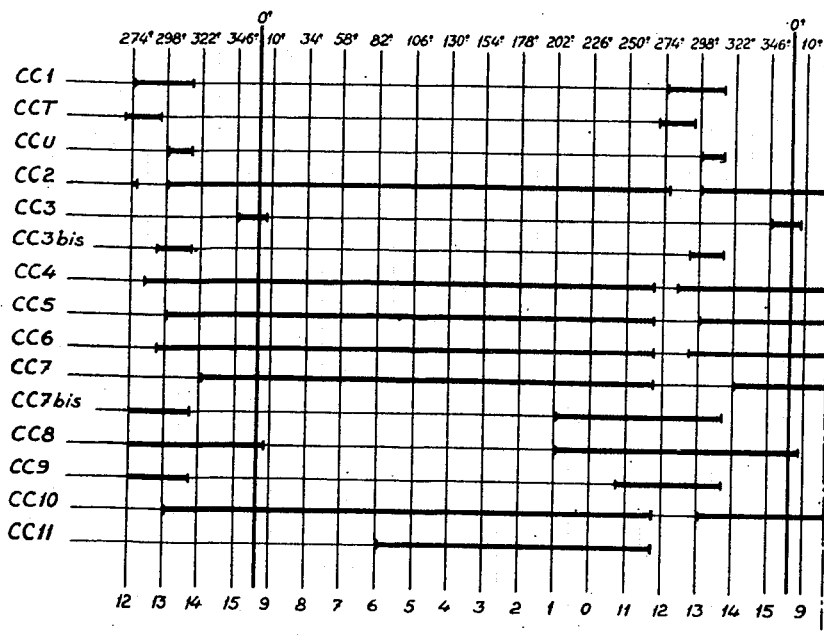

Fig. 12 is a timing chart for the cam-operated contacts ensuring the operation of the apparatus.

Figs. 13 and 15 illustrate two examples of amount wordings to be printed.

Figs. 14a, 14b, 14c, 16a, 16b show symbolic representations of the conditioning of the "place number totalizer" in relation with said examples.

Figure 17:
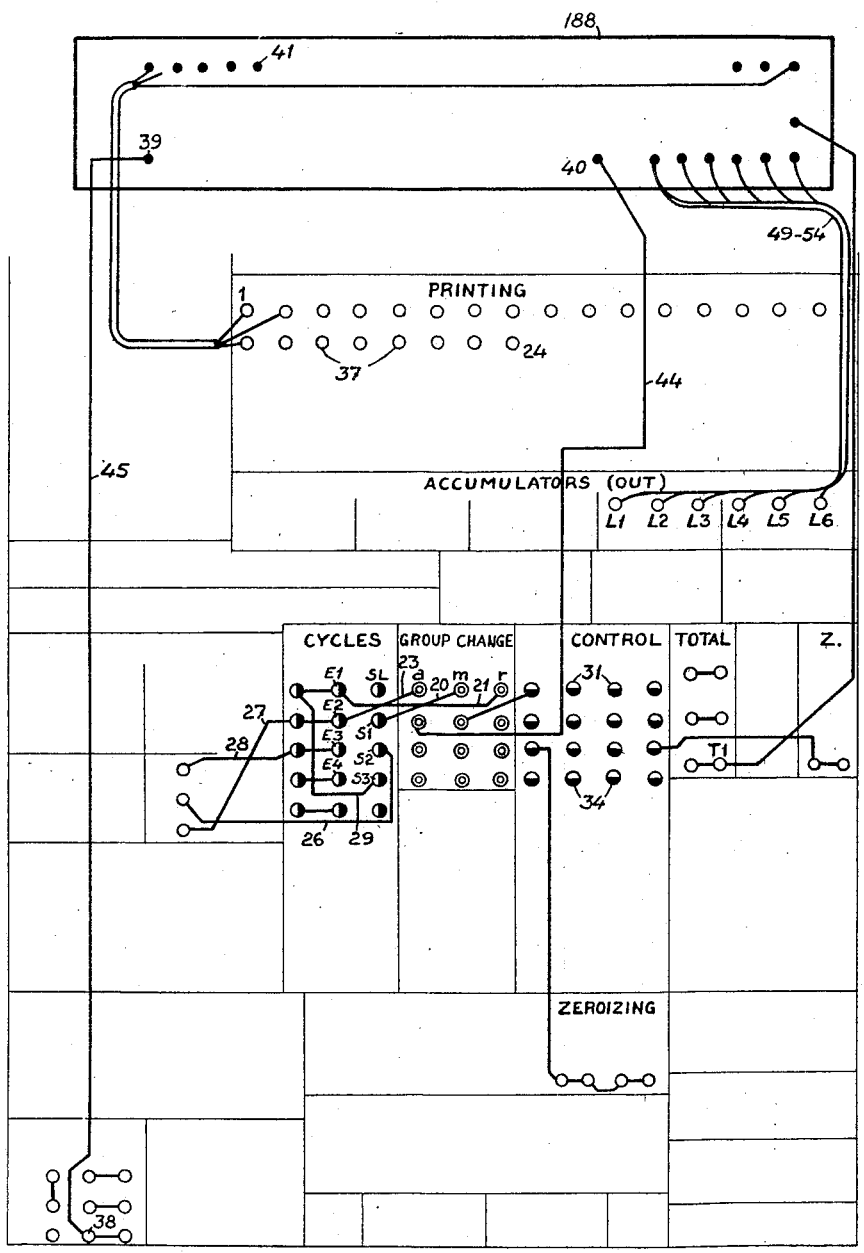

Fig. 17 is a partial view of the plugboard of the tabulator showing some plug-connections in relation with the invention purposes.

The machine used for embodying the invention is a printing tabulator of a known type, operated electrically and controlled by records.

This machine operates through cycles functionally independent, each machine cycle being divided, in the present case, into 15 points or intervals. As only a small part of the control circuits are involved in the invention, this part is represented by the Fig. 1, which permits the explanations for starting the machine and automatic succession of cycles.

The groups of relays 1, 2 and 3; 5 and 6; 8 and 9; 11 and 12 are four groups among twelve groups designated "1st phase relays"; the relays 4, 7, 10, 13 are four relays among twelve relays designated "2nd phase" relays. The whole is adapted to govern the execution of twelve different cycles, and in relation with other control devices, the repetition of certain cycles.

The starting of the machine and succession of cycles may be explained as follows, with reference to Figs. 1 and 2.

Figure 1:
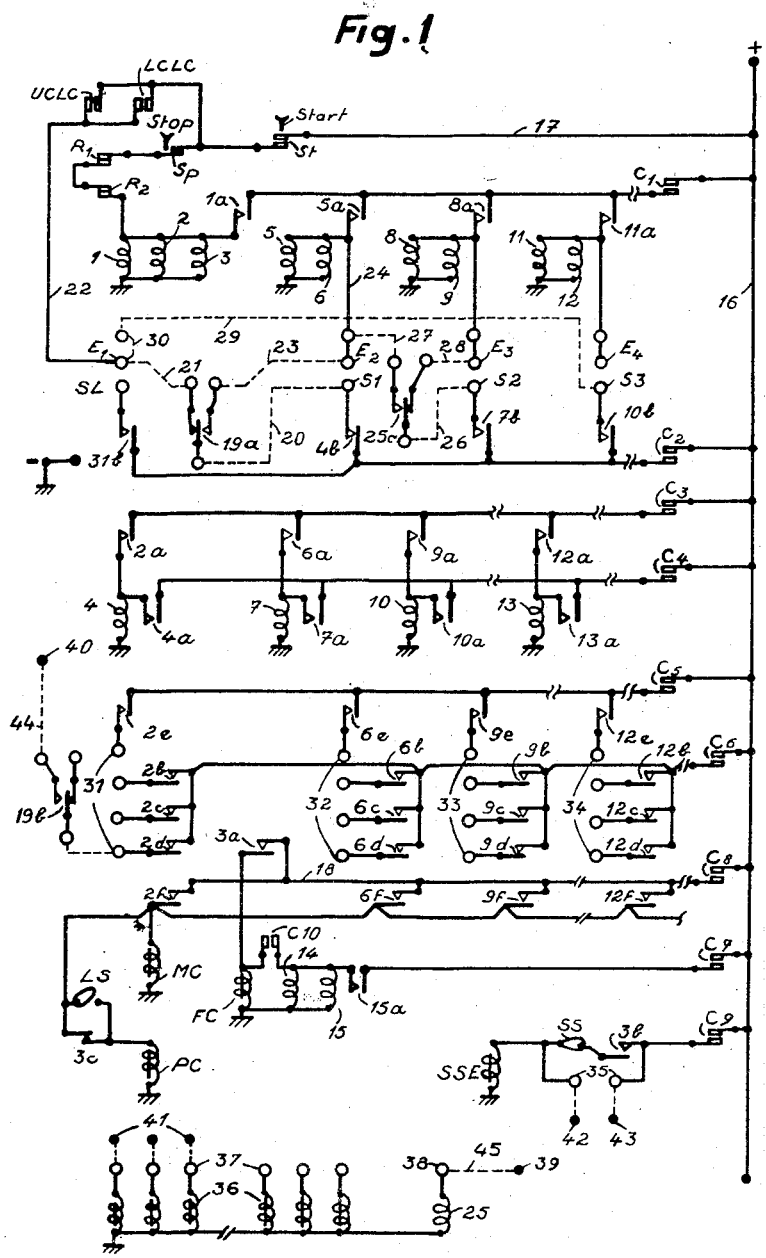
Fig. 1 is a circuit diagram of some circuits of the tabulator cooperating with the printing control apparatus.

It must be noticed first that the dash lines visible on Fig. 1, top, represent plug connections disposed on the plug-board of the machine in view of using the devices object of the invention. When disposed as shown, said plug-connections permit the automatic repetition of several so-called cycles No. 1, devoted to feeding and reading record cards as long as group change control devices remain inactive. Upon such a group change there is initiated a succession of so-called cycles No. 2 devoted, for the purpose of the invention, to the printing of a complete wording corresponding to a total formed in a suitable accumulator. These printing cycles are followed by a so-called cycle No. 3 devoted to the resetting of said accumulator. Afterwards, the machine goes through automatic operation achieving one or several cycles No. 1 and so on.

Initially, the operator depresses the "Start" key, thereby completing a circuit from positive terminal +, through wires 16, 17, contacts St now closed, Sp (Stop key), R1, R2 normally closed, relay coils 1, 2 and 3 in parallel, to ground and negative terminal which energizes said relays. The contact R1 is opened when the card hopper is empty and R2 is opened when the card receptacle is filled up with cards. The closing of contact 2f causes the establishing of a circuit from the positive terminal +, through wire 16, cam-operated contact C8 now closed, wire 18, contact 2f, clutch electromagnet MC, to the ground and negative terminal —, actuating said electromagnet. Said clutch being operative, the general shaft of the machine is coupled with the shaft of an electric motor assumed to be in operation, so as the machine may initiate a first cycle. At the same time, another circuit is completed from positive terminal +, through wire 16, cam contact C8, wire 18, contact 3a now closed, the card feed clutch electromagnet FC, to ground, actuating said electromagnet. Consequently, a card is fed forward out of the card hopper and passes under the upper reading brush structure, where it is analysed. Obviously, as there is not yet any card under the lower reading brush structure, the group change control devices detect an unequality in group numbers but some organs non-represented on Fig. 1 ensure the execution of a second cycle No. 1 during which the first card is fed past the lower reading brush structure, while a second card is fed past the upper reading brush structure. Under the control of said organs, contacts 19a and 19b stay in normal position during the first cycle No. 1.

Afterwards, in course of normal functioning of the machine, the cam-contact C3 closing from 244° to 268° on the second cycle No. 1 permits the completion of an energizing circuit for the relay 4 (2nd phase cycle No. 1) through the closed contact 2a controlled by relay 2. When the cam-contact C4 closes at 246° a holding circuit is ensured for relay 4 through its contact 4a. A pulse of cycle end is produced by C2 closing from 310° to 334° and transmitted through contact 4b to the plug socket S1. If it is assumed that the cards actually traversing upper and lower reading brush structures bear equal group numbers, the group change control device remains inactive and the contact 19a remains in the position shown.

The pulse of cycle end finds a circuit which extends from positive terminal + through wire 16, cam contact C2, contact 4b closed, plug-wire 20, contact 19a normal, plug wire 21, wire 22, card lever contacts UCLC (Upper) and LCLC (Lower), closed contacts Sp, R1, R2 normally closed, relay coils 1, 2, 3 to the ground, energizing said relays. These relays are held energized through contact 1a and cam-contact C1 till 274° on the following cycle, thus permitting the repetition of cycle No. 1 as long as there is no group number change.

In case of such a change, the contact 19a will be transferred at the time of said pulse of cycle end, causing this pulse to find a path which continues from plug-wire 20, through contact 19a transferred, plug-wire 23, plug-socket E2, wire 24, relays coils 5 and 6 to the ground, energizing said relays, of 1st phase of cycle No. 2. During this cycle No. 2 the relay 7 of 2nd phase will be energized and a pulse of cycle end going through contact 7b closed will ensure the repetition of a second cycle No. 2 owing to the transferring of the contact 25a controlled by the relay 25 (Fig. 1 bottom).

The control of relay 25, which is one of the "selection" relays is effected by devices embodied in the printing control apparatus and will be explained later. For the moment, it is sufficient to know that, when the printing of an amount wording is over, the contact 25a returns to normal position and therefore the pulse of cycle end is sent towards the relays 8 and 9 of 1st phase of cycle No. 3 or resetting cycle. About the end of this cycle, relay 10 is energized and a pulse of cycle end, conditioned by the contact 10b closed, is transmitted through plug-socket S3, plug-wire 29, two-prong connector 30, plug socket E1 and through the circuit previously traced to the relays 1, 2 and 3, thereby initiating a new cycle No. 1. The machine goes on functioning in the same way as previously described.

It is readily seen that, during any cycle No. 1, the plug-sockets 31 are under voltage due to the closing of cam contacts C5 and C6, that plug-sockets 32 are under voltage during any cycle No. 2, and that plug-sockets 33 are under voltage during any cycle No. 3, which permits to feed suitable organs through plug wires non-represented.

It is seen as well that the clutch electromagnet MC is energized at any cycle through one of the contacts 2f, 6f, 9f, 12f, etc.; that the clutch electromagnet PC controlling the printing mechanism is energized during any cycle other than the cycle No. 1 with the condition that the List Switch LS be opened as shown; and that the clutch electromagnet FC is energized at any cycle No. 1.

The electromagnet with reference SSE (Fig. 1, bottom) is intended to control "interline" or "space suppressing." The printing mechanism is normally fitted with mechanical parts which automatically bring a paper movement over a line space interval, at each printing cycle.

When it is necessary that the paper be not forwarded, the electromagnet SSE is then energized and its effect is to nullify the action of said mechanical parts. As obvious, during any cycle No. 1, closing of the contact 3b provides an energizing circuit for electromagnet SSE. This circuit extends from the positive terminal +, through wire 16, cam contact C9, contact 3b, switch SS in closed position, electromagnet SSE to the ground. For preventing the space movement electromagnet SSE must be energized at least from 10° to 58° on the cycle. Two plug-sockets 35 located on the plug board make possible to control said electromagnet through other control organs during other cycles than cycle No. 1. Such organs are provided in the printing control apparatus as will be described later.

Fig. 1 bottom also shows a set of printing electromagnets 36, each being assigned to a printing position and connected to a plug socket 37 on the plugboard. In the present machine the printing mechanism comprises 92 printing positions. The printing mechanism is of a type in which each electromagnet can receive two timed pulses during a printing cycle.

By way of example, in the Bull tabulator, the alphabet letters are represented by timed pulses according to the following code:

A:7–11    Q:8–5
B:7–0     R:8–6
C:7–1     S:9–11
D:7–2     T:9–0
E:7–3     U:9–1
F:7–4     V:9–2
G:7–5     W:9–3
H:7–6     X:9–4
J:8–11    Y:9–5
K:8–0     Z:9–6
L:8–1     I=1
M:8–2     O:0 (zero)
N:8–3     .:11
P:8–4

Figure 2:
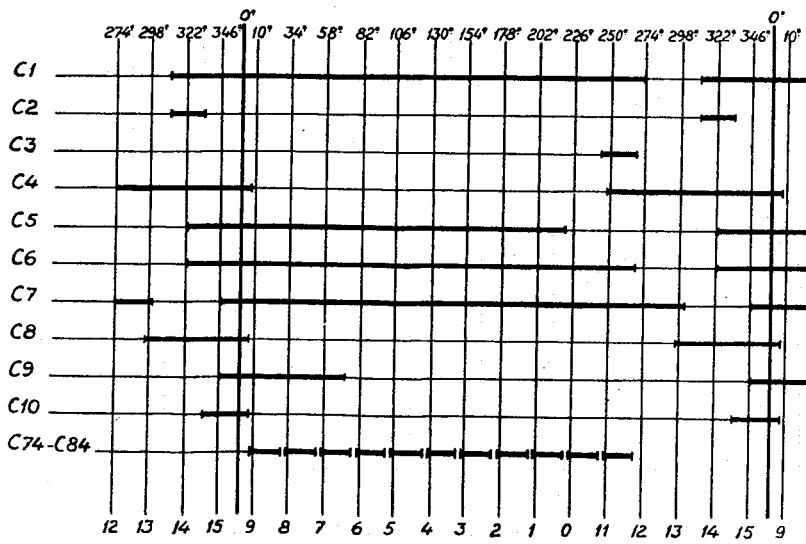
Fig. 2 is a timing chart for cam-operated contacts shown in Fig. 1.

The number and digits indicate the points of occurrence of pulses in a machine cycle, as shown on Fig. 2.

As the apparatus, object of the invention is constructed in form of a circuit and relay box separate from the tabulator, this box is connected to the machine through a multi-wire cable carrying out the electric link between two terminal panels, one of which being attached to the machine, the other to the apparatus. On the circuit diagrams such terminals are each represented by a thoroughly blackened circle to differentiate from plug-sockets represented each by a circular tracing. It is obvious that, if the printing control apparatus was originally embodied in a tabulating machine of new construction, such cable and terminal panels should be replaced by internal wiring.

The invention principles may be broadly understood by examining the block diagram shown by Figs. 3a and 3b taken together according to Fig. 3.

On Fig. 3a, the read-out commutator is an integrant part of the tabulator and is designed to manifest a sum of money. At the right hand side, two denominational orders are devoted to manifest the "cents" digits of the amount registered, and at the left hand side, four denominational orders are devoted to manifest the "dollars" digits of the amount.

Although not altogether proper, some relay assemblies or circuits arrangements are referred to hereinafter as devices.

The "amount sensing" device cooperates with the readout commutator to detect the presence of zeros in a stored amount as also the position of the first significant digit from the left hand side of said amount. As the highest order containing a significant digit is concerned, the first sensing operation is accompanied by: (1) the translation of said digit; (2) the determination of an "Order" word.

The translation of a digit results in the determination of a "digit" word in relation with its numerical value. Said determination is effected, in cooperation with the "Amount sensing" device and the read-out commutator, by one of the "Tens" or "Units" digit word determination" device, as will be explained shortly.

The "Order" words are: Thousand, Hundred, Dollars and Cents as the determination of one of them only depends on the denominational order containing the significant digit instantly translated. This function is effected by the "Order word determination" device, cooperating with the read-out commutator.

The "Amount sensing" device is adapted for considering a previously translated digit as a zero and consequently the following sensing operation will involve the next significant digit in a lower order.

The "Amount sensing" device is also adapted to control the concurrent translation of adjacent "Tens" and "Units" digits, either in the "Dollars" portion or in the "Cents" portion.

If there is only one significant digit, the digit 1 excepted, at a "Tens" order, a "Tens" digit word among Twenty to Ninety will be determined by the "Tens" corresponding device. If there is only one significant digit at a "Units" order, a "Units" digit word, among One to Nine will be determined by the "Units" corresponding device. Finally, if one of the numbers 10 to 19 is manifested on the "Tens" and "Units" orders of the read-out commutator, a word among Ten to Nineteen will be determined by the "Units digit word determination" device.

A concrete example will make the foregoing clearer. Assume that the amount $602.35 be manifested on the read-out commutator. Conventionally represented, the amount pattern is: 0x0xxx, an "x" meaning a significant digit. The "Amount sensing" device initiates a sensing operation where only the digit 6 is involved, the word Hundred is determined in the "Order word determination" device and the word Six is determined in the "Units digit word determination" device. After printing of the determined words as will be clear later, the "Amount sensing" device initiates a second sensing operation, during which it considers the amount stored as: 000XXX and only involves the digit 2. The "Order word determination" device determines the word Dollars while the "Units digit word determination" device determines the word Two. After printing of said determined words the "Amount sensing" device initiates a third sensing operation during which it considers the amount stored as: 0000XX and involves concurrently the digits 3 and 5. The "Order word determination" device determines the word Cents, the "Tens digit word determination" device determines the word Thirty and the "Units digit word determination" device determines the word Five.

At each sensing operation one or two "Order word formation" device is or/are brought into play. The "Order word formation" device No. 1 is adapted to form one of the words cited before: Thousand, Hundred, Dollars or Cents, when determined. The "Order word formation" device No. 2 is adapted to form the word And or eventually the words And Nc, under control of the "Order word formation" device No. 1. When brought into play the "Tens" and "Units" digit word determination devices control respectively the "Tens" and "Units" digit word formation devices. All the word formation devices quoted before receive the letters in form of timed pulses through the "Letter formation" device, which itself receives said pulses from a pulse distributor mounted in the tabulator.

Each word formation device is associated with organs constituting a "place number determination" device effective to determine the number of printing places corresponding to a word formed by the word formation device associated. The number so determined equals the number of letters of the formed word plus one unit representing a space assumed to follow said word.

After each amount sensing operation, the "place number totalizer" (Fig. 3b) receives the determined numbers. The totalizer comprises: four counters referenced, in the order shown: "Order No. 2," "Tens," "Units" and "Order No. 1"; a register device referenced "Storage" and a further counter referenced "Previous total." It is adapted for making the Storage device manifest the horizontal summing up of the numbers introduced in the counters. After each printing operation, the resulting total is transferred from the storage device to the "previous total" counter.

Fig. 3b shows also four "shift arrangements" referenced "Order No. 2," "Tens," "Units" and "Order No. 1." The entry terminals of each shift arrangement are connected to an associated word formation device by multiple connections, the number of which corresponding to the maximum number of letters to be transmitted. All the exit terminals of the shift arrangements are connected in parallel to the printing mechanism.

The "Place number totalizer" operates in such a way that each counter, receiving a printing place number, manifests the sum of the number that it received itself and of these numbers received by the counters preceding it in the order stated hereinbefore. Furthermore, each counter governs a control device which controls a shift arrangement. The control in question is selective that is, for example, the shift magnitude applied to the "Units" shift arrangement depends on the place number manifested by the "Tens" counter. The other shift arrangements are controlled in a similar manner, the Fig. 3b being self-explanatory in this respect.

As a special case of application, each printing line of a check or money-order form to be printed has a number of printing places lesser than the number of letters necessary for the printing of the literal wording of a sum of money, the amount of which is registered in the accumulator of the tabulating machine. In other words, for a given capacity of the accumulator of the tabulating machine and a given number of printing places (and spaces) in a printing line, it may occur that the wording of an accumulated amount would necessitate one, two or more such printing lines.

According to the invention, provisions are made to solve this problem.

The number of printing electromagnets used in the printing mechanism, equals a predetermined printing place number for each printing line, each shift arrangement being provided with the same number of exit circuits. In the present case, this number is 24.

Said shift arrangements are constructed with a systematic shift of 8 ranks, considering the extreme left hand input circuit with respect to the extreme left hand exit circuit in each shift arrangement. Fig. 3b sets out this characteristic. The purpose of said systematic shift will be clear later.

In the place number totalizer, each counter is of the coded relay type, that is, each counter is composed of relays assigned to components of a combinational code. In the present case the binary code is used and the entry capacity of each counter equals the number of printing places per line, say 24, plus the number representing said systematic shift, say 8, minus one unit, which yields: $24+8-1=31$.

Each counter is adapted for the vertical transmission of eventual binary carries and is fitted with a so-called "32 carry" device capable of detecting when the entry capacity of the counter has been exceeded, either after direct introduction of numbers or transfer of carries.

Sensing control circuits cooperate with the whole of said "32 carry" devices in such a way that, on one hand, a so-called "Skip to next line" device is actuated whenever a "32 carry" appears in one counter before a printing operation, and on the other hand, the shift arrangements are bodily controlled for permitting only that part of a wording not exceeding the printing line to be printed.

On a following cycle of operation, said sensing control circuits cooperate in a different way with said "32 carry" detection devices so as to now bodily control the shift arrangements for permitting the printing on the next printing line, of the remaining part of the previously formed wording.

The shift arrangements have respectively, according to the downward order (Fig. 3b), 6, 8, 9 and 7 input circuits. Due to the systematic shift referred to before, it follows that any of the shift arrangements is in "no-pass" condition when no shift control is applied to it, except for the "Units" shift arrangement where one input circuit is "passing" in the same case.

In order that the shift arrangements be in "pass" condition, that is, that the extreme left hand input and exit circuits be aligned in each shift arrangement, the same must receive a shift control of 8 ranks before commencing a new printing line.

For that reason, an "8 adding" device is provided in the place number totalizer (Fig. 3b). On the block diagram, this device appears as a rectangle marked "+8." This device is made effective to add the value 8 at the entry of the totalizer, first under control of starting circuits of the apparatus (non-represented), and then, under control of the "skip to next line" device. This adding of +8 takes place in the period of totaliser conditioning, after the entering of place numbers in the counters.

When a partial or complete wording exceeds the capacity of a printing line, the "skip to next line" device is made operative for calling several holding circuits into activity.

In such a case two holding circuits control the "Tens," "Units," and "Order" word determination devices so as they maintain the determined words during a further cycle; another holding circuit prevents the transferring of the actual total in the totalizer storage device, from this device to the "previous total" counter.

The words that may be formed are of essentially variable length and due to this fact, a syllable in a to be printed word may lie astride on the extremity of the line to be printed or 24th printing position.

A "syllable cut-out" device is inserted in the circuit paths of the 22nd, 23rd and 24th printing positions. Provisions are made to differentiate the first letter of each syllable, or syllable initial, from other letters and to differentiate syllable initials between themselves, according to the number of letters of the syllables to which they may pertain. Suitable means are provided for this purpose although not symbolized on the block diagram. They permit the "Syllable cut-out" device to achieve a syllable initial search through the 22nd, 23rd and 24th circuit paths before printing of a partial formed wording. During the correlated printing cycle means are effective in the "Syllable cut-out device" to cut out one, two or three of siad circuit paths according to the kind of syllable initial detected and the position of said initial.

After said printing cycle, others organs in the "Syllable cut-out" device are effective to control a device referenced "Further shift" in the place number totalizer for causing it to add at the entry side the digit one, two or three according to the fact that one, two, or three circuit paths have been cut out.

The operation and purposes of the various devices will be best understood thanks to examining the circuit diagrams of the printing control apparatus.

Fig. 4 shows a conventional mode of indexing for a standardized relay. The entry terminal of the relay coil bears the reference y; the terminal for ground return has no special reference. The terminals corresponding to the blades of change-over contact structure bear the references: m, for the "middle" blade, r for the "rest" blade and a for the "actuated" position blade.

On many drawings cam-controlled contacts are represented by dashed lines in order to indicate that such contacts are, in fact, incorporated in the connected tabulating machine.

Amount sensing and word formation devices (see Figs. 5a to 5k): Fig. 5a concerns, especially in the rectangle in dashed lines, circuits of the tabulating machine, which are used in correlation with the present invention.

The circuits of the read-out commutator of a well known registering or accumulating device are represented on the left hand part of said figure. Each denominational order is provided with a common segment 46 and a brush structure 47. The separate segments 48 are connected together in horizontal lines according to the values of digit assigned to each of them. Contacts C74—C84 constitute a pulse distributor. Said pulses are regulated by the contact C85 of a breaking device and their timing is given by Fig. 2. Relays 521R—530R are energized during the printing operations from terminal T1 under control of the printing control apparatus as will be explained later.

Plug-sockets L1—L6 on the plugboard are connected by plug-wires 49—54 to terminals 55 on a terminal panel. The same panel bears terminals 56 directly connected to contacts C74—C84. A six-wire cable connects terminals 55 of the tabulator to the terminals Th—Uc of the control apparatus. A number of wires 58 connect the terminals 56 of the tabulator to the terminals 59 of the apparatus.

During the period of about 0° to 268° of each printing cycle, contacts 531—539, 540 are in the position shown by the drawing. Thus the pulses produced by contacts C74—C84 are sent, through a group of wires 60 to the letter formation device. On the drawing, said wires are each ended by an arrow with the indication of the contacts points 1411a—1423a to which they are connected.

The letter formation device (see Figs. 11a–11b) comprises a set of relays 1411R—1428R controlled by cam-controlled contact CC11. Each contact controlled by one of these relays is assigned to an alphabet letter. The whole of the contacts are interconnected in such a way that, from the pulses received through the left hand wires, two pulses corresponding to a letter considered are available at the output of each contact, that is, on the right hand wire.

For instance, due to the fact that contacts 1411—1428 are transferred from the 6 time to the 11 time inclusive of the machine cycle, the top wire marked An may receive a pair of pulses of 7 and 11 times. The rest of the figures will be examined later.

Turning back to Figs. 5a–5d, the purposes of the relays on Fig. 5b (amount sensing device) are summarized in the following table:

| Relay purposes | Denominational orders | | | | | |
|---|---|---|---|---|---|---|
| | Th | H | Td | Ud | Tc | Uc |
| Zero detection | 566R | 567R | 569R | 571R | 573R | 575R |
| | | 568R | 570R | 572R | 574R | 576R |
| Significant digit detection: | | | | | | |
| Separate | 577R | 578R | 579R | 581R | 583R | 585R |
| Conjugated | | | 580R | 582R | 584R | 586R |
| Sending one sensing pulse | 549R | 552R | 555R | 556R | 559R | 560R |
| | 550R | 553R | | 557R | | 561R |
| Holding for preventing repeated sensing of any previously translated digit. | 543R | 544R | 545R | 546R | 547R | 548R |
| | 551R | 554R | | 558R | | 562R |

The circuits of the "Order word determination" device are represented on Fig. 5c. The purposes of the corresponding relays are summarized in the following table:

| Relay purposes | Order Words | | | |
| --- | --- | --- | --- | --- |
| | Thousand | Hundred | Dollars | Cents |
| Pick-up | 591R | 588R | 594R | 597R |
| Holding (one or several cycles) | 592R | 589R | 595R | 598R |
| Holding (the whole printing operation) | 605R 606R 608R | 601R 602R 604R | 609R 610R 612R | |
| Holding transfer | | | | |
| Control | 593R 607R | 590R 603R | 596R 611R | 599R 615R |

On the same figure, the relay group 616R—618R starts the control apparatus into operation under control of an order given by the tabulating machine. The relay group 622R—624R serves to manifest the last printing cycle and controls the tabulating machine for stopping the printing cycle succession.

Other relay purposes are:
Maintained detection of a significant digit at Td or Ud orders: 613R (pick-up), 614R (holding), 619R (control);
Maintained detection of a significant digit at Tc or Uc orders: 621R (pick-up), 620R (holding), 680R (control).
Manifesting the fact that the Order word "Hundred" has been formed upon a preceding cycle: 625R.

The "Order word formation" device (Figs. 5c bottom, and 5d) comprises several groups of relays, each group being assigned to the formation of a separate order word. For instance, the relay group 634R—638R (Fig. 5d) controls the formation of the word Cents, which formation amounts to the closing of contacts 634—638 inserted, but non-represented, in horizontal wires such as wires 113. On the left hand side of said wires, arrows and reference numerals indicate the contacts points of the letter formation device to which they are connected. For instance, contact 634, when closed, permits the transmission of two 7 and 1 pulses representing the letter C according to the letter coding hereinbefore mentioned.

The groups of said horizontal wires resolve in a group of vertical wires such as 114, which run till the entry contact points of the "Order shift arrangement" No. 1.

Five wires referenced 115 (Fig. 5c) are connected between the letter formation device and the "Order shift arrangement" No. 1.

Five wires referenced 115 (Fig. 5c) are connected between the letter formation device and the "Order shift arrangement" No. 2.

One or several "Place number determination" relays are connected in parallel with each relay group of the "Order word formation" devices.

For instance, relays 639R and 640R are energized along with relay group 634R—638R for formation of the word Cents. When contact 639, 640 are closed, wires 118, 117 are set under voltage, this fact resulting in the entry of the number 6 into the "order No. 1" counter of the "place number totalizer," as will be explained later. The number 6 corresponds to the number of letters of Cents (5) plus one space:

In the same way, when contacts 649, 650 are closed, wires 116, 119 are set under voltage, this fact resulting in the entry of the number 9 into said counter, the number 9 corresponding to the letter number of Thousand (8) plus one space.

The operation of the devices heretofore mentioned will now be examined. Assume that two cards fed past the reading stations of the tabulator bear different account numbers taken as group control numbers. In course of a No. 1 cycle in which an amount is entered from the low card into the suitable accumulator, a group number change is detected. Thus relay 616R (Fig. 5c) can be energized till 268° on the instant cycle, the energization circuit being=terminal + (Fig. 1), wire 16, cam-controlled contact C6, contact 2d closed, contact 19b transferred, wire 44, terminal 40 (Figs. 1–5c), relay coil 616R to the ground. When cam contact C3 closes, from 244° to 268° on the cycle, an energization circuit is completed, through contact 616 closed, to energize relay 617R. Closing of contact 617 causes the held energization of relays 618R and 600R, the holding circuit being: terminal +, wire 72, contact 623 normally closed, wires 73b, 73c, contact 618 closed, relay coil 618R to the ground. Consequently, wires 74, 75 and 76 are set under voltage during all the time for printing the complete wording corresponding to the amount set on the read-out commutator. It may be seen, Fig. 5b, that relay 555R is energized during the same time, from wires 75, 75a—75d.

During the closing of contact 618, a control circuit is established: Terminal +, wire 72 (Fig. 5c), wires 73b, 73c, contact 618 closed, wire 74a, terminal 39 (Figs. 5c, 1), wire 45, terminal 38, relay coil 25 to ground, energizing said relay. Transfer of the contact 25a permits the repetition of the cycle No. 2 or printing cycle, as long as contact 618 remains closed.

The end part of the second No. 1 cycle constitutes the first sensing phase of the now registered amount. Upon closing of cam-contact CC1 (Fig. 5c) from 274° to 316° on the present cycle, and due to the closing of contacts 600, 599, 596, 593 and 590, wires 62 (Figs. 5c, 5b), 67, 68 and 63 (Figs. 5b, 5a) are set under voltage and relays 563R, 531R—540R then 564R are energized.

On the other hand, the closing of contact 565 permits the completion of the circuit: terminal +, cam-contact CC9 (Fig. 10f) contact blade 1406r, wire 124 (Figs. 10f, 5b) contact 565 closed, terminal T1 (Figs. 5b—5a), relay coils 521R—530R to ground. It follows that, when the control apparatus is set in activity, relays 521R—530R are energized at each closing of cam-contact CC9. From 274° to 316° on the cycle, detection of eventual zeros is effected by the establishing of a common circuit: from wire 63 (Figs. 5b, 5a) wire 64, contact 540 transferred, wire 65, contact 530 closed, wire 66. Said circuit subdivides eventually in several separate circuits from brush structures set in zero position.

Such separate circuits will be examined in relation with some illustrative examples.

Case No. 1.—Amount pattern: 0x00.00, in which the sign x means a significant digit at the hundred (H) order. For instance, at the thousand (Th) order, a circuit continues from wire 66, through "0," separate segment 48, brush structure 47, common segment 46, terminal L1, wire 49, terminal Th (Fig. 5b), contacts 543, 549 normally closed, relay coil 566R to ground. It is clear that other parallel circuits cause the energization of other zero detection relays 569R—576R. Among contacts 566—576 in the priority circuits only contacts 567, 568 are not transferred. It follows the energization of several relays, namely:

(a) Significant digit detection relay 578R from wire 71, through contact 566 transferred and contact 567 normal.

(b) Pick-up relay 588R for determination of the order word Hundred from wire 68 through cam-contact CCU (closing from 298° to 316°), wire 70, contact 578 closed, wire 80 (Figs. 5b, 5c), relay coil 588R to ground.

(c) Pick-up relay 594R for determination of the order word Dollars, from wire 71, through contact 566 transferred, contact 567 normal, wire 125, contact 568 normal, contacts 570, 572 transferred, wire 81 (Figs. 5b, 5c), relay coil 594R to ground.

(d) Pick-up relay 597R for determination of the order word Cents from contact 572 transferred, through wire 88, contacts 574, 576 transferred, wire 89 (Figs. 5b–5c), relay coils 597R to ground.

So, the order words Hundred, Dollars and Cents are concurrently determined.

During the closing of cam-contact CCU, another circuit is completed from wire 70, through contact 578 closed, wire 79, relay coils 552R, 553R to ground. The transfer of contact 552 results in sending a sensing pulse on a circuit which continues from contact 552 transferred, through contact 544 normal, terminal H, a wire of the cable 57 (Figs. 5b, 5a), wire 50, terminal L2, common segment H, brush structure 47, say on the 7 separate segment 48, wire 127, contact 523 closed, contact 537 transferred, wire 107, and then to the "Units" digit word determination device, the operation of which will be explained later.

The transfer of contact 553 (Fig. 5b) causes the energization of holding relay 554R. After 316° on the cycle, when contacts 552 and 553 return to normal position, relay 544R becomes energized, the holding circuit running from wire 75b, contact 554 closed, contact 553 normal, relay coil, 544R, to the ground. Another circuit is completed, from wire 75b, contact 554 closed, contact 553 normal, contact 544 transferred, contact 552 normal, relay coils 567R, 568R to ground, energizing said relays. Thus, the "zero detection" relays of the Hundred order remain energized during the whole printing operation.

*Case No. 2.*—Amount pattern: x0x0.x0. It is readily seen that, during the first sensing phase, delimited by the closing of cam-contact CC1, the following relays will be energized: (Fig. 5b), 567R, 568R; 571R, 572R; 575R, 576R for zero detection; 577R for significant digit detection.

By reason of the contact 566 being in normal position, no other significant digit detection relay than 577R can be energized for the moment. Contact 577 being closed during the closing of cam-contact CCU, a sensing pulse is sent through wire 77 and the thousand order of the read-out commutator to the "Units" digit word determination device. At the same time relay 591R (Fig. 5c) is energized, through contact 577 and wire 78, thus manifesting the determination of the order word Thousand. From the foregoing, it is clear that, after 316° on the present cycle, relay 566R becomes and remains energized, manifesting that a significant digit has been sensed and translated.

During the following cycle the order word Thousand and the digit word determined and formed by the suitable devices will be printed, as will be explained later.

During the sensing phase of this cycle, the amount pattern is treated by the amount sensing device as: 00x0.x0. Besides relay 566R remaining energized, the zero detection relays energized from 274° to 316° are: 567R, 568R; 571R, 572R; 575R, 576R. For significant digit detection at the "Tens" (dollars) order, relay 579R is energized by a circuit path which runs from wire 71 (Fig. 5b), through contacts 566, 567 transferred, contact 569 normal, relay coil 579R to the ground. Relays 580R and 582R, in parallel with relay 579R, are energized at the same time. Another circuit path continues from contact 569 normal, through wire 90, contact 570 normal, contact 572 transferred, wire 81 (Figs. 5b, 5c), relay coil 594R to the ground, energizing said relay, for determination of the order word Dollars.

From 274° to 294°, the closing of cam-contact CCT (Fig. 5b) causes the energization of relay 555R and sends a sensing pulse on a circuit from wire 67, cam-contact CCT, wire 69, contact 579 now closed, contact 555 transferred, contact 545 normal, contact 541 normally closed, terminal Td, etc., towards the "Tens" digit word determination device.

From 298° to 316°, the closing of cam-contact CCU causes the energization of relays 556R, 557R and sends a sensing pulse on a circuit from wire 68, cam-contact CCU, wire 70, contact 582 now closed, wire 83, contact 556 transferred, contact 546 normal, terminal Ud, etc. The brush structure in the read-out commutator being by hypothesis, in zero position, said sensing pulse does not find any circuit path.

At 316°, when contacts 556 and 557 return to normal position, relays 545R and 546R become energized; they transfer their contacts, permitting the held energization of zero detection relays 569R—572R.

During the following cycle, the order word Dollars and the digit word determined and formed by the suitable devices will be printed, as will be explained later.

During the sensing phase of this cycle the amount pattern is treated by the amount sensing device as: 0.00.X0. Besides relays 566R, and 569R—572R, the zero detection relays energized from 274° to 316° are: 567R, 568R; 575R, 576R. For significant digit detection at the "Tens" (cents) order, relay 583R is energized by a circuit path which runs from wire 71, contacts 566, 567, 569, 571 transferred, contact 573 normal, relay coil 583R to the ground. Relays 584R, 586R, in parallel with relay 583R are energized at the same time. Another circuit path continues from contact 573 normal, through wire 85, contact 574 normal, contact 576 transferred, wire 89 (Figs. 5b, 5c), relay coil 597R to the ground, energizing said relay, for determination of the order word Cents.

As before, a sensing pulse will be sent, but now, through the Tc terminal towards the "Tens" digit word determination device. During the following cycle, the order word Cents and the digit word determined and formed by the suitable devices will be printed.

*Case No. 3.*—Amount pattern:0XXX.00—it may be seen that, during the first sensing phase, the following relays are energized. Zero detection: 566R, 573R—576R (Fig. 5b). Significant digit detection: 578R. Hundred order word determination:588R (Fig. 5c).

As in case No. 1, the order word Hundred is determined and a sensing pulse is sent through terminal H (Fig. 5b) towards the "Units" digit word determination device. But, this time, no other order word is determined.

During the following cycle, the order word Hundred and the digit word determined and formed by the suitable devices will be printed.

During the sensing phase of this cycle, the amount pattern is treated as: 00XX.00. Besides relays 567R, 562R, marking that a significant digit was translated at the H order, zero detection relays 566R, 573R—576R are energized.

A circuit is completed from wire 71, through contacts 566, 567 transferred, 569 normal, relay coil 579R to the ground energizing said relay, for significant digit detection at the Td Order. Relays 580R, 582R in parallel with relay 579R are energized at the same time. From contact 580 transferred, another circuit is completed, through contact 572 normal, wire 81 (Figs. 5b, 5c) relay coil 594R to the ground, energizing said relay, for determination of the order word Dollars. From contact 572, a further circuit is completed, through wire 88, contacts 574, 576 transferred, wire 89 (Figs. 5b, 5c), relay coil 597R, to the ground, energizing said relay, for determination of the order word Cents.

From 274° to 294°, a sensing pulse is sent, as in case No. 2, towards the "Tens" digit word determination device and from 298° to 316°, a sensing pulse is sent towards the "Units" digit word determination device, the partial circuit for producing the last pulse being: wire 68, cam-contact CCU, wire 70, contact 582 closed, wire 83, contact 556 transferred, contact 546 normal, terminal Ud, etc. During this time, a parallel circuit is completed from contact 582 closed, contact 581 normal, wire 82, relay coil 541R to the ground, energizing said relay, which relay opens its contact 541.

Said contact is designed for preventing energization of relays 569R, 570R at undue time, when it occurs that the digits set at Td and Ud denominational orders on the read-out commutator have the same numerical value.

Said relays 569R, 570R, as also relays 571R—572R, will become and remain energized after the sensing phase, that is from 316° on this cycle. During the following cycle the "Tens" and "Units" digit words determined and formed by the suitable devices and the order word Dollars will be printed. The order word Cents will be printed during a further subsequent cycle.

When the joint sensing of Tens and Units orders (e. g.: Td and Ud) detects the presence of a zero at the Tens order and of a significant digit at the Units order, relay 581R is then energized for sending a sensing pulse through terminal Ud.

Some points should be noted: A single sensing phase is necessary for sensing adjacent "Tens" and "Units" denominational orders of a registered amount, either in the Dollars portion (Td and Ud) or in the Cents portion (Tc and Uc). Examination of the contacts connected to wires 69, 70 (Fig. 5b) shows that sensing of the denominational orders Th, H, Ud, and Uc results in a pulse conditioned by cam-contact CCU, and that sensing of the denominational orders Td or Tc results in a pulse conditioned by cam-contact CCT, said pulses appearing on one of the wires 101—109 (Fig. 5a) according to the numerical value of the digit sensed.

The process of Order word formation will now be examined in relation with the previous case No. 3. It may be recalled that the first amount sensing phase resulted in the determination of the order word Hundred, through energization of relay 588R (Fig. 5c) from 298° to 316° on the cycle. A little after 298°, the transfer of contact 588 permits the energization of holding relay 589R, the circuit path being: Terminal +, wire 72, contact 623 normal, wires 73b, 73c, contact 618 closed, wire 76, 76a, 76b, 76c, contact 601 normal, wire 99, contact 589 closed, relay coil 589R to the ground. When contact 588 returns in normal position at 316°, relays 590R and 603R become energized by a circuit from wire 99, through contacts 589 closed and 588 normal. The transfer of contact 603 causes: (1) the energization of relays 604R and 602R, thereby transferring the holding of the relay group on another circuit, that is: terminal +, cam-contact CC4 (Fig. 5e), wire 91 (Figs. 5e, 5c), contact 602 closed, wire 99, contact 589 closed; (2) the energization of relays 654R—660R from contact 603 transferred, through wires 93b, 93c (Figs. 5c, 5d), ensuring the formation of the order word Hundred.

Both energizations last till 268° on the following cycle, moment where relays 589R, 590R, 602R, 603R and 604R return to non-energized condition. On the other hand, relay 601R remains energized until the end of the operation, as also relays 625R and 653R connected in parallel through wires 92a, 92b, 92c.

During the sensing phase of said cycle, the second amount sensing resulted in the determination of the order words Dollars and Cents, through energization of relays 594R and 597R.

It may be seen that the operation of the corresponding holding relays is the same as the operation of the Hundred relay group.

However, whereas relay 595R is held for one cycle duration, relay 598R will be held for a two cycles duration.

At 316° on said first printing cycle, when contact 611 is transferred, only the order word Dollars can be formed thanks to energization of relays 666R—671R, obtained by completion of a circuit, from contact 611 transferred, through wires 96c, 96b (Figs. 5c, 5d), 96e, 96f.

Besides, the pick-up relay 613R (maintained detection of significant digit at Td or Ud orders) was energized from 298° to 316°. From 298°, holding relay 614R was also energized for about one cycle duration. When contact 613 returns to normal position, at 316°, relay 619R becomes energized and closes its contact. Contact 625 being closed, an energization circuit is completed from contact 611 transferred, through wire 96c, contacts 619, 625 closed, unidirectional cell 678a, wire 98a, relay coil 630R—632R to the ground, energizing said relays. So the order word And is formed by closing of contacts 630—632, till 268° on the following cycle during which the words: And (two words representing T and U digits), and Dollars will be printed.

During the sensing phase of said cycle, a new amount sensing is prevented because of contact 599 being still opened.

At 268° on this second printing cycle, when contact 611 returns to normal position, contact 615 being still closed, a circuit path is completed for energization of the relay group 634R—638R for Cents formation. This circuit extends from contact 615 closed, through wires 97b, 97e (Figs. 5c, 5d), relay coils 634R—638R to the ground, energizing said relays. Along with the formation of Cents, takes place the formation of And No. A circuit is completed which runs from wire 97b, through wire 97c, unidirectional cell 678b, wire 98a, relay coils 630R—632R to the ground, energizing said relays. Another circuit is completed, which runs from wire 97b, through wire 97d, contact 680 normally closed, relay coils 626R, 627R, to the ground, energizing said relays. It follows that the words And No Cents will be printed on the next printing cycle.

If one significant digit had been present at the Tc or Uc order in the amount sensed, or at both, it is easily seen that relay 621R, would be energized during the Cents word determination and that holding relay 620R would be energized during the Cents word formation. In this case, contact 621 having returned to normal position and contact 620 being closed, a circuit path is completed which runs from contact 615 closed, through wires 97a, 97f, contact 624 closed since relay 624R is energized, wires 73b, 73a, contact 620 closed, contact 621 normal, wire 110, relay coil 680R to the ground, energizing said relay. By opening of contact 680, formation of the word No would be prevented during formation of the words And and Cents.

It has been seen that relays 622R and 624R are energized along with relays 634R—638R. Relay 623R, becomes energized as soon as contact 622 is closed and opens its contact 623.

It follows that the holding of relays 618R, 600R is now ensured by the circuit just traced, controlled by cam-contact CC4. When cam-contact CC4 opens at 268° on the last printing cycle, relays 622R, 624R are no longer energized. During the time necessary for the opening of contacts 622, 624 and re-closing of contact 623, wires 74, 75, 76 are cut off from every voltage source. Thus all the relays constantly held up to now are de-energized. Besides, terminal 39 (Figs. 5c, 1) is no longer under voltage, relay 25 is de-energized, thereby permitting the cycle controller to start another type of cycle, that is a cycle No. 3, as said hereinbefore.

Control of letter S formation in Dollars. Normally, when the word Dollars is determined, said word is formed with a final S, on account of the concurrent energization of relays 676R and 666R—671R. The letter S must be suppressed only when the sensed amount is: 1 dollar. The detection of an eventual digit 1 at the Ud denominational order is devoted to the relay group comprising pick-up relay 664R and holding relay 663R. During 298° to 316° on the first sensing phase, the "Units" sensing pulse applied on wire 101 (Fig. 5a) is transmitted also on a parallel circuit extending from wire 111 (Figs. 5a, 5d) through contacts 653, 652, 651 closed, relay coil 664R, to the ground, energizing said relay. Transfer of contact 664 causes the held energization of relay 663R, in parallel with relays 666R—671R. When contact 664 returns to normal position, at 316° on the cycle, two relays more become energized through wire 96g, contact 663 closed, contact 664 normal, wires 126a, b, namely: 662R, 665R. When opened, contact 662 prevents the energization of relay 676R, thus the formation of the letter S. When transferred, contact 665 controls the determination of the printing place number 7 instead of 8.

In view of maintaining the formation of the letter S, when the digit 1 is being sensed at the Ud order, the energization of relay 664R must be prevented in the following cases:

(a) If, during the first sensing phase, a significant digit is detected at the Td denominational order: relay 651R is then energized by a circuit path extending from contact 569 normal (Fig. 5b), wire 112 (Figs. 5b, 5d), relay coil 651R to the ground, and it opens contact 651.

(b) If, during 298° to 316° on the sensing phase considered, relay 652R or 653R is energized, manifesting that the order word Thousand or Hundred has been precedingly determined and formed. As a matter of fact, relay 652R is in parallel with relay 605R (Thousand group) through wires 94a, 95b and relay 653R is in parallel with relay 601R (Hundred group) through wires 92a, 92b.

*Digit word determination and formation.*—The tens digit word determination device comprises a group of pick-up relays 682R—689R (Fig. 5e) and a group of holding relays 692R—699R. With each holding relay, are connected in parallel: a group of relays for the corresponding Tens digit word formation and a group of relays for printing place number determination.

Figure 5F:
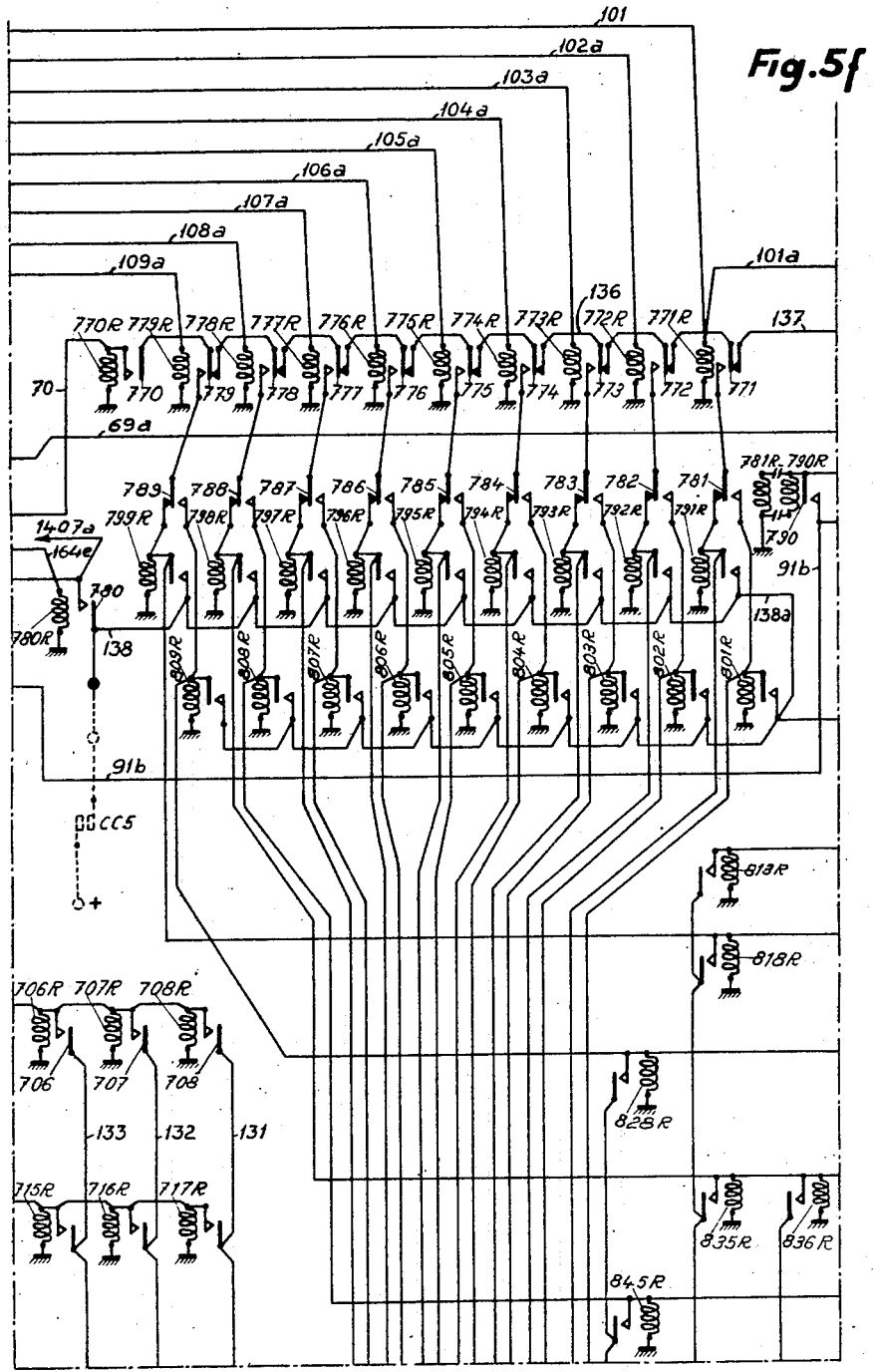
Figure 5G:
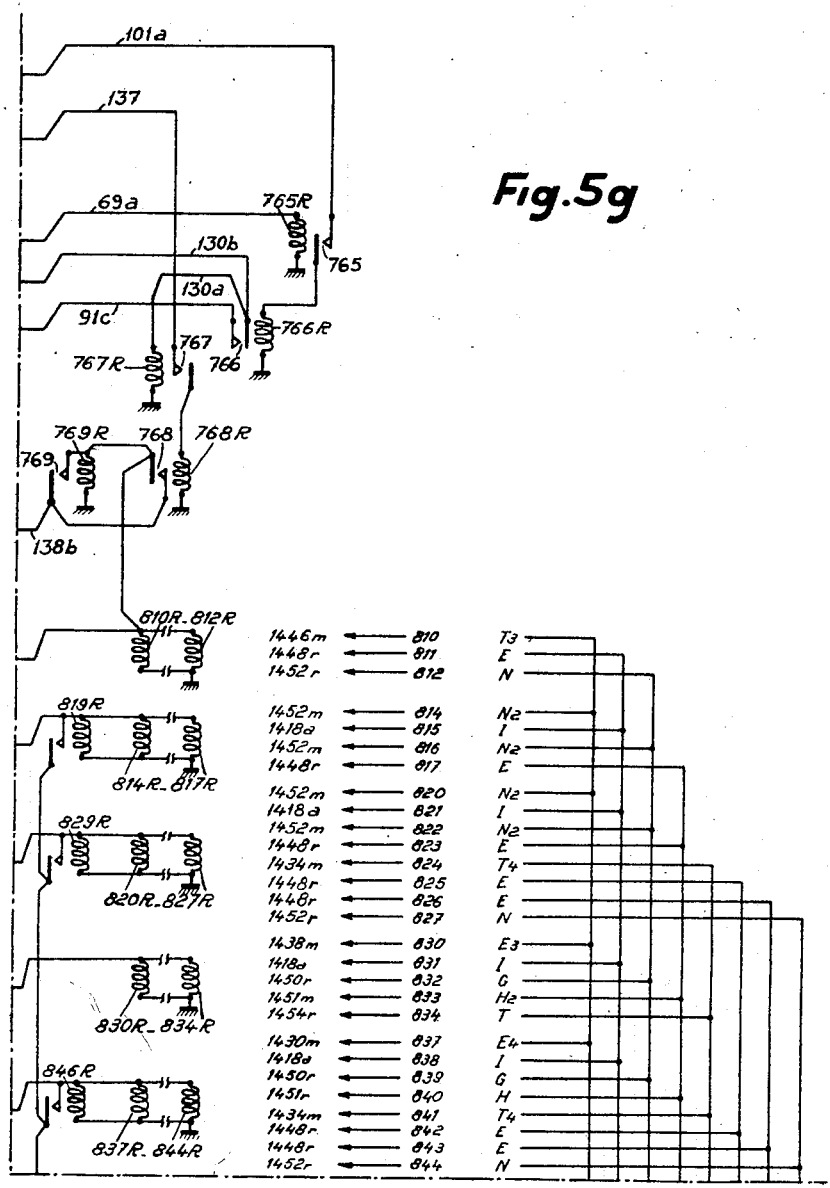
Figure 5H:
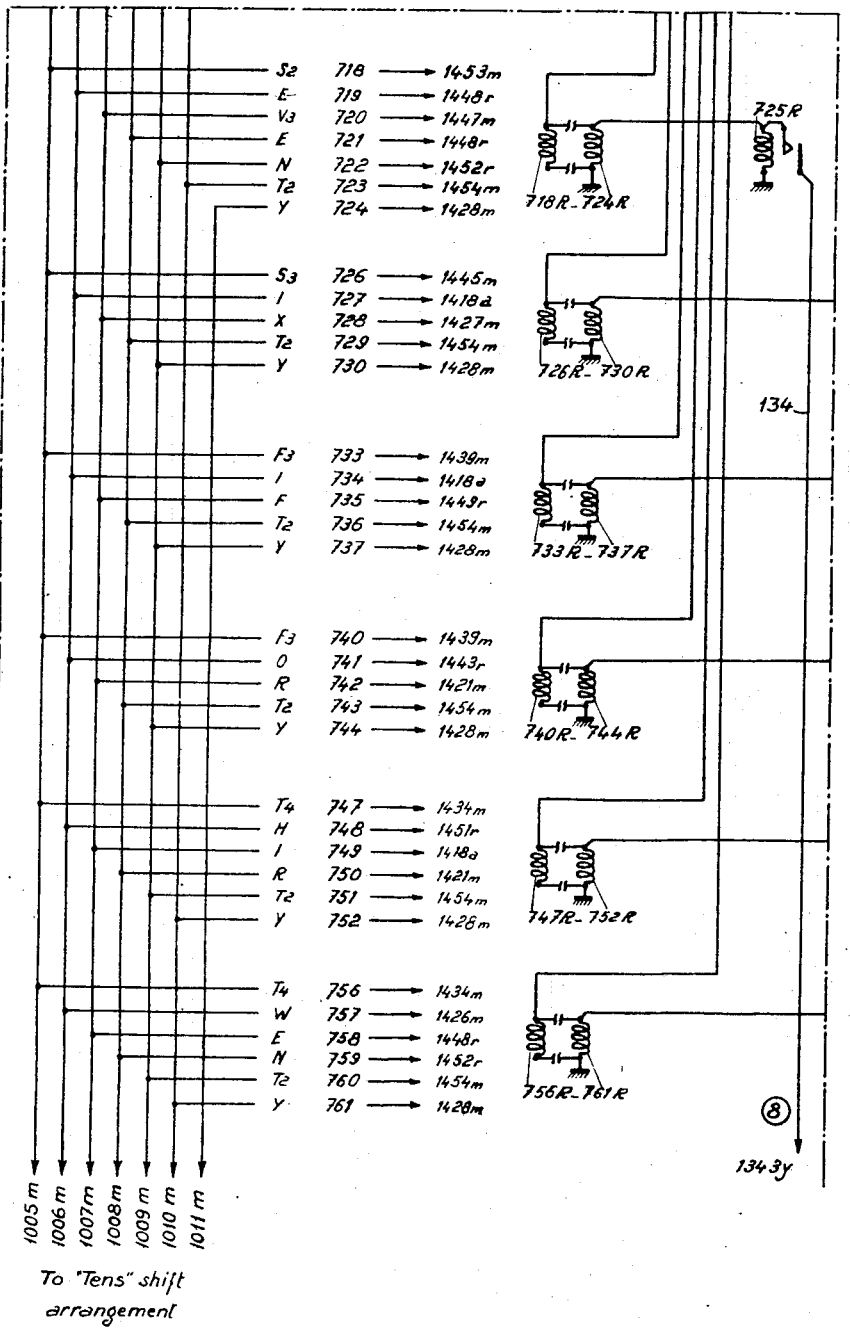
Figure 5:
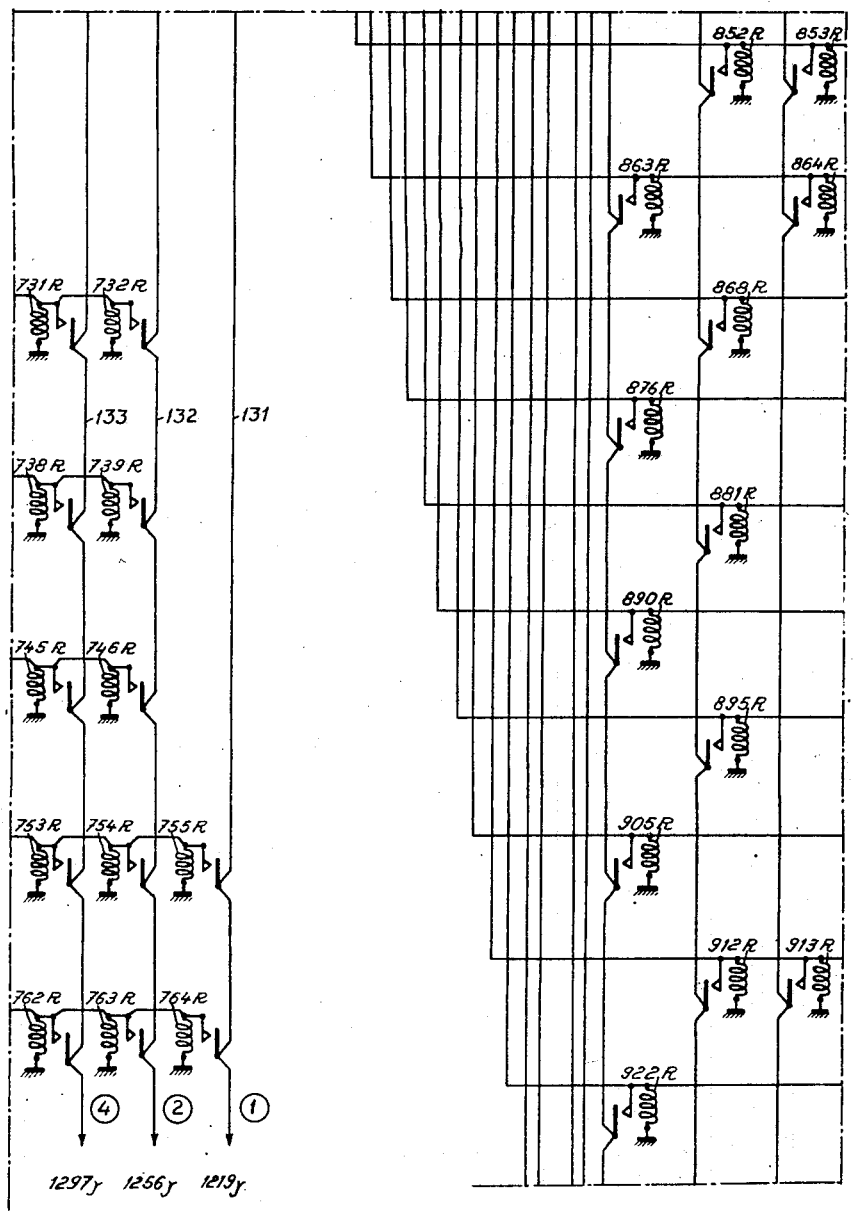
Figure 5J:
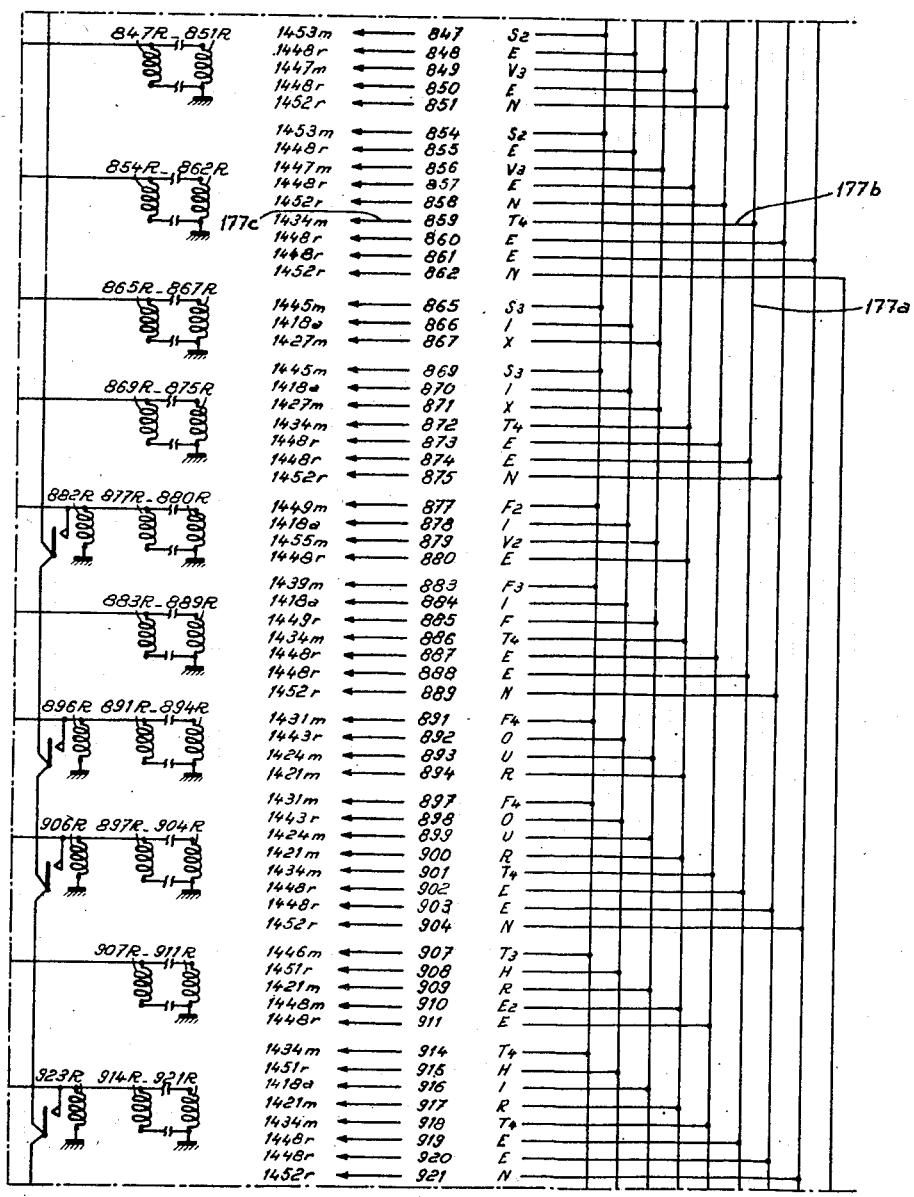
Figure 5K:
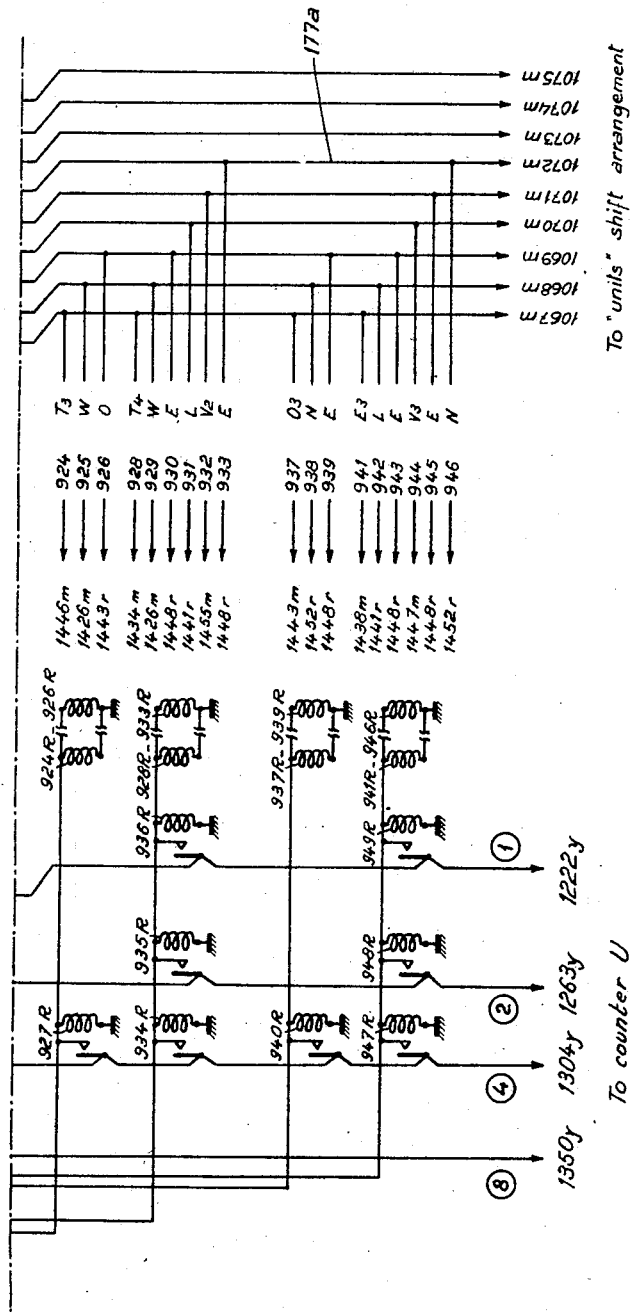
Figure 6:
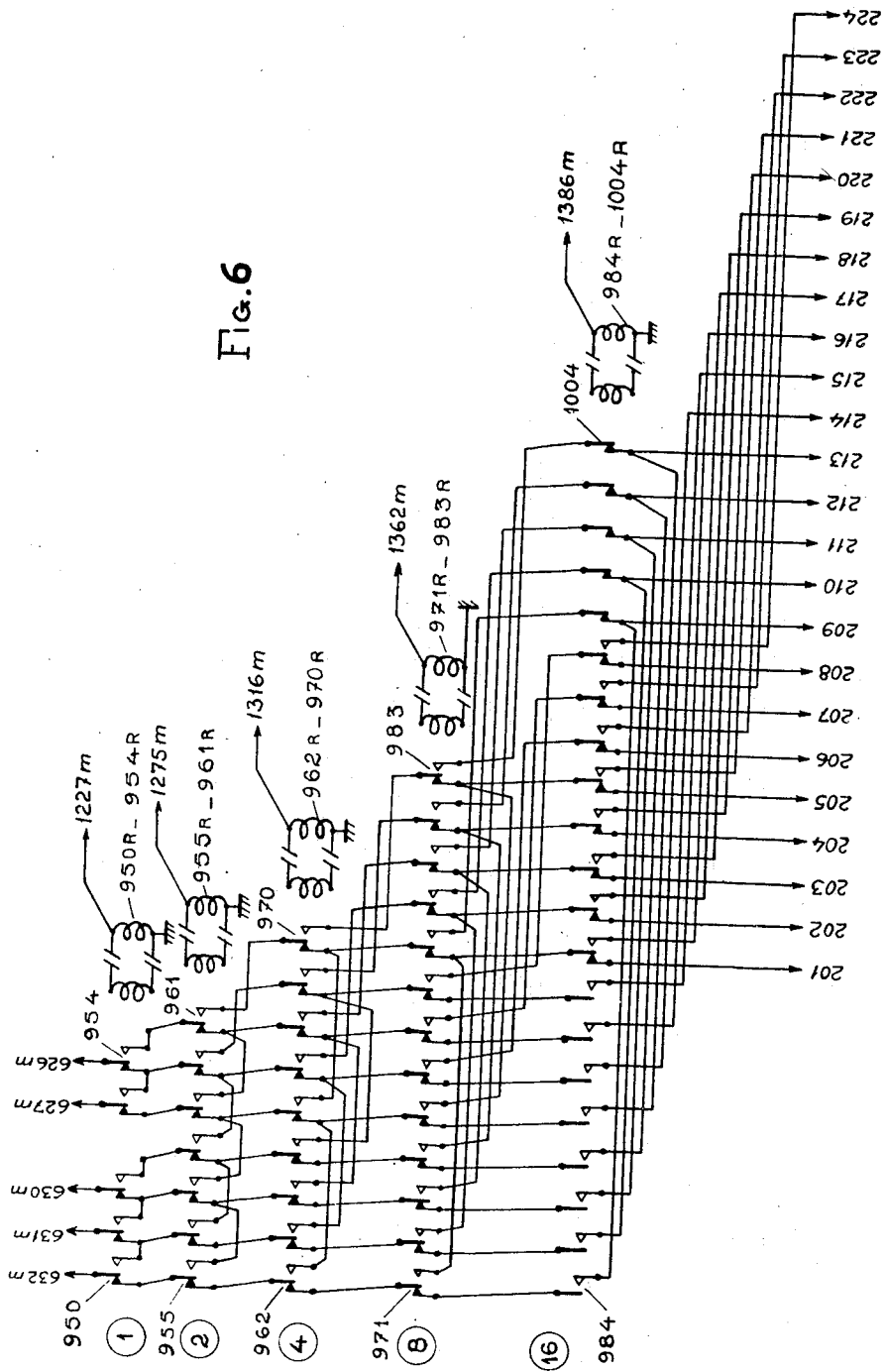
Figure 7:
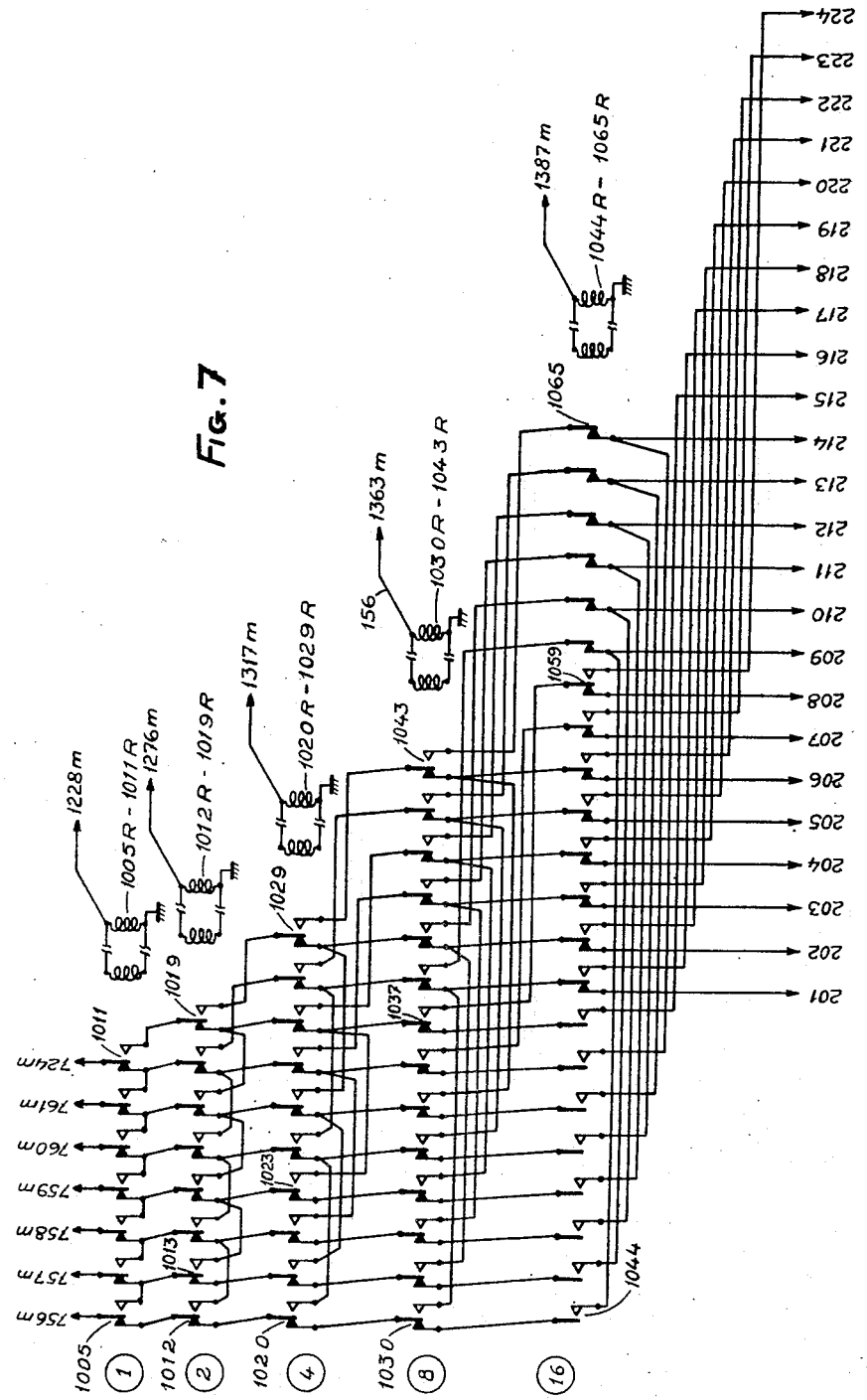

For instance, the formation of the Tens digit word Ninety involves the energization of relays: 689R, 699R, 700R—705R and 706R—708R (Fig. 5f). Contacts 700—705 are inserted on wires between the letter formation device, already cited, and the Tens shift arrangement. Contacts 706—708 when closed put wires 133, 132, 131 under voltage, which results in the entry of the place number 7 (binary components 4, 2 and 1) in the Tens counter of the place number totalizer.

The Units digit word determination device comprises a group of pick-up relays 771R—779R (Fig. 5f) and two groups of holding relays 791R—799R and 801R—809R. With each holding relay are connected in parallel: a group of relays for the corresponding Units digit word formation and a group of relays for printing place number determination (see Figs. 5f, 5g, 5i, 5j, 5k).

In view of lighting the terminology, from now the period 274°–294° of a sensing phase will be called TS phase (Tens sensing) and the period 298°–316° US phase (Units sensing).

The delay relay 679R (Fig. 5e) is fed during the TS phase of each sensing phase by cam-contact CCT through wire 69. The delay relay 770R (Fig. 5f) is fed during the US phase of each sensing phase by cam-contact CCU through wire 70. Relay 765R (Fig. 5g) is practically energized along with relay 679R and cooperates with relay 766R for detecting an eventual digit 1 at a Tens denominational order (dollars or cents portions).

When closed, contact 766 permits the energization of: (1) a group of control relays 781R—789R and a holding relay 790R, the energization circuit being initially: terminal +, cam-contact CC4 (Fig. 5e), wires 91a, 91b (Figs. 5e, 5f), 91c (Fig. 5g), contact 766, wire 130b, relay coils 781R—790R to the ground; (2) a relay 767R on a circuit path from wire 91b (Fig. 5f), contact 790 now closed, wire 130b (Figs. 5f, 5g), wire 130a, relay coil 767R to the ground. Closure of contact 767 permits the detection of an eventual digit 0 at an Units denominational order, as will be presently explained.

Some examples will make the understanding of the operation clearer.

*Case No. 4.*—Suppose one significant digit registered at Th, H, Ud or Uc denominational order. Let said digit be a 5. During the US phase, the sensing pulse carried by wires 105, 105a (Figs. 5a, 5e, 5f) energizes relay 775R, which transfers its contact. At this time relay 770R is energized and a circuit continues from wire 70, through contact 770 now closed, contacts 779—776 normal, contact 775 transferred, contact 785 normal, relay coil 795R to the ground, energizing said relay. A holding circuit is then completed from terminal +, cam-contact CC5, wire 138, contact 795 closed. Said completion lasts till 268° on the following cycle, permitting the held energization of relay group 877—880R (Fig. 5j) (formation of the digit word Five) and relays 881R, 882R (Figs. 5j–5i) (entry of the place number 5, that is 4 letters and 1 space, into the Units counter of the place number totalizer).

*Case No. 5.*—Suppose the digit 1 registered at the Td denominational order and a significant digit, say 2, registered at the Ud order. During the TS phase, contact 765 is closed. The sensing pulse carried by wires 101, 101a (Figs. 5a, 5e, 5f, 5g) reaches the relay coil 766R, energizing said relay. It follows the held energization of relays 781R—790R and 767R. During the US phase, the sensing pulse carried by wires 102, 102a reaches relay 772R, energizing said relay. A circuit path is then completed from wire 70, through contact 770 closed, contacts 779—773 normal, contacts 772, 782 transferred, relay coil 802R to the ground, energizing said relay. Relay 802R holds itself energized as also relays 928R—933R (Fig. 5k) to form the word Twelve, and relays 934R—936R to determine the place number 7.

*Case No. 6.*—Suppose the digit 1 registered at the Td denominational order and the digit 0 registered at the Ud order.

It is obvious that the sensing pulse carried, during the TS phase, by wires 101, 101a results, as before, in the held energization of relays 781R—790R and 767R. During the US phase, there is no sensing pulse, but a circuit is completed from wire 70, contact 770, closed contacts 779—771 normal, wire 137 (Figs. 5f, 5g), contact 767 closed, pick-up relay 768R, to the ground, energizing said relay. The closure of contact 768 causes holding relay 769R to be energized through a circuit comprising: terminal +, cam contact CC5 (Fig. 5f), wires 138, 138a, 138b (Figs. 5f, 5g), contact 769. It follows the held energization of relays 810R—812R to form the digit word Ten, and relay 813R to determine the place number 4.

*Shift arrangements (Figs. 6, 7, 8 and 9).*—The wiring structure of the shift arrangements: Order No. 2, Tens, Units and Order No. 1 is practically identical. However the number of entry circuits of each arrangement corresponds to the maximum number of letters to be transmitted by said arrangement.

Considering, for instance, the "Tens" shift arrangement (Fig. 7) five groups of relays may be seen, each group being devoted to a binary component, from 1 to 16. The seven wires with arrows marked 756m—724m may be called entry wires. The twenty-four wires with arrows marked 201—224 may be called exit wires. In order that seven transmitting circuits be completed, it is necessary that the group 1030R—1043R at least be energized, on account of the systematical shift of height orders, previously referred to, between the entry and the exit wires.

Said relay groups may be selectively energized under control of organs depending on the "Order No. 2" counter of the place number totalizer. If, for instance, said counter registers the place number 7, the groups devoted to components 1, 2, 4 and 8 will be energized during printing of a partial wording. In this case, letter pulses entering through the extreme left-hand wire will follow the circuit path: contacts 1005, 1013, 1023, 1037 transferred, 1059 normal, to the terminal marked 208, corresponding to the eighth position of the printing mechanism.

The wiring of the "Order No. 2" shift arrangement (Fig. 6) differs only only in the contacts assigned to the component 1. A space is provided for the correct transmission of the words And No.

In the "Order No. 1" shift arrangement (Fig. 9); in which the exit terminals are supposed to realize the parallel wiring of all the shift arrangements, the three extreme right-hand terminals are not connected to the printing mechanism, but to corresponding terminals pertaining to the "syllable cut-out" device.

Figure 10A:
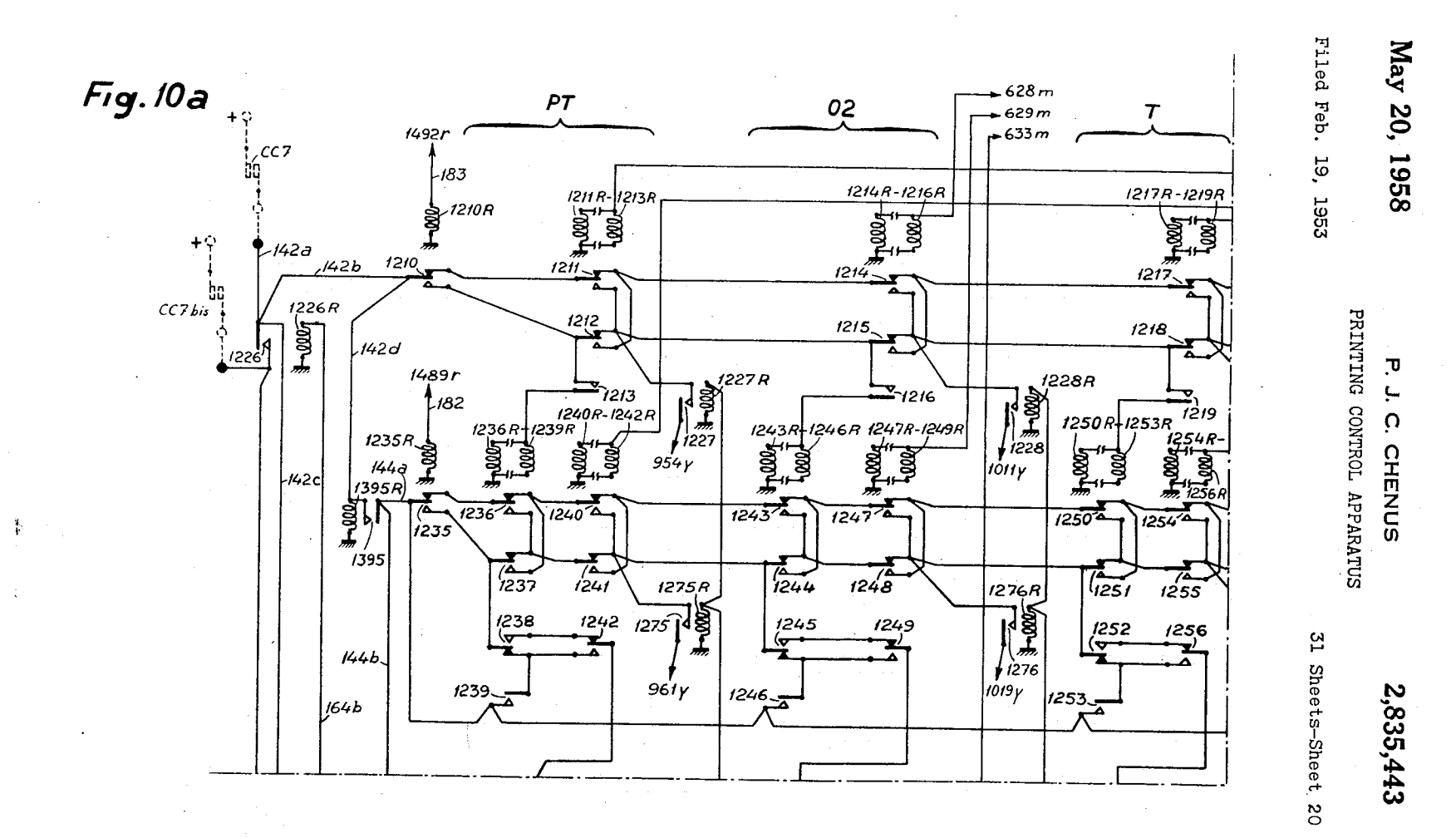
Figure 10B:
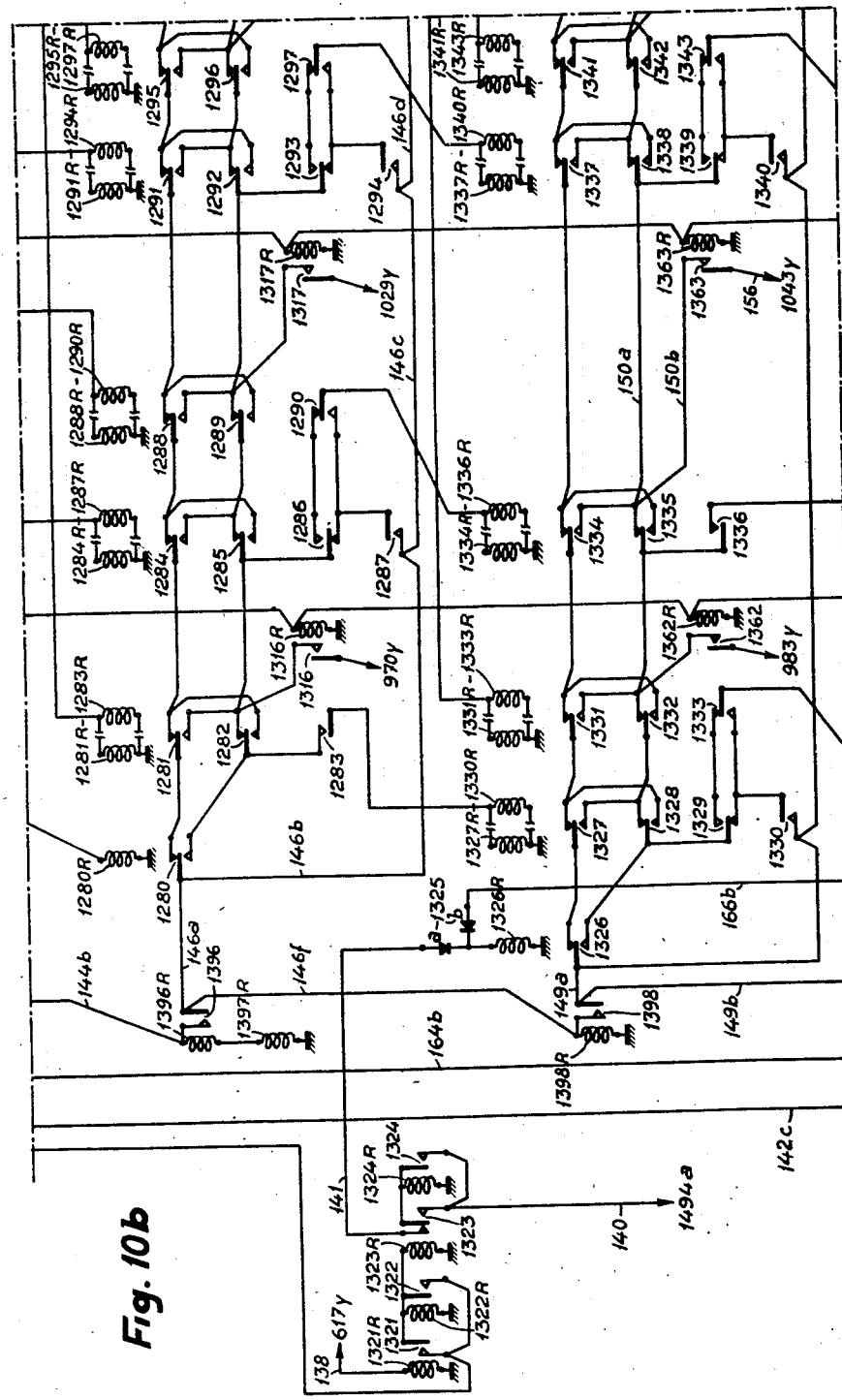
Figure 10C:
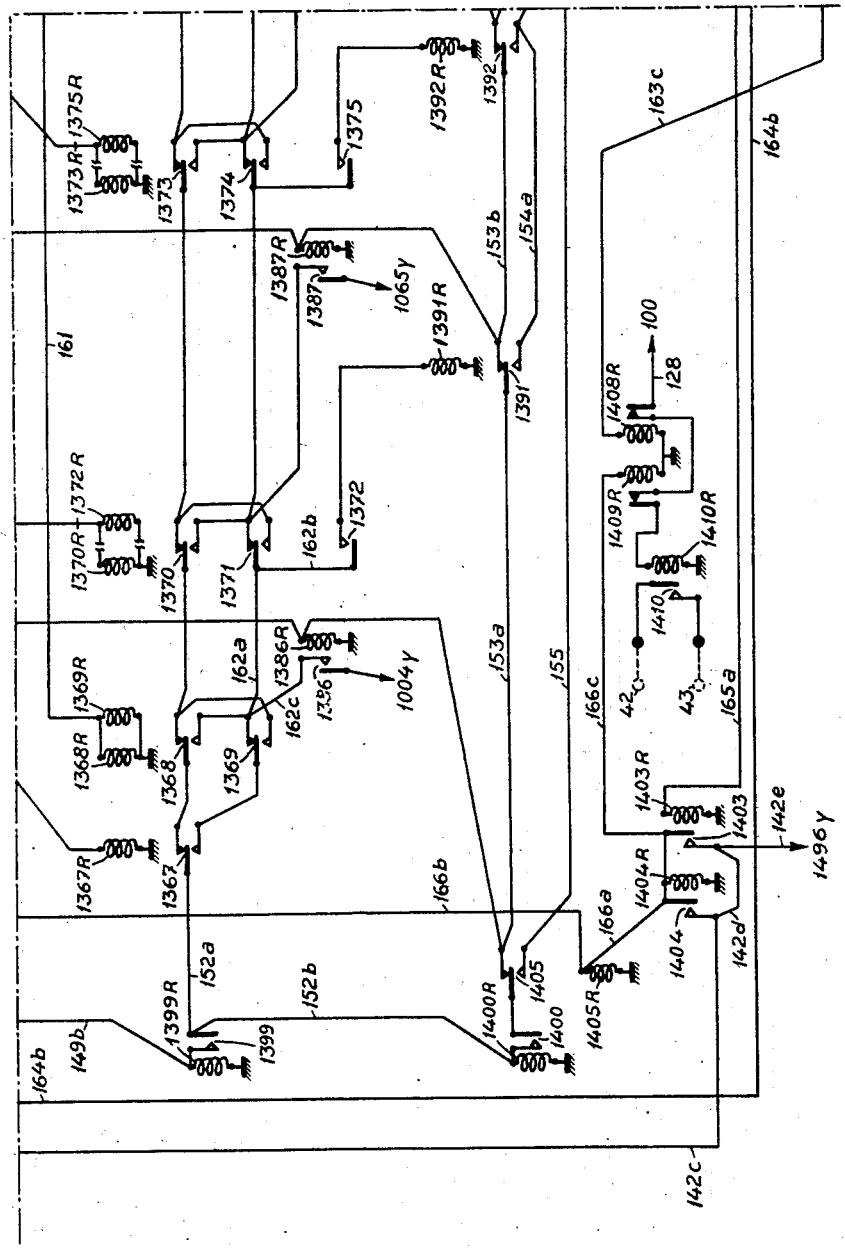
Figure 10D:
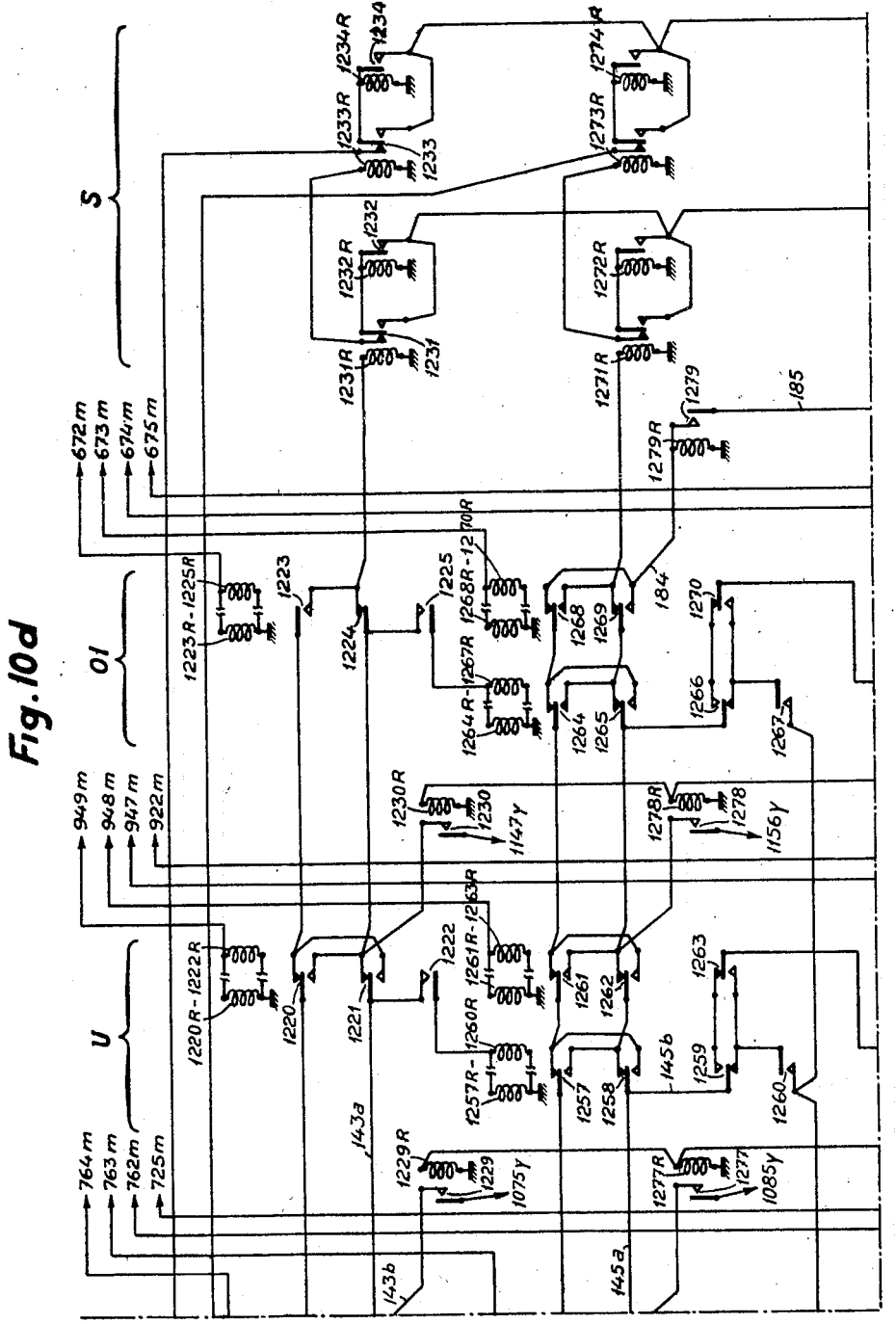
Figure 10E:
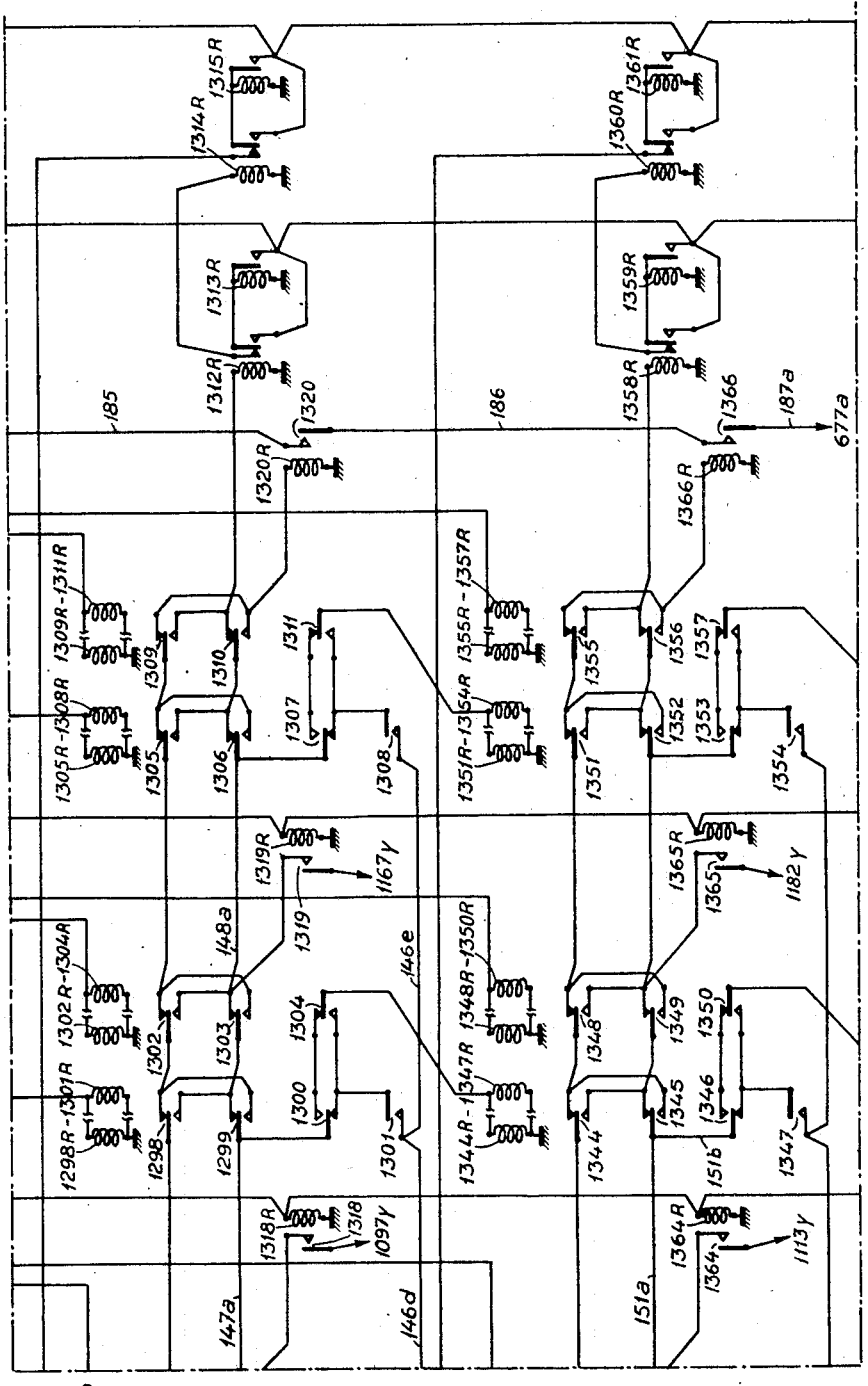

*Place number totalizer—see figs. 10a–10f.*—The totalizer comprises five counter called, according to the order of positions: "Previous Total" (PT), "Order No. 2" (O2), "Tens" (T), "Units" (U), "Order No. 1" (O1) and a register or "Storage" device (S). The structure of said counters is approximately the same. For instance, the U counter includes two series of relays: (Figs. 10d, 10e, 10f).

(1) A first series of entry relays:

Relays 1220R—1222R—(binary component: 1)
Relays 1261R—1263R—(binary component: 2)
Relays 1302R—1304R—(binary component: 4)
Relays 1348R—1350R—(binary component: 8)

(2) A second series of carry relays:

Relays 1257R—1260R—(binary component: 2)
Relays 1298R—1301R—(binary component: 4)
Relays 1344R—1347R—(binary component: 8)
Relays 1376R—1378R—(binary components: 16)

A further relay, 1393R (Fig. 10f) is energized when the capacity of said counter, that is 31, has been exceeded. For that reason, it is called: "32 carry detection" relay.

Another relay group, 1230R, 1278R (Fig. 10d), 1319R, 1365R (Fig. 10e), 1389R (Fig. 10f), is effective, when energized, to bodily control the Order No. 1 shift arrangement, through closure of the corresponding contacts 1230—1389. From all these closed contacts, the function of selective control of the Order No. 1 shift arrangement is obtained in dependence on the configuration of the contacts included in the horizontal adding circuits at the left-hand side of said closed contacts. Explanations about said control will be given later.

The "Order No. 1" counter exerts no control on a shift arrangement but only on the storage device. The horizontal adding circuits are designed in such a way that the sum of the numbers or carries entered into the counters is transmitted to said storage device, the capacity of which is also 31.

In the storage device, the binary order 4, for instance, comprises a registering relay group 1312R, 1313R and a transfer relay group 1314R, 1315R. The registering group may be in activity during a cycle after receiving a binary component. Its associated transfer group will be effective, on the following cycle and under certain conditions to be explained later, to control the transfer of said component to the corresponding entry group of the "Previous total" counter.

The "skip to next line" device comprises the pick-up relay 1401R (Fig. 10f), the holding relay 1402R, which controls the control relays 1403R, 1404R, 1405R (Fig. 10c).

Contact 1405 controls the establishing of one of two control circuits to differently and bodily control the shift arrangements according to the fact that a "skip to next line" is necessary or not.

Relays 1210R and 1235R (Fig. 10a) serve to add respectively the digits 1 or/and 2 under control of the syllable cut-out device.

The relay group 1321R—1324R (Fig. 10b) is provided for the systematical entry of 8 in the totalizer before printing of each new line.

The operation of the units heretofore examined will be explained with help of concrete examples.

Suppose the amount 84$ 50c. registered at the Td, Ud, Tc and Uc orders of the accumulator of the tabulating machine. The complete corresponding wording is illustrated by the Fig. 13 and requires two amount sensing operations. On this table, the upper line of numbers gives the numbers entered in the place number totalizer in accordance with the formed words; the lower line of numbers gives the printing positions of the printing mechanisms.

If the printing control apparatus is set into activity as precedingly stated, an amount sensing operation is initiated at the end of a cycle in the course of which said amount is set up on the read-out commutator. It may easily be conceived that the first sensing phase only concerns the Td and Ud orders and results in the determination and formation of the words:

Eighty (Tens digit word) relays: 709R—714R (Fig. 5e)
Four (Unit digit word) relays: 891R—894R (Fig. 5j)
Dollars (Order word No. 1) relays: 666R—671R, 676 (Fig. 5d)

At the same time, the following place numbers are determined:

For Eighty: 7. Energized relays: 706R–708R (Fig. 5f)
For Four: 5. Energized relays: 895R, 896R (Figs. 5i, 5j)
For Dollars: 8. Energized relays: 675R (Fig. 5d)

Said digits are entered into the corresponding counters of the place number totalizer.

The energization of these relays is initiated, and held, at the latest from 298° on this cycle. A little sooner in the same cycle, takes place the preparing of the systematical adding of 8 in the totalizer. It has been stated before that relay 617R (Fig. 5c) is energized once at the beginning of the operation from 244° to 268° on said cycle. Relay 1321R (Fig. 10b), wired in parallel with relay 617R, through wire 138, is energized at the same time. Cam-contact CC7 bis (Fig. 10a) being closed at this time, relay 1322R becomes energized and holds itself on CC7 bis up to 316° on the instant cycle. Relay 1323R, energized at the same time as relay 1322R, causes, through its contact transferred, the energization of relay 1324R, which holds itself energized on cam-contact CC6 up to 268° on the following cycle. The last holding circuit is: Terminal +, cam-contact CC6 (Fig. 11c), wires 139a, 139b, 140 (Figs. 11c, 10b), contact 1324 closed, relay coil 1324R to the ground. At 316° on the instant cycle, when relays 1322R, 1323R are de-energized, the return of contact 1323 in normal position causes relay 1326R to be energized through a circuit path from wire 140, contact 1324 closed, contact 1323 normal, wire 141, unidirectional cell 1325a, relay coil 1326R to the ground. The transfer of contact 1326 amounts to enter 8 into the totalizer, as will be clear presently.

The entry of digits 7, 5 and 8 in the totalizer is represented by the energization of the following relays:

T counter—digit 7—relays: 1212R–1219R, 1254–1256R, 1295R–1297R
U counter—digit 5—relays: 1217R–1222R, 1302R–1304R
O1 counter—digit 8—relays: 1344R–1357R At 322° on the instant cycle, the closure of cam-contact CC7 entails the definitive positioning of the adding circuits and the subsequent carry transfer.

A first circuit is completed from: terminal +, cam-contact CC7 (Fig. 10a) through wires 142a, 142b, contacts 1210, 1211, 1214 normal, contact 1217 transferred, wire 143a (Fig. 10d), contact 1222 closed, relay coils 1257R–1260R to the ground, energizing said relays. A transfer of a binary carry is thus realized to the binary order 2 of the U counter, resulting from the adding of two 1 in T and U counters.

Obviously, relay 1395R (Fig. 10a) becomes energized as soon as cam-contact CC7 closes. After a while (actuation time of contact 1395) a circuit is completed from contact 1395, through wire 144a, contacts 1235, 1236, 1240, 1243, 1247, 1250 normal, 1254 transferred, wire 145a (Figs. 10a, 10d), wire 145b, contact 1259 transferred, contact 1263 normal, relay coils 1298R–1301R (Fig. 10e), to the ground, energizing said relays. A transfer of a binary carry is thus realized to the binary order 4 of the U counter. Another circuit is completed from wire 145a (Fig. 10d), through contact 1258 transferred, contacts 1261, 1264, 1268 normal, relay coil 1279R, to the ground, energizing said relay. This relay function will be explained later.

Relays 1396R–1397R (Fig. 10b) are energized through a circuit including contact 1395 closed and wire 144b.

After a while for closure of contact 1396, a circuit is completed from contact 1396 closed, through wire 146a, contacts 1280, 1281, 1284, 1288, 1291 normal, 1295 transferred, wire 147a (Figs. 10b, 10e), contacts 1299, 1302 transferred, wire 148a, contacts 1306, 1310 normal, relay coil 1312R, to the ground, energizing said relay, for entering the digit 4 into the order 4 (entry group) of the storage device. Another circuit is completed from wire 146a, through wires 146b, 146c, 146d, (Figs. 10b, 10e), contacts 1301, 1304 transferred, relay coils 1344R–1347R, to the ground, energizing said relays. A transfer of a binary carry is thus realized to the binary order 8 of the U counter.

Relay 1398R is also energized through a circuit including contact 1396 closed and wire 146f (Fig. 10b).

After a while for closure of contact 1398, a circuit is completed from contact 1398, through wire 149a, contact 1326 transferred, contacts 1328, 1332, 1335 normal, wire 150a, contacts 1338, 1342 normal, wire 151a (Figs. 10b, 10e), contact 1345 transferred, contacts 1348, 1351 normal, contact 1355 transferred, relay coil 1358R, to ground, energizing said relay, for entering the digit 8 into the binary order 8 of the storage device.

Another circuit is completed from wire 151a, through wire 151b, contact 1346 transferred, contact 1350 normal, relay coils 1376R–1378R, to the ground, energizing said relays. A transfer of a binary carry is thus realized to the binary order 16 of the U counter.

Relay 1399R (Fig. 10c) is energized through a circuit including contact 1398 and wire 149b.

After a while for closure of contact 1399, a circuit is completed from contact 1399, through wire 152a, contacts 1367, 1368, 1370, 1373 normal, contact 1376 transferred (Fig. 10f), wire 167a, contact 1380 normal, relay coil 1382R, to the ground, energizing said relay, for entering the component 16 into the binary order 16 of the storage device.

All the contacts in the adding circuits, controlled either by entry relays or by carry relays, are now positioned. At this stage of operation, the conditioning of the totalizer may be illustrated by the Fig. 14a. The vertical lines delimit six zones respectively assigned to the counters PT, O2, T, U and O1, and to the storage device S. On this figure, as also on similar figures, the sign + represents an entry relay group at the registering state. The sign X represents, in any counter, a carry relay group at the registering status, and in the storage device an entry relay group at the registering state, said figure summarizes the foregoing statement and shows, for instance, the entry of number 28 into the storage device, representing the sum of the place numbers 7, 5 and 8 plus the systematical entry of 8.

On Fig. 14a, the sign / represents control circuit made effective to selectively control a relay group of a shift arrangement. Returning to explanations of the operation will make this clear.

Upon closure of contact 1399 (Fig. 10c), relay 1400R is energized through wire 152b and the bodily control of the shift arrangements may now be initiated. As there is still no "32 carry," the closure of contact 1400 permits the energization of the relays of all the shift arrangements control devices, namely 1227R—1386R, 1228R—1387R (Figs. 10a, 10b, 10c), 1229R—1388R, 1230R— 1389R (Figs. 10d, 10e, 10f), through a first control circuit including contact 1405 normal (Fig. 10c) and wires 153a—153d.

A circuit is completed, for instance, from contact 1335 normal (Fig. 10b), wire 150b, contact 1363 closed, wire 156 (Figs. 10b, 7), relay coils 1030R—1043R, to the ground, energizing said relays. Said energizing circuit is represented, on Fig. 14a, by a sign / on the horizontal line of the 8 component, in the zone of the O2 counter. Consequently, the "Tens" shift arrangement will transmit the word Eighty through the six extreme left hand exit wires to the printing mechanism.

It is not necessary to trace the other energizing circuits. The Fig. 14a shows that: under control of the T counter, the Units shift arrangement undergoes a shift of 15 ranks or orders; under control of the U counter, the Order No. 1 shift arrangement undergoes a shift of 20 ranks. The Fig. 13 shows that said shifts are correct for transmitting the first partial wording: Eighty Four Dollars.

In the totalizer and the shift arrangements, all the relays hereinbefore cited the energization of which depends on the closure of cam contact CC7, remain energized till 268° on the following cycle or first printing cycle.

Specially, the entry of the number 28 in the storage device is materialized by the energization of relays 1312R, 1358R, 1382R and the transfer of their contacts. Considering only the binary order 16 of the Storage device, when cam-contact CC9 closes at 244° on said first printing cycle, relay 1383R becomes energized through a circuit running from: terminal +, contact CC9, through wire 157, contact 1406 normally closed, wires 158a, 158b, contact 1382 still transferred, relay coil 1383R to the ground. Closure of contact 1383 holds said relay energized on CC9. When contact 1382 returns to normal position at 268°, a circuit is completed from wire 158a through contact 1383 closed, contact 1382 normal, wire 159, relay coil 1384R, to the ground, energizing said relay.

When cam-contact CC10 recloses at 298°, relay 1385R becomes energized through a circuit including: terminal +, cam-contact CC10, wires 160a, 160b, 160c, contact 1384 transferred. When cam-contact CC9 opens at 316°, contact 1384 returns to normal position and a circuit is completed from: terminal +, cam-contact CC10, wires 160a, 160b, contact 1385 closed, contact 1384 normal, wire 161 (Figs. 10f, 10c), relay coils 1368R—1369R to the ground, energizing said relays. This energization lasts till 268° on the second printing cycle and represents the transfer of the component 16 from the storage device to the Previous Total counter. In the present case, components 4 and 8 are transferred in the same way.

Since the skip to next line device has not been up to now effective, contacts 1408, 1409 (Fig. 10c) remain closed and relay 1410R is still energized, through the circuit: terminal +, wire 72 (Fig. 5c), contact 623, wires 73b, 73c, contact 618 closed, wire 74a, terminal 100, wire 128 (Figs. 5c, 10c), contacts 1408, 1409 closed. The closure of contact 1410 permits the energization of electromagnet SSE (Fig. 1) which conditions, when energized, the space suppressing. Thus the paper in the printing mechanism is not forwarded, as was mentioned when examining the Figure 1.

During the sensing phase of the first printing cycle, the opening of cam-contacts CC4 and CC5 interrupts the holding circuits of the word determination and formation devices. However some relays remain energized, namely: relays 569R—572R (Fig. 5b) manifesting that the Td and Ud digits have been translated, 609R (Fig. 5c) manifesting that the word Dollars has been formed. The totalizer is obviously reset, except for the PT counter.

The second amount sensing results in the determination and formation of the tens digit word Fifty and of the Order No. 1 word Cents, and also of the Order No. 2 word And.

The Figs. 13 and 14b show that the O2, T and O1 counters respectively receive the place numbers: 4, 6 and 6.

The positioning of the adding circuits of the totalizer is effected in the same way as stated before.

It may be seen, Fig. 14b, that a "32 carry" results from the positioning of the adding circuits. As a matter of fact, the sum of the numbers entered in the PT counter (28) and in the O2 counter (4) is 32. Said 32 carry is materialized by the energization of relay 1391R (Fig. 10c), beginning as soon as contact 1399 closes, the complete energization circuit being: terminal +, cam-contact CC7 (Fig. 10a) wires 142a, 142b, 142d, contact 1395 closed, wire 144b (Figs. 10a, 10b), contact 1396 closed, wire 146f, contact 1398 closed, wire 149b, (Figs. 10b, 10c), contact 1399 closed, wire 152a, contact 1367 normal, contact 1368 transferred (16 component entered into PT counter), wires 162a, 162b, contact 1372 closed (16 carry transferred into O2 counter), relay coil 1391R, to the ground. Upon closure of contact 1400, the transfer of contact 1391 has two effects: (1) the only relay group 1227R, 1275R, 1316R, 1362R, 1386R is energized, permitting the bodily control of the order No. 2 shift arrangement under control of the PT counter; (2) a circuit is completed from contact 1405 normal, through wire 153a, contact 1391 transferred, wires 154a, 154b, 154c, 154d, relay coil 1401R, to the ground, energizing said relay, for skip to next line detection.

During the subsequent or second printing cycle, the word And will be transmitted through the Order No. 2 shift arrangement. As may be verified on the Fig. 14b (column PT), said shift arrangement undergoes a shift of 28 ranks or orders, the relay groups energized being those of the 4, 8 and 16 binary components. The letters of the word And enter the shift arrangement through the three extreme left-hand entry wires and go out through the exit wires leading to the 21, 22 and 23 positions of the printing mechanism.

The precedingly formed words must be preserved, since only the word And is now printed. To this end, when cam-contact CC8 (Fig. 10f) closes at 202°, relay 1402R becomes energized through the circuit; terminal +, cam-contact CC8, wire 163a, contact 1401 transferred, wire 164a. Said relay holds itself energized on CC8. Several relays are wired in parallel with relay 1402R, namely:

(1) Through wire 164c (Figs. 10f, 5e, 5f) and 164e, relays 690R and 780R which close their contact, short-circuiting cam-contacts CC4 and CC5 (holding of the formed words: Fifty, Cents, and of corresponding place numbers).

(2) Through wires 164a, 164d, relays 1406R and 1407R, which prevent the transfer of the number 12 by opening contact 1406, and instead, hold the number 28 (transfer group) by closure of contact 1407 and short-circuiting of cam-contact CC10.

(3) Through wire 164b (Figs. 10f, 10c, 10b, 10a) relay 1226R, the contact of which, when closed, permits cam-contact CC7 bis to extend the action time of cam-contact CC7.

At 316°, when cam-contact CC7 bis opens, relay 1401R de-energizes, thereby returning its contact to normal position. A circuit is then completed from terminal +, cam-contact CC8, wires 163a, 163b, contact 1402 closed, wire 164a, contact 1401 normal, wire 165a (Figs. 10f, 10c) relay coil 1403R, to the ground, energizing said relay, until the beginning of the next cycle. At 322°, when cam-contact CC7 closes again, a circuit is completed from: terminal +, cam-contact CC7, wires 142a, 142c (Figs. 10a, 10b, 10c), 142d, contact 1403 closed, relay coil 1404R, energizing said holding relay. It follows: (1) the energization of the holding relay 1405R, through wire 166a; (2) the energization of relay 1326R (Fig. 10b) through wires 166a, 166b, unidirectional cell 1325b. It has been said before that the transfer of contact 1326 amounts to the entry of the digit 8 in the totalizer. This entry is now necessary since a new line is to be printed.

On the Figure 14c, it may be seen that the entry relays at the registering status are the same as on the Figure 14b. The symbolic configurations also are identical on the two figures from the 1 order to the 4 order inclusive, but they differ for the 8 order, on account of the entry of 8 in the totalizer. Remark also the "32 carry" which has now occurred at the PT counter. However, a "32 carry" detection relay is of no use with the PT counter on account of the fact that relay 1405R (Fig. 10c) takes the place of said relay.

In the present case, the transfer of contact 1405 causes, when contact 1400 has closed, wires 155–153a–153d to be set under voltage. Since all contacts 1391–1394 are in normal position, all the control relays governing the bodily control of the shift arrangements are energized.

A sign / on the line of 4 order in the column PT indicates that a shift of 4 ranks or orders is applied to the Order No. 2 shift arrangement. Considering the Fig. 6, it may be seen that, when only the contacts 962—970 (4 order) are transferred, and the pulses for the word And flowing through contacts 950—952 cannot find any transmitting path. As the word And has already been printed, its non-transmission is normal. The Fgure 14c shows that a shift of 8 ranks is applied to the Tens shift arrangement under control of the O2 counter, and that a shift of 14 ranks is applied to the Order No. 1 shift arrangement under control of the U counter.

Fig. 13 shows that said shifts are correct for transmitting the words Fifty Cents to the positions 1 to 11 inclusive of the printing mechanism.

It may be noted that, during the sensing phase of the second printing cycle, the registered amount cannot be sensed again by reason of the opening of contact 599 (Fig. 5c), due to the fact that relay 599R (Cents determination group) is still energized.

At about the beginning of the third printing cycle, the paper in the printing mechanism must be fed to effect a line space.

When cam-contact CC8 (Fig. 10f) opens at 8° on said cycle, contact 1408 (Fig. 10c) returns into closed position. At this time, relay 1404R is held energized, as was said before; relay 1409R, wired in parallel through wire 166c, is thus energized and the opening of contact 1409 prevents the energization of relay 1410R. Consequently electromagnet SSE (Space Suppressing) previously referred to, is not energized and the paper can be forwarded through a line space by the mechanical means provided in the printing mechanism.

Thus, all the required conditions are fulfilled for correct printing of the second printing line.

In examining the words which may be formed (see Figs. 5c–5k), it may be seen that said words are more or less arbitrarily divided in syllables. The rule observed is that any syllable must contain no more than four letters and no less than two. The first letter of each syllable is called syllable initial. An index digit completes each syllable initial and indicates the number of letters in the syllable. For instance, on Fig. 5k, the word Eleven is divided in two syllables of three letters; E₃LE and V₃EN.

*Syllable cut-out device. See Figs. 11a, 11b, 11c assembled according to Fig. 11.*—The letter formation device (Figs. 11a, 11b) was mentioned hereinbefore.

The relay group 1429R—1434R cooperates with the relay group 1456R—1457R for detection of an initial with index 4. The relay group 1435R—1447R cooperates with the relay group 1458R—1459R for detection of an initial with index 3. The relay group 1448R—1455R cooperates with the relay group 1460R—1461R for detection of an initial with index 2.

The Fig. 11c shows three relay groups: 1477R, 1478R, 1483R; 1479R, 1480R, 1484R; 1481R, 1482R, 1485R, the function of which is to interrupt either three, or two, or one transmission line to the 22, 23, 24 positions of the printing mechanism, according to the position and index value of the initial detected. The relay group 1490R—1491R controls, when effective, the adding of a further shift 2 in the place number totalizer. The relay group 1493R—1494R controls, when effective, the adding of a further shift 1, and the relays 1489R, 1492R control, when effective, the adding of a further shift 3 in said totalizer.

The operation of the whole unit will be best understood with help of an example.

Let the amount 617$00 be set on the read-out commutator of the tabulator. The words to be printed are illustrated on Fig. 15. The examination of the operation resulting from the first amount sensing (Hundred denominational order) is of no interest now. For that reason, Figs. 16a, 16b only relate to the symbolic representation of the place totalizer during the second and third printing cycles.

After the sensing phase of the first printing cycle, that is, when all the words resulting from the last amount sensing are formed and when the shift arrangements are suitably conditioned, the syllable cut-out device proceeds to an initial search through the transmitting lines corresponding to the 22, 23, 24 positions of the printing mechanism.

By producing a pulse from 346° (first printing cycle) to 8° (second printing cycle), the closure of cam-contact CC3 initiates an initial search. A first circuit is established from: terminal +, cam-contact CC3 (Fig. 11b), through wire 170, contact 1495 normal, wires 171a, 171b, 171c and all relay coils in parallel 1429R—1455R, to the ground energizing said relays. All the controlled contacts are thus transferred. Another circuit is completed from wire 171a, through contacts 1465, 1466, 1467 normal, relay coils 1468R—1470R to the ground, energizing said relays. As soon as contacts 1468—1470 are transferred, the pulse from cam-contact CC3 is transmitted, through wires 171d, 171e, 171f to the wires 172, 173 and 174. The Fig. 15 shows that an initial T₄ would be transmitted to the printing position 22, if not stopped on the transmission way. Said pulse is then transmitted on the circuit: from wire 172 (Fig. 11b), through contacts 1462, 1464 normally closed, wire 175 (Figs. 11b, 9), terminal 222, wire 176 (Fig. 8), the contacts in the Units shift arrangement (actuated groups 8 and 16), wire 177a (Figs. 8, 5k, 5j) wire 177b, contact 859 closed, wire 177c (Figs. 5j, 11b), contact 1434 transferred, wire 178, relay coils 1456R, 1457R, to the ground, energizing said relays, which manifest the detection of an initial with index 4.

With the holding relay 1456R still energized (on CC3) the closure of contact 1457 causes the energization of relay 1465R, through an obvious circuit. The transfer of contact 1465 causes: (1) the completion of a circuit from wire 171a, through contact 1465 transferred, wires 179a, 179b, 179c (Figs. 11b, 11c), contact 1471 normal, relay coils 1472R—1474R, to the ground, energizing said relays; (2) the de-energization of relay group 1468R—1470R.

Due to the fact that relay 1456R holds itself energized, the voltage supplied by cam-contact CC3 is still applied on the circuit precedingly traced, but it can be said, though improperly, that it runs now in a converse direction with respect to the preceding one.

However, said circuit is somewhat different. It runs from: terminal +, cam-contact CC3, wire 170, contact 1495 normal, wires 171a, 171b, contact 1456 closed, wire 178, contact 1434 transferred, wire 177c, circuits in the Units word formation device and the Units shift arrangement, wire 175 (Fig. 11b), contacts 1464, 1462, normally closed, wire 172, contact 1468 normal, wire 180 (Figs. 11b, 11c), contact 1472 transferred, relay coil 1477R to the ground. Pick-up relays 1479R and 1481R are energized at the same time as pick-up relay 1477R, through unidirectional cells 1475a and 1476a. All this process took only a cycle point interval, namely the point 15 of the instant cycle. It follows the energization of holding relays 1478R, 1480R, 1382R and control relays 1483R, 1484R, 1485R. Their energization is held, through cam-contact CC6, until 268° on the following printing cycle, in the course of which the words AND SEVEN are printed, the letters TEE being cut-out since contacts 1483, 1484, 1485 are transferred (see Fig. 15). Instead, a point is printed in place of each suppressed letter. As a matter of fact, the transfer of contacts 1483—1485 permits the sending of a 11 timed pulse to the terminals 222a, 223a, 224a, as the wires 181a, 181b (Figs. 11c, 11b, 11a) connect said contacts to a terminal which receives such a pulse from the pulse distributor.

Other eventual cases may be examined. For instance, if an initial with index 3 is detected in the 22 position, it is clear that the search pulse energizes first, relays 1458R, 1459R and then 146R. The opening of contact 1464 prevents the search pulse to find a circuit path on its way back, and consequently the relay 1477R cannot be energized. Thus no transmitting line to the 22, 23, 24 position will be interrupted.

In the same way, if an initial with index 2 is detected in the 22 or 23 positions, relays 1462R, 1463R, energized along with relays 1460R, 1461R, prevent any transmitting line to the 22, 23, 24 positions to be cut-out.

Resuming the operation in relation with the example of Fig. 15, it may be seen that a further shift of three ranks is to be applied to the place number totalizer before printing Teen Dollars on the second printing line. This is realized in the following way.

On account of the fact that a "32 carry" occurred at the U counter (see Fig. 16a), relays 1402R (Fig. 10c) and 1226R (Fig. 10a) are energized at the end of the second printing cycle, till the opening of cam-contact CC8.

As a result of the closure of contact 1226, a circuit is completed from: terminal +, cam-contact CC7 bis (Fig. 10a), contact 1226 closed, wire 142c (Figs. 10a, 10b, 10c) 142d, 142e (Figs. 10c, 11b), relay coil 1496R, to the ground, energizing said relay. The closure of contact 1496 during the closure of cam-contact CC3 bis, from 292° to 316°, permits: first, the energization of relay 1495R and then the start of a second initial search from wire 171a. Besides, relay 1471R (Fig. 11c) is energized and transfers its contact upon closure of cam-contact CC3 bis. It may readily be conceived: (1) that this second search pulse follows the same circuits as defined above, in forward and backward directions, so that said pulse also appears on wire 172; (2) that the relay group 1486R—1488R is energized in lieu of relay group 1472R—1474R, due to the transfer of contact 1471.

It follows that the search pulse finds now another circuit that is, from wire 172 (Fig. 11b), contact 1468 normal, wire 180 (Figs. 11b, 11c), contacts 1472, 1483 normal, contact 1486 transferred, relay coils 1489R, 1492R in parallel, to the ground, energizing said pickup relays. Holding relays 1491R, 1494R are energized nearly at the same time. the energization circuit being, for the first relay: terminal +, cam-contact CC6 (Fig. 11c), wires 139a, 139b, contact 1489 transferred, contact 1490 normal, relay coil 1491R, to the ground.

When cam-contact CC3 bis re-opens at 316°, relays 1489R, 1492R de-energize and their contacts return in normal position. A first circuit continues from wire 139b, through contact 1491 closed, contacts 1490, 1489 normal, wire 182 (Figs. 11c, 10a), relay coil 1235R, to the ground, energizing said relay. Another circuit continues from wire 139b, through contact 1494 closed, contacts 1493, 1492 normal, wire 183 (Figs. 11c, 10a), relay coil 1210R, to the ground, energizing said relay. The energization of relays 1235R and 1210R lasts till 268° on the third printing cycle and represents the addition of the digits 2 and 1 in the totalizer.

Fig. 16b shows that said totalizer receives the digits 1, 2 (further shift 3), and 8 (systematical shift).

The positioning of the adding circuits of the totalizer is such that the Units shift arrangement undergoes a shift of 3 ranks under control of the T counter for transmitting the remaining letters Teen.

The digit 3 results from:

24 (Previous shift from T counter, Fig. 16a)
+ 3 (Further shift)
+ 8 (systematical shift)
—
35
—
32 (counters return to zero).
—
3

Figure 8:
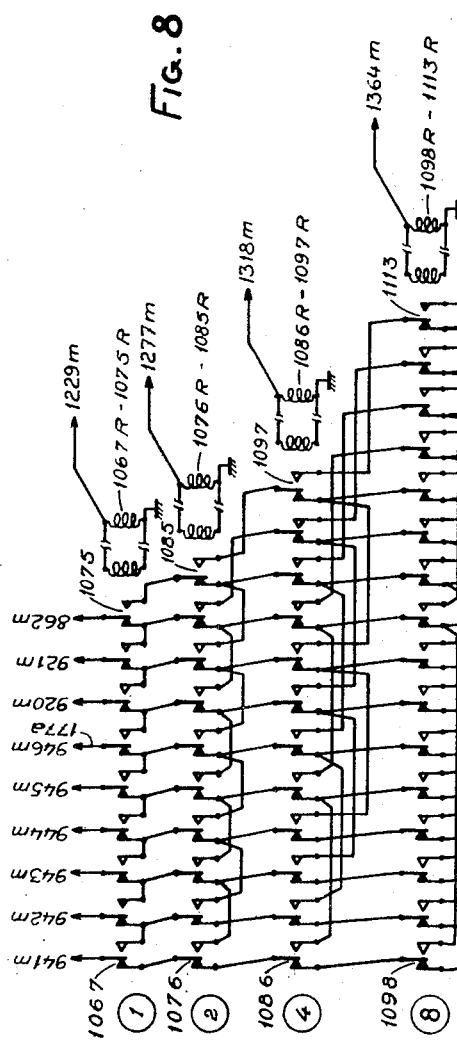

The shift of 3 ranks results in the transfer of contacts 1067—1075 and 1076—1085 (Fig. 8, Units shift arrangement). Under these conditions the first five letters of Seventeen are suppressed. Inspection of said figure shows that the letter T arrives through wire 177 and goes out on the extreme left hand wire to the terminal 201, that is to the first printing position of the second line. The order No. 1 shift arrangement undergoes a shift of 13 ranks (see Figs. 15 and 16b) under control of the U counter, for transmitting the word Dollars to the 6–12 positions of the printing mechanism.

It is of interest to remark that, when a "32 carry" occurred at the U counter (Fig. 16a) before the second printing cycle, the Order 1 shift arrangement was not bodily controlled. Contact 1393 (Fig. 10f) being transferred when contact 1400 (Fig. 10c) closed, the relay group 1230R—1389R could not be energized through contact 1400 normal and wires 153a, 153b, 153c. In this way the word Dollars cannot be transmitted during said second printing cycle.

On the other hand, when a "32 carry" occurs at the O2 counter (see Fig. 16b) before the third printing cycle, the Order 2 shift arrangement is not bodily controlled. Contact 1391 (Fig. 10c) being transferred when contact 1400 closes, all the shift arrangement control relay groups are energized through the control circuit running from contact 1400 closed, contact 1405 transferred, wire 155 (Figs. 10c, 10f), contact 1394, wire 153d, contact 1393, wire 153c, contact 1392, wire 153b except the relay group 1227R—1386R due to the transfer of contact 1391. By this way, no letter of the still formed word And can be transmitted through the order 2 shift arrangement.

In accordance with the illustrative amount 617$ previously taken as example, the operation for printing the words And No Cents presents no particularity and need not be at length explained.

The place number totalizer is provided with organs for saving one machine cycle in certain eventual cases. Such cases arise when a wording to be printed includes the order word Cents at the right-hand extremity of a line. The letter S is then to be printed in the 24th printing position, as may be verified in the wording: Two Dollars And No Cents.

Before the first printing cycle the totalizer receives the digits: 8 (systematical shift), 4 (Units word: Two), and 8 (O1 word Dollars), which yields a sum of 20.

Before the second printing cycle the number 20 is transferred from the storage device to the Previous Total counter and the totalizer receives the digits: 7 (O2 words And No) and 6 (O1 word Cents). During the positioning of the adding circuits, the summing up of the numbers entered in the totalizer yields a total of 33. Normally such a total would give rise to a "32 carry" at the O1 counter. In the present case, the positioning of the adding circuits is such that the relays 1279R (Fig. 10d) 1320R, and 1366R (Fig. 10e) are energized and close their contact. A circuit is then completed from contact 1269 transferred (Fig. 10d) through wire 184, contact 1279, wire 185 (Figs. 10d, 10e), contact 1320, wire 186, contact 1366, wire 187a (Figs. 10e, 5d), contact 677 closed, wire 187b (Figs. 5d, 10f), relay coil 1390R, to the ground, energizing said relay. When contact 1399 (Fig. 10c) is closed, the opening of contact 1390 prevents the energization of relay 1394R. The "32 carry" at the O1 counter is thus suppressed and it is readily understandable that the second printing cycle will not be followed by another printing cycle, since the "Skip to next line" device is not made effective.

The same process is carried out when the letter S in Cents is to be printed in the 23rd position. The total sum in the totalizer is then 32 and an idle printing cycle is as well saved through the same means.

The Fig. 17 gives a partial view of the plugboard of the tabulator with plug-connections established in accordance with the wiring circuits represented on the Fig. 1. Examination of plug-connections is easily made since equivalent elements bear the same reference numerals or letters on both figures. The terminal panel, previously referred to for electrical connection between the tabulator and the printing control apparatus, bears the reference numeral 188.

The present apparatus would require little changes to permit it to control the printing of the words: Pounds and Shillings instead of Dollars and Cents.

To this end, the Order No. 1 word formation device and Order No. 1 shift arrangement should be adapted in view of the formation and transmission of the new words.

Besides, for using this apparatus in Great Britain the suppression of the words And No could be considered; it would entail the suppression of the Order word formation No. 2 device and Order No. 2 shift arrangement, the resulting changes being easy for any skilled man.

Other changes, omissions or substitutions could be brought to the present printing control apparatus by any skilled man without departing from the spirit of the invention.

I claim:

1. In a machine of the class described, a register with an amount manifesting device, a sensing device cooperating with said amount manifesting device for successively sensing its various denominational orders and determining, at each sensing operation, the position and value of the digit registered, a first word forming device controlled by the sensing device to form a so-called "order" word in accordance with the denominational order sensed, other word forming devices controlled by the sensing device and amount manifesting device to form one so-called "digit" word in accordance with the value of the digit registered in the denominational order sensed, number determining devices to determine printing place numbers in relation with the words formed, a place number accumulator in which the numbers determined are entered, a printing mechanism of the electromechanical type, word transmitting arrangements included in circuit paths between said word forming devices and printing mechanism, said transmitting arrangements being controlled by the places number accumulator for transmitting the formed words in a predetermined disposition to the printing mechanism.

2. The combination set forth in claim 1, wherein the sensing device is adapted to sense concurrently two adjacent orders designated "Tens" and "Units" orders in said amount manifesting device, said "digit" word forming devices comprising a "Tens" digit word forming device and a "Units" digit forming device to form two "digit" words or a combinational wording representative of the values of the digits registered at the two orders sensed.

3. In a machine of the class described, an accumulator with a multi-denominational amount read-out device, a sensing device coordinated with said read-out device for successively and separately sensing its denominational orders except two adjacent "Tens" and "Units" orders to be sensed concurrently, a first word forming device controlled by the sensing device to form a so-called "Order" word in accordance with the denominational order sensed, two "digit" forming devices controlled by the sensing device and said read-out device in accordance with the values of the digits registered in the orders sensed, the one forming device being effective to form a "Tens" digit word upon sensing of the read-out device "Tens" order, the other forming device being effective to form a word upon sensing of the other orders of said read-out device, number determining devices to determine printing place numbers in relation with the words formed, a place number totalizer comprising a plurality of cascaded counters in which the determined numbers are entered at each sensing operation, a printing mechanism of the electro-mechanical type, word transmitting arrangements included in circuit paths between said word forming devices and printing mechanism, said transmitting arrangements being separately controlled by adding circuits of the place number totalizer for transmitting the formed words in a predetermined disposition to the printing mechanism.

4. The combination set forth in claim 3 wherein said sensing device is provided with zero detection relay means controlling a first priority circuit to detect presence of zero digits in an amount registered and initiate a sensing operation of the highest order containing a significant digit.

5. The combination set forth in claim 3, wherein said sensing device is provided with zero detection means to detect presence of zero digits in an amount registered, and with denominationally order control means cooperating with a priority circuit to initiate first a sensing operation of the highest order containing a significant digit and thereafter successive sensing operations of the lower orders containing a significant digit.

6. The combination set forth in claim 3, wherein said first word forming device is adapted to form a cardinal number word such as "thousand" and "hundred" or a monetary unit word such as "dollars" under control of said sensing device in accordance with the denominational order sensed.

7. The combination set forth in claim 3, wherein said first word forming device is adapted to form not only a cardinal number word such as "thousand" and "hundred" or a monetary unit word such as "dollars" but alternatively a combination of two of the just-mentioned words, under control of said sensing device, in accordance with the denominational order sensed and the arrangement of zeros and significant digits in a registered amount.

8. The combination set forth in claim 3, wherein said totalizer comprises several counters respectively assigned to receive an "Order," a "Tens" digit, and a "Units" digit places number, a register or storage device in which the total of the numbers entered into said counters is built up at each amount sensing operation, a further counter and transfer control means rendered effective after each sensing operation to effect the transfer of a total from said storage device to said further counter.

9. The combination set forth in claim 3, wherein said totalizer comprises several counters respectively assigned to receive an "Order," a "Tens," and a "Units" place number, a further counter, a register or storage device, adding circuits controlled by said counters and arranged in the order: further counter, "Tens," "Units," "Order" counters to build up in the storage device the total of the numbers entered in said counters, control means adapted to transfer a built up total from said storage device to said further counter at each sensing operation, said adding circuits being further adapted to manifest at the level of a given counter the sum of the number entered in said given counter and of the numbers entered in the counters preceding said given counter in the order above stated.

10. The combination set forth in claim 3, wherein said totalizer comprises several counters respectively assigned to receive an "Order," a "Tens" digit and a "Units" digit place number, a further counter, a register or storage device, adding circuits controlled by said counters and arranged in the order: further counter, "Tens," "Units," "Order" counter, said word transmitting arrangements comprising a "Tens" transmitting arrangement the shift magnitude of which is controlled by said further counter, a "Units" transmitting arrangement the shift magnitude of which is controlled by said "Tens" counter, and an "Order" transmitting arrangement the shift magnitude of which is controlled by said "Units" counter.

11. In a machine of the class specified, a register with an amount read-out device for receiving an amount of composite monetary value, said amount including at least a "Tens" and a "Units" denominational order for dollars and a "Tens" and a "Units" denominational order for cents, a sensing device coordinated with said readout device for successively and separately sensing its denominational orders except two pairs of adjacent "Tens" and "Units" orders to be sensed concurrently, a so-called "Order" word determination device controlled by the sensing device to determine "Order" words in accordance with the denominational order sensed, two so-called "digit" word determination devices controlled by said sensing device and read-out device to determine "Tens" and "Units digit" words in accordance with the values of the digits registered in the orders sensed, two "Order" word forming devices controlled by the corresponding determination device, two "digit" word forming devices each controlled by a corresponding determination device, each word forming device being provided with a place number determining device to determine printing place number in relation with the word formed, a place number totalizer including a plurality of counters associated with said number determining devices to receive the numbers determined, a printing mechanism of the electromechanical type, word transmitting arrangements included in circuit paths between said word forming devices and printing mechanism, said transmitting arrangements being provided with shift organs settable under control of adding circuits in said place number totalizer for transmitting the formed words in a predetermined disposition to the printing mechanism.

12. The invention set forth in claim 11, wherein the Order word determination device comprises separate elements adapted to determine either cardinal number words such as "thousand" and "hundred," or monetary unit words such as "dollars" and "cents," the sensing device comprising control means effective at each sensing operation to select one or several elements for determination of one "order" word or a combination of several of said words in accordance with the denominational order sensed and the arrangement of zeroes and significant digits in a registered amount.

13. The invention set forth in claim 11, wherein the Order word determination device comprises selectable determination organs to determine one word or a combination of words among "thousand," "hundred," "dollars," and "cents" when selected under control of said sensing device and in accordance with the denominational order sensed and arrangement of zeroes and significant digits in a registered amount, holding means to maintain said determination organ or organs effective when selected, a priority circuit controlled by said organs for calling into activity separate elements in an associated "Order" word forming device to successively form the words corresponding to the organs selected.

14. The invention set forth in claim 11, wherein the order word determination device comprises selectable determination elements to determine one word or a combination of words among "thousand," "hundred," "dollars" and "cents" when selected under control of said sensing device in accordance with the amount sensed, control means operative when the word "dollars" is determined by its element, control means operative upon detection of at least one significant digit at the "Tens" or "Units" orders of the "dollars" order portion sensed by said sensing device, control means rendered operative when the word "hundred" has been previously determined in relation with the same sensed amount, one of said "Order" word forming devices being effective to form the word "and" only when the three control means are concurrently operative.

15. The invention set forth in claim 11, wherein said "Order" word determination device comprises elements effective to determine one or several of the words "thousand" "hundred," "dollars" and "cents," one of said "Order" word forming devices comprises elements to form the same words when determined, the other "Order" word forming device being effective to form the words "and no" upon formation of the word "cents," control means operative upon detection of at least one significant digit at "Tens" or "Units" orders of the "cents" orders portion sensed by said sensing device, the formation of "no" being suppressed in its forming device when said control means is being operative.

16. The invention set forth in claim 11, wherein said "order" word determination device comprises elements selectable under control of the sensing device to determine one or several of the words "thousand," "hundred," "dollars," and "cents," one of said "order" word forming devices comprises elements to form the same words when determined, control means rendered operative by said sensing device when the registered amount is not greater than 1, as the "dollars" orders portion is concerned, said control means controlling when operative the suppression of the formation of the letter "s" in the "dollars" word forming element.

17. The invention set forth in claim 11, wherein said "Order" word determination device comprises elements selectable under control of the sensing device to determine one or several of the words "thousand," "hundred," "dollars," and "cents," one of said "Order" word forming devices comprises elements to successively form the same words after their determination, control means rendered operative by said sensing device upon detection of the 1 digit at the "Units" order of the "dollars" orders portion of a registered amount, control means operative when one of the words "thousand" or "hundred" has been determined, control means operative upon detection of a significant digit at the "Tens" order of the "dollars" orders portion, the controlling action being such that the formation of the letter "s" in "dollars" is prevented upon the "dollars" word formation when the first control means is operative at a time when the other control means are inoperative.

18. The invention set forth in claim 11, wherein the two "Order" word forming devices comprise an "Order No. 1" and an "Order No. 2" word forming device, and wherein said totalizer comprises several counters respectively assigned to receive an "Order No. 1," a "Tens" digit, a "Units" digit and an "Order No. 2" places number, a register or storage device in which the total of the numbers entered into said counters is built up at each step of word formation, a so-called "Previous total" counter, and transfer control means rendered effective after each step of number introduction to carry out the transfer of a total from said storage device to said "Previous total" counter.

19. The invention set forth in claim 11, wherein said totalizer comprises several counters respectively assigned to receive an "Order No. 2," a "Tens," a "Units" and an "Order No. 1" place number, a "Previous Total" counter, a storage device, adding circuits controlled by said counters and arranged in the order: Previous Total, Order No. 2, Tens, Units, Order No. 1, to build up in the storage device the total of the numbers entered in said counters, control means adapted to transfer a built up total from said storage device to the Previous Total counter at each step of word formation, said adding circuits being further adapted to manifest at the level of a given counter the sum of the number entered in said given counter and of the numbers entered in the counters preceding said given counter in the order above stated.

20. The invention set forth in claim 11, wherein said two "Order" word forming devices comprise an "Order No. 1" and an "Order No. 2" word forming device, and wherein said totalizer comprises several counters respectively assigned to receive an "Order No. 2," a "Tens," a "Units" and an "Order No. 1" place number, a register or storage device in which the total of the numbers entered into said counters is built up, a so-called "Previous total" counter and transfer control means rendered effective after each step of number introduction to carry out the transfer of a total from said storage device to said "Previous total" counter said transmitting arrangements being provided with output terminals connected in parallel to the printing mechanism and comprising an "Order No. 2," a "Tens," a "Units" and a "Order No. 1" transmitting arrangement the shift organs of which are settable under control of adding circuits respectively controlled by said "Previous total" "Order No. 2," "Tens," and "Units" counters.

21. The invention set forth in claim 11, wherein digit detection means are provided and cooperate with said sensing device and said "digit" word determination devices, said means comprising a first digit detection means effective to detect a digit 1 at a "Tens" order sensed and a second digit detection means effective to detect a digit zero at an adjacent "Units" order sensed, control means made operative for controlling the "Units" determination device to determine the word "ten" when both detection means are effective, said control means being operative for controlling the "Units" determination device to determine a word from "eleven" to "nineteen" according to the digit registered at the "Units" order sensed, when only the detection means named in first is effective.

22. In a cyclically operated accounting machine, an accumulator with a multi-denominational amount read-out device, a printing mechanism of the electro-mechanical type, a printing control apparatus, said apparatus comprising a sensing device coordinated with said read-out device for successively and separately sensing its denominational orders except two adjacent "Tens" and "Units" orders to be concurrently sensed, and provided with separate sensing control means, initiating means timed in the operating cycle of the machine to initiate the operativeness of said control means in order that said "Tens" and "Units" orders be sensed at times set off from each other but in the same operating cycle, a first word forming device controlled by the sensing device to form so-called "Order" words in accordance with the denominational order sensed, other word forming devices controlled by the sensing device and amount read-out device to form so-called "digit" words in accordance with the values of the digits registered in the orders sensed, number determining devices to determine printing place numbers in relation with the words formed, a place number totalizer in which the numbers determined are entered, word transmitting arrangements included in circuit paths between said word forming devices and said printing mechanism for transmitting the formed words in a predetermined disposition to said printing mechanism under control of said totalizer.

23. The invention set forth in claim 22, wherein separate word determination devices are provided to determine said "Order" words and control accordingly corresponding elements in said "Order" word forming device, further sensing control means under control of said word determination devices and made effective when two or more "Order" words are determined during a single cycle for delaying a subsequent sensing operation until the determined "Order" words are formed and transmitted to the printing mechanism.

24. The invention set forth in claim 22, in which said machine is provided with a cycle controller which may initiate several types of cycles including printing cycles, separate word determination devices included in said apparatus to determine said Order words and control accordingly corresponding elements in said Order word forming device, control relay means under control of a final Order word determination device, and made operative, when the corresponding Order word has been formed and transmitted, for causing said cycle controller to stop the series of printing cycles in course and initiate another type of cycle.

25. In a machine of the class described with a printing mechanism for printing lines which extend on a fixed number of printing places (characters or spaces), a numerical register with an amount manifesting device the capacity of which is such that an amount may correspond to a literal wording extending on a number of places greater than said fixed number of printing places, a control apparatus comprising an amount sensing device coordinated to said amount manifesting device and adapted to sense separately its denominational orders, such as a Hundred order, or conjointly other orders, such as adjacent Tens and Units orders, a so-called Order word determination device controlled by the amount sensing device to determine Order words in accordance with the order sensed, two so-called Digit word determination devices controlled by said amount sensing device and manifesting device to determine "Tens" and "Units" digit words in accordance with the values of the digits registered in the orders sensed, two Order word formation devices controlled by the Order word determination device, two Digit word formation devices, each controlled by a corresponding word determination device, each word formation device being accompanied by a place number determination device to determine in coded form a number in relation with the word formed, a place number totalizer comprising a plurality of counters the capacity of which is related to said fixed number, said counters receiving said place numbers when determined and controlling adding circuits, word transmitting arrangements inserted in circuit paths between said word formation devices and the printing mechanism, said transmitting arrangements being provided with shift organs settable under control of the adding circuits in the totalizer for transmitting the formed words according to a fixed relative disposition to the printing mechanism.

26. The invention set forth in claim 25, wherein the Order word determination device comprises selectable determination organs to determine one or two words among "thousand," "hundred" and "dollars" when selected under control of the amount sensing device in accordance with the denominational order sensed and arrangement of zeroes and significant digit in a registered amount, holding means to maintain said determination organ or organs effective when selected, a priority circuit controlled by said organs and timing means for calling into activity separate elements in an associated Order word forming device to successively form the words corresponding to the organs selected.

27. The invention set forth in claim 25, wherein the Order word determination device comprises selectable determination elements to determine one word or a combination of words among "thousand," "hundred" and "dollars" when selected under control of the amount sensing device in accordance with the amount sensed, control means operative when the word "dollars" is determined by its element, control means operative upon detection of at least one significant digit at the Tens or Units orders of the "dollars" order portion sensed by said sensing device, control means rendered operative when the word "hundred" has been previously determined in relation with the same amount, one of said Order word formation devices being effective to form the word "and" only when the three control means are concurrently operative.

28. The invention set forth in claim 25, wherein said Order word determination device comprises elements selectable under control of the amount sensing device to determine one or several of the words "thousand," "hundred" and "dollars," one of said Order word formation devices comprising elements to successively form the same words after their determination, control means rendered operative by said sensing device upon detection of the 1 digit at the "Units" order of the "dollars" portion of a registered amount, control-means operative when one of the words "thousand" or "hundred" has been determined, control means operative upon detection of a significant digit at the Tens order of the "dollars" portion, the resulting control action being such that the formation of the letter "s" in "dollars" is prevented upon formation of the word "dollars" when the first control means is operative at a time when the second and third control means are inoperative.

29. The invention set forth in claim 25, wherein the apparatus includes an Order No. 1 and an Order No. 2 word formation device, the totalizer comprising coded counters respectively assigned to receive: an Order No. 1, a Tens, Units and an Order No. 2 place number, a storage device in which the total of the numbers entered into said counters is built up at each step of word formation, a so-called Previous Total counter, and transfer control means normally effective after each step of number introduction to carry out the transfer of a total from said storage device to said Previous Total counter.

30. The invention set forth in claim 25, wherein the apparatus comprises an Order No. 1 and an Order No. 2 word formation device, and wherein said totalizer comprises several counters respectively assigned to receive an Order No. 2, a Tens, a Units and an Order No. 1 place number, a storage device in which the total of the numbers entered into the counters is built up, a so-called Previous Total counter and transfer control means normally effective after each step of number introduction to carry out the transfer of a total from said storage device to said Previous Total counter, said transmitting arrangements being provided with output circuit paths parallel connected to the printing mechanism and comprising an Order No. 2, a Tens, a Units and an Order No. 1 transmitting arrangements the shift organs of which are settable under control of adding circuits respectively controlled by said Previous total, Order No. 2, Tens and Units counters.

31. The invention set forth in claim 25, wherein the shift organs in the transmitting arrangements are established on the same coded basis as the counters, with a systematical shift between the in and out transmitting paths, represented by a so-called systematical shift number, the counters and storage device in said totalizer comprising each coded relay groups and having a numerical capacity resulting from the sum of said fixed number plus said systematical shift number minus one, entry control means made operative upon starting of a printing operation to enter the value of said systematical shift number into the totalizer, thus conditioning said adding circuits so that the systematical shift in the transmitting arrangements is nullified during the first printing cycle.

32. The invention set forth in claim 25, wherein the adding circuits are separated by code components and adapted to realize and manifest the progressive cross-addition of the numbers entered in the totalizer, excess detection means separately coordinated to the counters through said adding circuits to detect the fact that the numbers and carries entered exceed said capacity, bodily control means differently acting to bodily actuate the shift organs of the transmitting arrangements according to which detection means is operative so that, during the printing cycle following such a detection, the transmitting arrangements having to transmit the word or words in excess over the line capacity are not active and prevent the transmission of said word or words.

33. The invention set forth in claim 25, wherein the adding circuits are adapted to realize and manifest the progressive cross-addition of the numbers entered in the totalizer, excess detection means separately coordinated to the counters through said adding circuits to detect the fact that the numbers and carries entered exceed said counter capacity, bodily control means differently acting to bodily actuate the shift organs of the transmitting arrangements according to which detection means is operative so that during the first printing cycle following such a detection the words or letters in excess over the line capacity are not transmitted, "skip to next line" device made operative during the second printing cycle following such a detection to govern said bodily control means so that only the words or letters in excess over the line capacity may be now transmitted and printed on another printing line.

34. In combination with a machine of the class described with a printing mechanism for printing lines which extend on a fixed number of printing places (characters or spaces), a register with an amount manifesting device the capacity of which is such that an amount may correspond to a literal wording extending on more than said fixed number of printing places, a printing control apparatus comprising an amount sensing device, Order and digit word formation devices, the sensing device cooperating with said amount manifesting device and word formation devices to successively sense the denominational orders of a registered amount and determine at each sensing operation an order word and a digit word, place number determination devices to determine numbers in relation with the words being formed, a totalizer receiving said numbers when determined, said totalizer comprising counters whose numerical capacity is related to said fixed number, word transmitting arrangements controlled by said counters to transmit the formed words according to a predetermined disposition to the printing mechanism, a "syllable cut-out," device with syllable initial detection organs disposed on a part of the transmitting paths between the transmitting arrangements and printing mechanism, operating in cooperation with the words formation devices so that, if a syllable initial is detected in a syllable which exceeds the end of a printing line, switching organs are actuated to cut off the transmitting paths of said intitial and letters at the right hand side of said initial.

35. The invention set forth in claim 34, wherein initial characterizing means are provided to characterize the syllable initials with respect to the number of letters of the syllables involved in the formed words, the syllable cut-out device comprising initial search organs which control the cooperation of said initial detection organs with said characterizing means, the transmitting arrangements, the word formation devices, and circuit diverting means in such a way that said switching means may be actuated or not before each printing cycle according to the position and characterization of the initial detected.

36. The invention set forth in claim 34, wherein initial characterizing means are provided to characterize the syllable initials with respect to the numbers of letters of the syllables involved in the formed words, the syllable cut-out device comprising means to send a search pulse which actuates, first: circuit diverting means to open up said part of the transmitting paths to said pulse, second: circuit diverting means to control said pulse having eventually gone through a transmitting arrangement, a word formation device and characterizing means, third: one of the initial detection organs, any one being effective, when actuated, to set the first circuit diverting means at rest and actuate other circuit diverting means so that the eventual pulse finds now an inverse path to one of said switching organs.

37. The invention set forth in claim 34, wherein initial characterizing means are provided to differentiate from each other the initials supplied, as other letters, from a letter formation device to the word formation devices, the syllable cut-out device comprising circuit control means actuated concurrently with associated initial detection means, initial search organs which control the cooperation of said initial detection means with said characterizing means, the transmitting arrangements, the word formation devices, and circuit diverting means, so that a search pulse may reach one of said initial detection organs, actuating the same and then one of said switching organs through a circuit path, if however said circuit path is not cut off through said control means according to the position and characterization of the initial detected.

38. The invention set forth in claim 34, wherein initial characterizing means are provided to characterize the syllable initials with respect to the letter number of the syllables involved in the words to be formed, the syllable cut-out device comprising initial search organs which control, before each printing cycle, the cooperation of said initial detection organs with said characterizing means, with the transmitting arrangements, with the word formation devices and with circuit diverting means in such a way that said switching means may be actuated according to the position and characterization of the initial detected to control the suppression of the printing of said initial and letters at its right hand side and to control instead the printing of a point in lieu of each suppressed letter.

39. The invention set forth in claim 34, wherein the totalizer comprises a so-called "skip to next line" device made operative when the numbers and carries entered in any counter exceed its numerical capacity, initial characterizing means to characterize the syllable initials with respect to the letter number of the syllables involved in the formed words, the syllable cut-out device comprising initial search organs which control the operation of said initial detection organs jointly with said characterizing means, the transmitting arrangements, the word formation devices and circuit diverting means in such a way that said switching means may be actuated before each printing cycle to suppress the printing of one or several letters including the initial detected, means controlled by said skip to next line device, when operative, to initiate a repeated operation of said initial detection organs whereby digit entry means are actuated for entering into said totalizer a so-called "further shift" digit, equalling the number of the precedingly suppressed letters.

40. In an apparatus of the class described, a register with amount manifesting means comprising denominationally ordered elements, separate elements for each numerical value and settable selecting organs to represent the value of a registered digit at each denominational order, sensing operation starting means, an amount sensing device coordinated to said amount manifesting means and comprising denominationally ordered zero detection relay means which control contacts included in priority circuits, electrical connections between the operation starting means and a separate element assigned to the zero value in the amount manifesting means, whereby the zero detection relay means are operated during the sensing phase of a cycle in accordance with the denominational orders containing a zero digit, denominationally ordered sensing control relay means separately operated under control of said zero detection relay means and adapted to send a sensing pulse through the denominationally ordered element corresponding to the highest order containing a significant digit and through the separate element representative of the numerical value of said significant digit, to a digit word determination device.

41. The invention set forth in claim 40, wherein the amount sensing device comprises a common sensing control relay means for adjacent Tens and Units orders, timing means to delimit sensing phase in each machine cycle and to delimit two successive sub-phases during said sensing phase whereby permitting said common sensing control means to send during one sensing phase two successive pulses through amount manifesting elements corresponding to eventually registered Tens and Units significant digits to two digit word determination devices.

42. The invention set forth in claim 40, wherein the amount sensing device comprises common sensing control relay means for adjacent Tens and Units orders, timing means to delimit a sensing phase in each machine cycle in such a way that a pair of significant digits registered at said orders may be sensed in one sensing phase, holding means each associated with a separate sensing control relay means to operate the zero detection relay means corresponding to an order or a pair of orders containing a significant digit after said order (or orders) has been sensed and to maintain said zero detection means operated so that a lower order containing a significant digit may be sensed during a subsequent sensing phase.

43. In an apparatus of the class described, place number determining devices each adapted to determine in combinational coded form a place number in relation with a formed word, a place number totalizer comprising several counters associated with said place number determining devices, a further counter, a storage device, said counters being established on a combinational coded basis and composed of relay groups assigned to different code components, the relays of each counter being divided into a series of entry relays to receive numbers and a series of carry relays to receive the eventual carries, contacts controlled by said relays and included in adding circuits each assigned to a different code component, timed setting means operated when the determined numbers are entered in the counters to sequentially set the adding circuits so as to transfer the eventual carries and progressively build up the sum of the numbers entered in said counters into the storage device.

44. The invention set forth in claim 43, wherein the storage device comprises a series of coded entry relays and a series of coded transfer relays with connections to the entry relays of said further counter, timed holding control means operative at each amount sensing operation to energize in the storage device the transfer relays corresponding to the entry relays energized in accordance with a built up total, thus transferring said total from the storage device to the further counter.

45. In a recording machine with a recording mechanism, a data storage device storing a multidenominational data, a sensing device for successively sensing the denominational orders of the storage device and determining, at each sensing operation, the position and value of the digits stored, word forming devices adapted to form one or a number of words according to the position and value determined, place number determining means cooperating with said word forming devices and adapted to enter numbers determined in relation to the formed words into a place number totalizer, intermediate means connecting the word forming devices and the recording mechanism and cooperating with the place number totalizer for causing the recording mechanism to record the formed words according to a predetermined disposition.

46. In a recording machine with a printing mechanism having individually settable character types selectively operable to print letters at selected places without displacement of the printed paper with respect to the printing mechanism; a data storage device for storing a numerical data, sensing means to sense the digits of the stored data, translating means cooperating with said sensing means for causing the printing mechanism to simultaneously print both a letter word representing the numerical value of each digit so sensed and another letter word in dependence on the denomination position of the sensed digit.

References Cited in the file of this patent

UNITED STATES PATENTS

| | | |
|---|---|---|
| 2,332,304 | Davies | Oct. 19, 1943 |
| 2,453,932 | Pitman | Nov. 16, 1948 |